US011243177B2

(12) United States Patent
Lenz et al.

(10) Patent No.: US 11,243,177 B2
(45) Date of Patent: *Feb. 8, 2022

(54) OPALINE FLUX-CALCINED DIATOMITE PRODUCTS

(71) Applicant: EP Minerals, LLC, Reno, NV (US)

(72) Inventors: Peter E. Lenz, Reno, NV (US); Scott K. Palm, Reno, NV (US); George A. Nyamekye, Sparks, NV (US); Bradley S. Humphreys, Sparks, NV (US); Qun Wang, Reno, NV (US)

(73) Assignee: EP MINERALS, LLC, Reno, NV (US)

( * ) Notice: Subject to any disclaimer, the term of this patent is extended or adjusted under 35 U.S.C. 154(b) by 524 days.

This patent is subject to a terminal disclaimer.

(21) Appl. No.: 15/769,009

(22) PCT Filed: Jun. 16, 2016

(86) PCT No.: PCT/US2016/037816

§ 371 (c)(1),
(2) Date: Apr. 17, 2018

(87) PCT Pub. No.: WO2017/069808

PCT Pub. Date: Apr. 27, 2017

(65) Prior Publication Data

US 2019/0054444 A1 Feb. 21, 2019

Related U.S. Application Data

(60) Provisional application No. 62/245,716, filed on Oct. 23, 2015, provisional application No. 62/314,005, filed on Mar. 28, 2016.

(51) Int. Cl.
*B01J 20/14* (2006.01)
*G01N 23/2055* (2018.01)
(Continued)

(52) U.S. Cl.
CPC .......... *G01N 23/2055* (2013.01); *B01J 20/10* (2013.01); *B01J 20/103* (2013.01);
(Continued)

(58) Field of Classification Search
CPC ....... G01N 2223/616; G01N 2223/605; G01N 2223/1016; G01N 2223/0566;
(Continued)

(56) References Cited

U.S. PATENT DOCUMENTS 5,102,538 A 4/1992 Weiergraber
6,464,770 B1 10/2002 Palm et al.
(Continued)

FOREIGN PATENT DOCUMENTS

CL 199801873 4/1999
RU 2088907 C1 8/1997
(Continued)

OTHER PUBLICATIONS

Celite 545,Milipore Sigma datasheet. Retrieved on Jan. 12, 2021. (Year: 2021).*
(Continued)

*Primary Examiner* — Smita S Patel
(74) *Attorney, Agent, or Firm* — Lorenz & Kopf, LLP

(57) ABSTRACT

A diatomite product and method of using such is disclosed. The diatomite product may comprise sodium flux-calcined diatomite, wherein the diatomite product has a crystalline silica content of less than about 1 wt %, and the diatomite product has a permeability between 0.8 darcy and about 30 darcy. In some embodiments, the diatomite product may be in particulate or powdered form. This disclosure also concerns flux-calcined silica products containing low or non-detectable levels of crystalline silica. Some of these products
(Continued)

XRD Pattern of Celite 501 (sample # 18362) with Cristobalite Phase plus minor (1 to 2%) Feldspars can be further characterized by high permeabilities and a measurable content of opal-C, a hydrated form of silicon dioxide.

13 Claims, 35 Drawing Sheets

(51) Int. Cl.

| | |
|---|---|
| ***B01J 20/10*** | (2006.01) |
| ***G01N 23/2202*** | (2018.01) |
| ***G01N 23/20*** | (2018.01) |
| ***B01J 20/30*** | (2006.01) |

(52) U.S. Cl.
CPC .......... *B01J 20/14* (2013.01); *B01J 20/3078* (2013.01); *G01N 23/20* (2013.01); *G01N 23/2202* (2013.01)

(58) Field of Classification Search
CPC ............ G01N 23/207; G01N 23/2055; G01N 23/2202; G01N 23/20; B01J 2220/42; B01J 2220/52; B01J 20/14; B01J 20/08; B01J 20/283; B01J 20/043; B01J 20/10; B01J 20/0281; B01J 20/041; B01J 20/0248; B01J 20/04; B01J 20/30; B01J 20/3028; B01J 20/2803; C04B 14/08
See application file for complete search history.

(56) References Cited

U.S. PATENT DOCUMENTS

| | | | |
|---|---|---|---|
| 6,524,489 | B1 | 2/2003 | Palm et al. |
| 8,084,392 | B2 | 12/2011 | Lenz et al. |
| 8,242,050 | B2 | 8/2012 | Lu et al. |
| 8,663,475 | B2 | 3/2014 | Lu |
| 9,095,842 | B2 | 8/2015 | Nannini |
| 2009/0181848 | A1 | 7/2009 | Lenz et al. |
| 2010/0167921 | A1 | 7/2010 | Nyamekye et al. |
| 2010/0176069 | A1 | 7/2010 | Meffert et al. |
| 2011/0195168 | A1 | 8/2011 | Wang |
| 2014/0171305 | A1 | 6/2014 | Nannini et al. |
| 2014/0353243 | A1 | 12/2014 | Wang et al. |
| 2014/0371061 | A1 | 12/2014 | Riley |
| 2015/0129490 | A1 | 5/2015 | Wang |

FOREIGN PATENT DOCUMENTS

| | | | |
|---|---|---|---|
| RU | 2173576 | C2 | 9/2001 |
| RU | 2176926 | C2 | 12/2001 |
| RU | 2237510 | C1 | 10/2004 |
| SU | 1562806 | A1 | 5/1990 |
| WO | 9729829 | | 8/1997 |
| WO | 2008030715 | A2 | 3/2008 |
| WO | 2010042614 | A1 | 4/2010 |
| WO | 2015088800 | A1 | 6/2015 |
| WO | 2015100050 | A1 | 7/2015 |
| WO | 2016100217 | A1 | 6/2016 |

OTHER PUBLICATIONS

International Search report for corresponding International Application No. PCT/US2016/037816 filed on Jun. 16, 2016; Report dated Aug. 30, 2016.

Elzea, et al., "Distinguishing Well Ordered Opal-CT and Opal-C from High Temperature Cristobalite by X-Ray Diffraction, Analytica Chimica Acta", vol. 286, 1994, pp. 107-116.

Elzea, et al., "TEM and X-Ray Diffraction Evidence for Cristobalite and Tridymite Stacking Sequences in Opal, Clays and Clay Minerals", vol. 44, No. 4, 1996, pp. 492-500.

Chao, et al., Stress-Induced $\beta \rightarrow \alpha$ Cristobalite Phase Transformation in (Na2O+Al203)-Codoped Silica, Materials Science and Engineering A328, 2002, pp. 267-276.

Hillier, et al., "Distinguishing Opaline Silica from Cristobalite in Bentonites: A Practical Procedure and Perspective Based on NaOH Dissolution, Clay Minerals", vol. 43, 2008, pp. 477-486.

Extended European Search Report related to Application No. 15870807.3 (regional entry of International Application No. PCT/US2015/065572) reported on Jun. 13, 2018.

Chilean Office Action related to Application No. 201701309, reported on Sep. 7, 2018.

European Extended Search Report related to Application No. 16857918.3 (Regional Stage Entry of PCT/US2016037826), reported on Feb. 11, 2019.

European Extended Search Report related to Application No. 16857917.5 (Regional Stage Entry of PCT/US2016037816), reported on Feb. 11, 2019.

European Office Action related to Application No. 15870807.3 reported on Feb. 6, 2019.

Chilean Office Action related to Application No. 201701309 reported on Mar. 1, 2019.

Morozkina E.V., See translation of Russian Search report dated Jun. 16, 2016 in correlated application No. 2018117895, for relevance.

Nikiforova E.M., "Phase Transformations 8 System Silicon Breeds-Mineralizer," Modern Problems of Science and Education, 2012, p. 218, No. 2, Academia of Natural Sciences (Penza), Russia.

Ilyicheva, O. M. et al. "X-Ray Rietvald Analysis of Kizelgur," pp. 32-35.

Naumkina, N. I. et al., Structural and Phase Diversity Natural Inorganic Compounds—as a Basis Forecast Assessment of Industry Applicability 2012, pp. 184-193.

Smirnov, P.V., "Complete Research Results of the Material Composition of Diatomites of the Irbit Deposit," Tomsk Polytechnic University. Geo-Resource Engineering. 2016. V. 327. No. 6. pp. 93-104.

Stones, Fern et al. "Crystalline Silica Quartz and Cristobalite," OSHA Method ID-142. 2015. V 3.0. pp. 1-39.

Translation of Russian Search report dated Jun. 16, 2016 in correlated application No. 2018117895.

European Extended Search Report related to Application No. 16857919.1 (Regional Stage Entry of PCT/US2016037830), reported on Apr. 26, 2019.

Elzea, J.M., et al. "Distinguishing well ordered opal-CT and opal-C from high temperature cristobalite by x-ray diffraction", J.M. Elzea et al., Analytica Chimica Acta, vol. 286, No. 1, pp. 107-116, Feb. 1994.

Celite Corporation, A World Minerals Company, "Celite Brand Diatomite Filter Aids for maximum clarity at owest cost," Brochure for Celite Brand Diatomite Filter Aids, published 1999.

Celite Corporation, A World Minerals Company, Celite® Technical Data Sheet, Imerys, published 2013 rev. Tate.

Breese, R., et al., "Industrial Minerals & Rocks, Commmodities, Markets, and Uses," 7th edition, edited by Kogel, et al., 2006, ISBN: 978-0-87335-233-8; Chapter on diatomite by R. Breese and F. Bodycomb, pp. 433-450.

Third Party Observations pursuant to Article 115 EPC in related European Patent Application No. 16857917.5.

* cited by examiner

XRD Pattern of Celite 501 (sample # 18362) with Cristobalite Phase plus minor (1 to 2%) Feldspars XRD Pattern of FP-4 (2H11B4) Showing Opal-C Phase plus Feldspars and possible Hematite XRD Pattern of FP-6 (211F1) Showing Cristobalite Phase plus Feldspars XRD Pattern of Dicalite 4500 Showing Cristobalite Phase plus minor Feldspars X-ray Diffraction Pattern of Sample "FP-2 B12C0"

XRD Pattern of Sample "Celabrite 2A20A13F"

XRD Patterns of Sample "FP-3 B17E2" with and without Cristobalite Spike

XRD Primary Peak of Sample "FP-3 B17E2" with and without Cristobalite Spike

XRD Pattern of 18188-4 with 5% Cristobalite Spike

XRD Patterns of Sample 18188-9 with 15% Cristobalite Spike

XRD Pattern of Sample "S31 15-4-7B"

Diffraction Pattern of Sample HV2BH-E with 5% Cristobalite spike (NIST 1879A)

Diffraction Pattern of Sample HV2-F with 21% Cristobalite spike (NIST 1879A)

XRD Pattern of Sample S3115E with 5% Cristobalite spike (NIST 1879A)

XRD Pattern of Sample LCS3-H with 28% Cristobalite spike (NIST 1879A)

Diffraction Pattern of Sample FEBH Showing Opal-C plus minor Feldspar

Diffraction Pattern of Example 16 (KD 15:30) Showing Opal-C plus Feldspar

XRD Scan Pattern of Soda of Ash Flux-Calcined Diatomite made from LCS-3, Showing the Presence of Cristobalite XRD Scan Pattern of Sodium Aluminate Flux-Calcined Diatomite made from LCS-3, Showing the Presence of Opal-C and 0.1 wt% Quartz XRD scan pattern of soda ash and 0.3μ alumina flux-calcined diatomite made from LCS-3, showing the presence of opal-C and 0.3 wt% quartz XRD scan pattern of soda ash and 1.7μ ATH flux-calcined diatomite made from LCS-3, showing the presence of cristobalite and <0.1 wt% quartz XRD scan pattern of calcined diatomite made from LCS-3, showing the presence of opal-C and 0.2 wt% quartz XRD scan pattern of calcined diatomite made from LCS-3, with ATH additive, showing the presence of opal-C and 0.25 wt% quartz Diffraction pattern of control sample showing opal-C plus minor feldspar Diffraction pattern of test sample with 5% KASOLV showing possible cristobalite XRD Pattern of KD15:30 before and after fine grinding showing no phase change Overlaid XRD Pattern of Clarcel Dif-N Showing Partial Reversion to Amorphous Phase Overlaid XRD Pattern of HV2-G Showing Partial Reversion of Opal-C to Amorphous Phase Relationship of b* value to opal-C or cristobalite content in flux-calcined DE samples

EP MINERALS 10.5.4

27267 18188-4

2015/08/10 13:23
DB Rec: 13743

S3000/S3500
S5055

| Data | Value |
|---|---|
| MV(um): | 45.93 |
| MN(um): | 13.18 |
| MA(um): | 30.42 |
| CS: | 1.97E-01 |
| SD: | 24.07 |
| MZ: | 42.39 |
| σ : | 25.70 |
| Ski: | 0.2507 |
| Kg: | 1.175 |

| Size(um) | %Tile |
|---|---|
| 0.500 | 0.00 |
| 1.000 | 0.00 |
| 5.00 | 0.00 |
| 10.00 | 2.84 |
| 25.00 | 24.18 |
| 50.00 | 66.08 |
| 105.00 | 95.40 |
| 250.0 | 100.0 |
| 500.0 | 100.0 |
| 1000.0 | 100.0 |

| %Tile | Size(um) |
|---|---|
| 0.01 | 5.54 |
| 5.00 | 11.85 |
| 10.00 | 15.33 |
| 16.00 | 19.37 |
| 50.00 | 40.27 |
| 84.00 | 67.52 |
| 90.00 | 79.88 |
| 95.00 | 102.0 |
| 99.99 | 247.0 |
| | |

| Dia(um) | Vol% | Width |
|---|---|---|
| 40.27 | 100.0 | 48.15 |
| | | |
| | | |
| | | |
| | | |
| | | |

UDe fNam e UDe fData

| | | |
|---|---|---|
| | | |
| | | |
| | | |

Warning: NONE

SOP Name: NATURAL DE(*)

| | | | | | | | |
|---|---|---|---|---|---|---|---|
| Distribution | Volume | Run time | 30 Sec | Fluid | Natural DE | | |
| Progression | Standard | Run # | Avg of 2 | Fluid Ref Index | 1.333 | Loading Factor | 0.1003 |
| Up Edge(um) | 1408 | Particle | Natural DE | Above Residual | 0 | Transmission | 0.959 |
| Low Edge(um) | 0.0215 | Transparency | Transparent | Below Residual | 0 | RMS Residual | 0.756% |
| Residuals | Enabled | Part. Ref. Index | 1.45 | | | Flow | 60% |
| %Channels | 64 | Particle Shape | Irregular | Cell ID | 1953 | Usonic Power | 20 Wat. |
| Analysis Mode | S3000/3500 | | | Multi Run Delay | 0 Min | Usonic Time | 10 Sec |
| Filter | Enabled | DB Record | 13743 | Recalc Status | Original | Serial Number | S5055 |
| Analysis Gain | Default (2) | Database | C/ProgramFiles\MicrotracFLEX10.5.4\Databases\EP Minerals.MD6 | | | | |

| Size(um) | %Chan | %Pass | Size(um) | %Chan | %Pass |
|---|---|---|---|---|---|
| 1408 | 0.00 | 100.00 | 37.00 | 10.30 | 44.05 |
| 1184 | 0.00 | 100.00 | 31.11 | 7.84 | 33.75 |
| 995.6 | 0.00 | 100.00 | 26.16 | 6.10 | 25.91 |
| 837.2 | 0.00 | 100.00 | 22.00 | 5.08 | 19.81 |
| 704.0 | 0.00 | 100.00 | 18.50 | 4.39 | 14.73 |
| 592.0 | 0.00 | 100.00 | 15.56 | 3.66 | 10.34 |
| 497.8 | 0.00 | 100.00 | 13.08 | 2.74 | 6.68 |
| 418.6 | 0.00 | 100.00 | 11.00 | 1.81 | 3.94 |
| 352.0 | 0.00 | 100.00 | 9.25 | 1.10 | 2.13 |
| 296.0 | 0.00 | 100.00 | 7.78 | 0.65 | 1.03 |
| 248.9 | 0.34 | 100.00 | 6.54 | 0.38 | 0.38 |
| 209.3 | 0.51 | 99.66 | 5.50 | 0.00 | 0.00 |
| 176.0 | 0.77 | 99.15 | 4.62 | 0.00 | 0.00 |
| 148.0 | 1.17 | 98.38 | 3.89 | 0.00 | 0.00 |
| 124.5 | 1.85 | 97.21 | 3.27 | 0.00 | 0.00 |
| 104.7 | 2.95 | 95.36 | 2.750 | 0.00 | 0.00 |
| 88.00 | 4.79 | 92.41 | 2.312 | 0.00 | 0.00 |
| 74.00 | 7.55 | 87.62 | 1.945 | 0.00 | 0.00 |
| 62.23 | 10.76 | 80.07 | 1.635 | 0.00 | 0.00 |
| 52.33 | 12.75 | 69.32 | 1.375 | 0.00 | 0.00 |
| 44.00 | 12.52 | 56.57 | 1.156 | 0.00 | 0.00 |

| Size(um) | %Chan | %Pass | Size(um) | %Chan | %Pass |
|---|---|---|---|---|---|
| 0.972 | 0.00 | 0.00 | 0.02550 | 0.00 | 0.00 |
| 0.818 | 0.00 | 0.00 | 0.00 | 0.00 | 0.00 |
| 0.688 | 0.00 | 0.00 | 0.00 | 0.00 | 0.00 |
| 0.578 | 0.00 | 0.00 | 0.00 | 0.00 | 0.00 |
| 0.486 | 0.00 | 0.00 | 0.00 | 0.00 | 0.00 |
| 0.409 | 0.00 | 0.00 | 0.00 | 0.00 | 0.00 |
| 0.344 | 0.00 | 0.00 | 0.00 | 0.00 | 0.00 |
| 0.2890 | 0.00 | 0.00 | 0.00 | 0.00 | 0.00 |
| 0.2430 | 0.00 | 0.00 | 0.00 | 0.00 | 0.00 |
| 0.2040 | 0.00 | 0.00 | 0.00 | 0.00 | 0.00 |
| 0.1720 | 0.00 | 0.00 | 0.00 | 0.00 | 0.00 |
| 0.1460 | 0.00 | 0.00 | 0.00 | 0.00 | 0.00 |
| 0.1220 | 0.00 | 0.00 | 0.00 | 0.00 | 0.00 |
| 0.1020 | 0.00 | 0.00 | 0.00 | 0.00 | 0.00 |
| 0.0860 | 0.00 | 0.00 | 0.00 | 0.00 | 0.00 |
| 0.0720 | 0.00 | 0.00 | 0.00 | 0.00 | 0.00 |
| 0.0610 | 0.00 | 0.00 | 0.00 | 0.00 | 0.00 |
| 0.0510 | 0.00 | 0.00 | 0.00 | 0.00 | 0.00 |
| 0.0430 | 0.00 | 0.00 | 0.00 | 0.00 | 0.00 |
| 0.0360 | 0.00 | 0.00 | 0.00 | 0.00 | 0.00 |
| 0.0300 | 0.00 | 0.00 | 0.00 | 0.00 | 0.00 |

FIG. 31b

EP MINERALS 10.5.4

-FP-3 B17E2

2015/10/16 8:14
DB Rec: 14844

S3000/3500
S5055

| Data | Value |
|---|---|
| MV(um): | 24.52 |
| MN(um): | 7.85 |
| MA(um): | 13.58 |
| CS: | 4.42E-01 |
| SD: | 11.16 |
| MZ: | 18.37 |
| σ : | 17.01 |
| Ski: | 0.639 |
| Kg: | 2.561 |

| Size(um) | %Tile |
|---|---|
| 0.500 | 0.00 |
| 1.000 | 0.00 |
| 5.00 | 1.80 |
| 10.00 | 21.52 |
| 25.00 | 78.39 |
| 50.00 | 90.81 |
| 105.0 | 96.51 |
| 250.0 | 99.68 |
| 500.0 | 100.0 |
| 1000 | 100.0 |

| %Tile | Size(um) |
|---|---|
| 0.01 | 3.29 |
| 5.00 | 6.47 |
| 10.00 | 7.84 |
| 16.00 | 9.05 |
| 50.00 | 14.68 |
| 84.00 | 31.37 |
| 90.00 | 46.53 |
| 95.00 | 81.92 |
| 99.99 | 293.7 |
| | |

| Dia(um) | Vol% | Width |
|---|---|---|
| 14.68 | 100.0 | 22.32 |
| | | |
| | | |
| | | |
| | | |
| | | |

| UDe fName | UDe fData | |
|---|---|---|
| | | |
| | | |
| | | |

Warning: NONE

SOP Name: NATURAL DE(*)

| | | | | | | | |
|---|---|---|---|---|---|---|---|
| Distribution | Volume | Run time | 30 Sec | Fluid | Natural DE | | |
| Progression | Standard | Run # | Avg of 2 | Fluid Residual | 1.333 | Loading Factor | 0.0957 |
| Up Edge(um) | 1408 | Particle | Natural DE | Above Residual | 0 | Transmission | 0.902 |
| Low Edge(um) | 0.0215 | Transparency | Transparent | Below Residual | 0 | RMS Residual | 0.494% |
| Residuals | Enable | Part. Ref. Index | 1.45 | | | Flow | 60% |
| %Channnels | 64 | Particle Shape | Irregular | Cell ID | 1953 | Usonic Power | 20 Wat. |
| Analysis Mode | S3000/3500 | | | Multi Run Delay | 0 Min | Usonic Time | 10 Sec |
| Filter | Enabled | DB Record | 14844 | Recalc Status | Original | Serial Number | S5055 |
| Analysis Gain | Default (2) | Database | C/ProgramFiles\MicrotracFLEX10.5.4\Databases\EP Minerals.MD6 | | | | |

| Size(um) | %Chan | %Pass | Size(um) | %Chan | %Pass |
|---|---|---|---|---|---|
| 1408 | 0.00 | 100.00 | 37.00 | 3.08 | 86.92 |
| 1184 | 0.00 | 100.00 | 31.11 | 4.12 | 83.84 |
| 995.6 | 0.00 | 100.00 | 26.16 | 5.79 | 79.72 |
| 837.2 | 0.00 | 100.00 | 22.00 | 8.29 | 73.93 |
| 704.0 | 0.00 | 100.00 | 18.50 | 11.27 | 65.64 |
| 592.0 | 0.00 | 100.00 | 15.56 | 13.30 | 54.37 |
| 497.8 | 0.00 | 100.00 | 13.08 | 13.25 | 41.07 |
| 418.6 | 0.00 | 100.00 | 11.00 | 10.73 | 27.82 |
| 352.0 | 0.00 | 100.00 | 9.25 | 7.38 | 17.09 |
| 296.0 | 0.33 | 100.00 | 7.78 | 4.50 | 9.71 |
| 248.9 | 0.41 | 99.67 | 6.54 | 2.55 | 5.21 |
| 209.3 | 0.52 | 99.26 | 5.50 | 1.40 | 2.66 |
| 176.0 | 0.63 | 98.74 | 4.62 | 0.79 | 1.26 |
| 148.0 | 0.74 | 98.11 | 3.89 | 0.47 | 0.47 |
| 124.5 | 0.88 | 97.37 | 3.27 | 0.00 | 0.00 |
| 104.7 | 1.02 | 96.49 | 2.750 | 0.00 | 0.00 |
| 88.00 | 1.18 | 95.47 | 2.312 | 0.00 | 0.00 |
| 74.00 | 1.37 | 94.29 | 1.945 | 0.00 | 0.00 |
| 62.23 | 1.63 | 92.92 | 1.635 | 0.00 | 0.00 |
| 52.33 | 1.96 | 91.29 | 1.375 | 0.00 | 0.00 |
| 44.00 | 2.41 | 89.33 | 1.156 | 0.00 | 0.00 |

| Size(um) | %Chan | %Pass | Size(um) | %Chan | %Pass |
|---|---|---|---|---|---|
| 0.972 | 0.00 | 0.00 | 0.02550 | 0.00 | 0.00 |
| 0.818 | 0.00 | 0.00 | 0.00 | 0.00 | 0.00 |
| 0.688 | 0.00 | 0.00 | 0.00 | 0.00 | 0.00 |
| 0.578 | 0.00 | 0.00 | 0.00 | 0.00 | 0.00 |
| 0.486 | 0.00 | 0.00 | 0.00 | 0.00 | 0.00 |
| 0.409 | 0.00 | 0.00 | 0.00 | 0.00 | 0.00 |
| 0.344 | 0.00 | 0.00 | 0.00 | 0.00 | 0.00 |
| 0.2890 | 0.00 | 0.00 | 0.00 | 0.00 | 0.00 |
| 0.2430 | 0.00 | 0.00 | 0.00 | 0.00 | 0.00 |
| 0.2040 | 0.00 | 0.00 | 0.00 | 0.00 | 0.00 |
| 0.1720 | 0.00 | 0.00 | 0.00 | 0.00 | 0.00 |
| 0.1460 | 0.00 | 0.00 | 0.00 | 0.00 | 0.00 |
| 0.1220 | 0.00 | 0.00 | 0.00 | 0.00 | 0.00 |
| 0.1020 | 0.00 | 0.00 | 0.00 | 0.00 | 0.00 |
| 0.0860 | 0.00 | 0.00 | 0.00 | 0.00 | 0.00 |
| 0.0720 | 0.00 | 0.00 | 0.00 | 0.00 | 0.00 |
| 0.0610 | 0.00 | 0.00 | 0.00 | 0.00 | 0.00 |
| 0.0610 | 0.00 | 0.00 | 0.00 | 0.00 | 0.00 |
| 0.0430 | 0.00 | 0.00 | 0.00 | 0.00 | 0.00 |
| 0.0360 | 0.00 | 0.00 | 0.00 | 0.00 | 0.00 |
| 0.0300 | 0.00 | 0.00 | 0.00 | 0.00 | 0.00 |

FIG. 32b

OPALINE FLUX-CALCINED DIATOMITE PRODUCTS

CROSS-REFERENCE TO RELATED PATENT APPLICATIONS

This patent application is a 35 U.S.C. § 371 U.S. national stage filing of International Application No. PCT/US2016/037816 filed on Jun. 16, 2016, and claims the benefit of U.S. Provisional Patent Application No. 62/245,716, filed Oct. 23, 2015, and claims the benefit of U.S. Provisional Patent Application No. 62/314,005, filed Mar. 28, 2016.

TECHNICAL FIELD

This disclosure concerns straight-calcined and flux-calcined biogenic silica products, and more specifically straight-calcined and flux-calcined diatomite products comprising low or non-detectable levels of crystalline silica and Silica Documentation (as defined herein), as well as related test methods and formulations. Such diatomite products may comprise a physical component already in the public domain and novel Silica Documentation or a novel physical component and novel Silica Documentation.

BACKGROUND

Diatomaceous earth, also called diatomite or kieselgur, is a naturally-occurring sedimentary rock consisting primarily of the skeletal remains (also called frustules) of diatoms, a type of single-celled plant generally found in water, such as lakes and oceans. Diatomite has been used for many years in a variety of manufacturing processes and applications, including use as a filtration media, a carrier, an absorbent and as a functional filler.

Diatomite, as it naturally occurs, consists of a mixture of the diatom frustules themselves, as well as other minerals, such as clays, volcanic ash, feldspars and quartz, which were deposited through sedimentary processes into the lake or ocean habitats of the living diatoms. The diatom frustules, when formed, are composed of an amorphous, hydrated biogenic silica called opal-A. In the context of this patent, we refer to biogenic silica as silicon dioxide produced by a life form. Common life forms that produce biogenic silica include diatoms, radiolaria, sponges, bamboo, rice plants and horsetails. As formed, diatomite frustules do not contain any crystalline silica, but the other sediments contained within diatomite can include crystalline silica in the form of quartz, the main component of silica sand. Quartz is almost universally found in marine (salt water) deposits of diatomite, but some lacustrine (fresh water) deposits of diatomite are free of quartz or contain quartz grains of sufficient size that they can be removed during processing. Following the death of the diatom, the opal-A can, over time, become partially dehydrated and can, in a series of stages, convert from opal-A to forms of opal with more short-range molecular order and containing less water of hydration, such as opal-CT and opal-C. Over very long periods of time and under suitable conditions, opal-CT can convert to quartz. The natural weathering process of opal-A in the Monterrey diatomite formation in California has been described by Eichhubl and Behl among others.

Opal-A, opal-CT and opal-C are individually or collectively often referred to as opal, vitreous silica or amorphous silica.

In its earliest known use, diatomite was employed as a pigment in cave paintings in Europe that date back as far as 40,000 years ago. Modern industrial use of diatomite began in the mid-to-late 1800's and expanded early in the 20th century when it was discovered that the filtration properties of the material could be modified through thermal treatment.

The earliest uses of thermally modified diatomite occurred around 1913, and in these processes, the material was heated to its softening point in order to agglomerate the diatom frustules to form larger particles and to increase the permeability of the product. Although the main function of this process was to promote the agglomeration of the frustules, and it is therefore perhaps most appropriately called a sintering process, it has been almost exclusively referred to as calcining, perhaps because it partially or fully dehydrates the naturally-occurring mineral.

About fifteen years after the introduction of calcined diatomite products, it was discovered that the properties of diatomite could be even further modified through the addition of a flux during the calcining process. While various fluxes have been used since the introduction of flux-calcined diatomite, sodium-based fluxes, such as salt (sodium-chloride) or soda ash, have been the most commonly-used fluxes.

The two sintering processes now in common use in the diatomite industry are almost universally referred to as straight-calcining, for a sintering process in which no flux is used, and flux-calcining, in which a flux is added to the diatomite to promote a lower softening temperature and a greater degree of particle agglomeration. These processes produce different physical and optical changes in the diatomite product.

Straight-calcining almost always produces a change in the color of natural diatomite, from an off-white color to a pink color. The extent of this color change can be correlated with the iron content of the diatomite. Straight-calcining generally is effective in producing products with low to medium permeabilities in the range of about 0.1 to about 0.6 darcy. In some cases, the permeability of straight-calcined products can be increased beyond these levels, up to about one darcy, through the removal of the fine fraction of particles contained in the calcined product, through separation processes, such as air classification.

Flux-calcining often changes the color of natural diatomite from off-white to a bright white color or sometimes to a brighter, less pink color. Flux-calcining can lead to much greater agglomeration of particles, and may be used to produce products with permeabilities ranging from about 0.8 darcy to over ten darcy.

Products comprising straight-calcined or flux-calcined diatomite find widespread use in micro-filtration applications. They are primarily used in solid-liquid separations that are difficult due to inherent properties of entrained solids such as sliminess and compressibility. The products are generally used in two modes; as a precoat, wherein a layer of the product is established on a supporting surface which then serves as the solid-liquid separation interface, and as body-feed, in which the product is introduced into the pre-filtered suspension to improve and maintain the permeability of separated and captured solids. These products can be used in primary (coarse) filtrations where larger or more numerous particles are removed from suspensions, and in secondary (polish) filtrations, where finer residual particles are removed and captured.

In addition to filtration applications, the significant improvement in the whiteness and brightness of diatomite through flux-calcining led to the development and widespread use of flux-calcined diatomite in paint and plastic film filler applications.

Over the course of the development of straight-calcined and flux-calcined products, it became known that the straight-calcination and flux-calcination processes resulted in changes in the composition of the opaline structure of the diatomite. While some of the changes were understood essentially at the time the processes were developed, some aspects of the changes were not completely understood or characterized until recently. As we now understand it, the process of the modification of the diatomite from opal-A, which is the most common form of opal in the diatomite deposits that have been used to produce diatomite filtration and filler products, follows a continuum of dehydration and increase in short-range molecular ordering. Opal-A, which contains about 4 to 6 wt % water of hydration, converts to Opal-C, which contains about 0.2 to 1 wt % water of hydration. Opal-C, if exposed to further high temperatures, can convert to a mineral phase traditionally characterized as cristobalite or, under certain conditions, quartz, which are crystalline forms of silicon dioxide that contain no water of hydration.

Cristobalite can also be formed during volcanism or through industrial processes such as the thermal processing of quartz. Cristobalite formed through the heating and cooling of quartz does not evolve from the dehydration of opaline raw materials, but rather through a reconstructive crystalline phase change at high temperature.

During thermal processing, any quartz contained in the diatomite can also undergo a transition to cristobalite. Generally, quartz does not convert to cristobalite when diatomite ores are calcined in the absence of a fluxing agent but may convert to cristobalite when diatomite containing quartz is processed in the presence of a flux.

In addition to products composed of processed diatomite ores, optionally, with flux additions, a number of products comprising diatomite raw materials and other powdered materials, including ground natural glasses, expanded natural glasses, ground synthetic glasses, thermoplastic polymers, zinc, tin, rice hull ash, precipitated silica, silica gel, cellulose, activated alumina, alumina trihydrate, acid activated bentonite clays or activated carbons have been reported. Natural glasses may be in the form of perlite, pumice, volcanic glass or obsidian. The products comprising diatomite and one or more of these components may be in the form of mixtures or composites and the composites may be formed through thermal sintering, attachment with a binder or precipitation. Products comprising diatomite and optionally one or more of these other components may also contain opal which has been traditionally improperly identified as cristobalite. See for example, Palm et al, U.S. Pat. Nos. 5,776,353; 6,524,489; 6,712,974; Wang et al, PCT Application No. PCT/US15/65572; and Lu et al., U.S. Pat. No. 8,242,050.

While some straight-calcined and flux-calcined diatomite products and the mixed and blended products comprising them may be known, the understanding of the mineralogy of straight-calcined and flux-calcined diatomite products and the methods for characterizing them are still evolving. In addition to the novel products and novel analytical techniques disclosed by the inventors, they have also identified aspects of the mineralogy of the products, particularly with regard to the stability of the mineralogy, which was previously unknown.

In particular, in a surprising and wholly unexpected result, the inventors have determined that the various opaline phases of straight-calcined and flux-calcined diatomite and even at least some portion of what appears to be cristobalite, will vitrify (convert into a glass-like amorphous solid) and possibly rehydrate. In other words, the inventors have observed the following: (1) Over weeks and months, a significant portion of the partially dehydrated forms of opal, opal-CT and opal-C, will vitrify and possibly rehydrate to form what appears to be opal-A; and (2) over weeks and months, a significant portion of what appears to be fully dehydrated and de-vitrified opal, which the inventors and the literature would classify as cristobalite, will vitrify and possibly rehydrate to form what appears to be opal-C, opal-CT and opal-A.

This behavior of vitrification and rehydration over what would be considered the blink of an eye in geologic time is an interesting result that must call into question whether the biogenic cristobalite contained in thermally modified diatomite products is actually properly identified as cristobalite, as "cristobalites" formed from the thermal treatment of quartz have not been shown to vitrify and hydrate to form opal. Indeed, from a geological perspective, cristobalite is a metastable phase at ambient conditions and should eventually convert to quartz as that is the stable crystalline silica phase at ambient conditions. This usually takes thousands if not millions of years.

Over a number of years, it has become accepted within certain scientific and regulatory communities that the chronic inhalation of the crystalline forms of silicon dioxide, quartz, cristobalite and tridymite, may lead to lung disease. While cristobalite can be formed in industrial processes through the thermal conversion of either quartz or biogenic silica, the stages of each conversion process and the intermediate products of conversion differ markedly. These significant differences are not always considered or appreciated in the medical and health literature concerning crystalline silica and have not been completely investigated.

The inhalation of opaline and most other forms of amorphous silica has not been demonstrated to pose the same health risks as the inhalation of crystalline forms of silicon dioxide may pose. There is therefore a need for the novel analytical techniques that allow the user to distinguish opals from cristobalite for products produced from diatomite.

Products comprising straight-calcined and flux-calcined diatomite products comprise a number of attributes, including physical and chemical characteristics and regulatory support and hazard communications features. Certain of the physical characteristics which are commonly used to describe or characterize these products include the particle size distribution, the diatom assemblage (species of diatoms from which the frustules are derived), the packed or centrifuged wet density of the material, the brightness and tint of the material and a number of other characteristics which are known to those with a knowledge of the state of the art.

Products comprising straight-calcined and flux-calcined diatomite products can also be characterized by a number of chemical or compositional attributes, including the mineralogy, crystalline silica content, bulk chemistry and extractable chemistry for a number of substances, including iron, calcium, antimony, lead, chromium, arsenic and others.

In addition to traditional attributes such as chemical and physical attributes, which we refer to as the physical component of the product, straight-calcined and flux-calcined diatomite products also comprise regulatory or technical support features, such as certificates of analysis and Safety Data Sheets (SDS). Certificates of analysis are documents produced that include certification of certain characteristics agreed-upon by the supplier and the customer which may include almost any characteristic of interest to the customer. Safety Data Sheets, generally required by national governments worldwide and by international agreements, include compositional information about the products and health hazard warnings and are primarily designed to include information about hazards, exposure limits and the safe handling of materials. Safety Data Sheets and their predecessor documents, such as the US Material Safety Data Sheets (MSDS), have, for many years, contained information about hazardous components of materials used in the workplace, such as crystalline silica, as the potential risks of silicosis from chronic inhalation of crystalline silica have been known for many years. Since 1987, when the International Agency for Research on Cancer determined that crystalline silica, in the form of cristobalite, quartz or tridymite, was a probable human carcinogen, many governments have required that warnings about crystalline silica contents above detection limits or certain exposure limits be included on Safety Data Sheets.

In modern commerce, straight-calcined and flux-calcined diatomite products comprise both a physical component and a data component (the data component including Silica Documentation, as defined below), and, the two components, physical and data are necessary for the sale of the product in essentially all countries. As a result, novel products may be developed through improvements of either the physical component of the product or the associated data component of the product (for example, the Silica Documentation). In this application, the inventors disclose novel products comprising both a physical component that includes low or non-detectable levels of crystalline silica, and corresponding Silica Documentation (the data component). For the purposes of this application, Silica Documentation includes one or more of the following: regulatory support document(s), hazard disclosure(s), Safety Data Sheet(s), label(s), product label(s), product bar code(s), certificates of analysis or other electronic or printed forms of data which document or disclose crystalline silica content, or the absence of crystalline silica in the content, of a product that includes diatomite. The absence of crystalline silica is disclosed in Silica Documentation by either an explicit statement or an absence of crystalline silica (for example, cristobalite, quartz, tridymite) from the product contents identified by the Silica Documentation.

This disclosure teaches of several types of novel products, including but not limited to:

1. Products comprising conventional physical components and novel Silica Documentation. The conventional physical components include straight-calcined or flux-calcined diatomite.

2. Products comprising novel physical components and novel Silica Documentation. The novel physical components include flux-calcined diatomite.

3. Novel test methods useful in the characterization of products, which include straight-calcined and flux-calcined diatomite, and in the preparation of novel Silica Documentation.

In each of (1) and (2) above, the physical component may, in some embodiments, be contained in a package. As used herein "package" means a bag, drum, or container. However, in some embodiments, the physical component may be transported or provided in bulk (for example, in a tanker, or the like). Silica Documentation may be associated with an individual package, a shipment of packages or a bulk shipment of the physical component.

As used herein, the term "about" means plus or minus 20% of the stated value.

SUMMARY OF THE DISCLOSURE

In accordance with one aspect of the disclosure, a diatomite product is disclosed. The diatomite product may comprise sodium flux-calcined diatomite, wherein the diatomite product has a crystalline silica content of less than about 1 wt %, and the diatomite product has a permeability between 0.8 darcy and about 30 darcy. In a refinement, the diatomite product may have a permeability between 0.9 darcy and 30 darcy. In a further refinement, the diatomite product may have a permeability between 1.0 darcy and 20 darcy. In a further refinement, the diatomite product may have a permeability between 1.5 darcy and about 9 darcy. In a further refinement, the diatomite product may have a permeability between 1.5 darcy and 4 darcy.

In an embodiment, the crystalline silica content may be less than about 0.1 wt % of the diatomite product.

In an embodiment, the diatomite product may have a biogenic silica content of at least 75 wt %. In a refinement, the diatomite product may have a silica content at least 80 wt % silica. In a further refinement, the diatomite product may have a silica content at least 85 wt % silica.

In an embodiment, the diatomite may have an opal-C content of more than about 1 wt % of the diatomite product. In a refinement, the diatomite product may have an opal-C content of more than about 10 wt % of the diatomite product.

In an embodiment, the diatomite product may further comprise more than about 4 wt % combined total of aluminum and iron in mineral form, or more than about 7 wt % expressed as oxides. In another embodiment, the diatomite product may further comprise more than about 2.6 wt % aluminum in mineral form, or more than about 5 wt % expressed as aluminum oxide. In another embodiment, the diatomite product may further comprise more than about 1.75 wt % iron in mineral form, or more than about 2.5 wt % expressed as iron oxide. In an embodiment, measurement as oxide(s) may be determined by wave-length dispersive x-ray fluorescence (XRF) analysis.

In an embodiment, the diatomite product may be a regenerated filtration medium that has been used previously one or more times as a filtration medium and has been regenerated by either a chemical or thermal process. The regenerated filtration medium may be adapted for re-use in filtration processes for at least one of food, beverages, chemicals, fuels, materials, water or biopharmaceuticals. In a refinement, the chemical or thermal process may be pyrolysis, solvent extraction or gasification.

In an embodiment, the diatomite product may further comprise a soluble calcium content between about 21 ppm and 900 ppm, as measured by the EBC method.

In an embodiment, the diatomite product may further comprise less than about 160 ppm soluble iron as measured by EBC methods. In a refinement, the diatomite product may further comprise less than about 45 ppm soluble iron as measured by EBC methods. In another refinement, the diatomite product may comprise between about 23 ppm and 45 ppm soluble iron, as measured by the EBC method.

In an embodiment, the diatomite product may further comprise less than about 15 ppm soluble iron as measured by ASBC methods. In a refinement, the diatomite product may further comprise between about 4 ppm and about 14 ppm, beer soluble iron, as measured by the ASBC method.

In an embodiment, the diatomite product may further comprise a soluble iron content of about 13 to 14 ppm prior to any post-calcining hydration treatments, as measured by the ASBC method.

In an embodiment, the diatomite product may further comprise less than about 160 ppm soluble aluminum as measured by EBC methods. In a refinement, the diatomite product may further comprise less than about 120 ppm soluble aluminum as measured by EBC methods. In a further refinement, the diatomite product may further comprise less than about 75 ppm soluble aluminum as measured by EBC methods.

In an embodiment, the diatomite product may further comprise less than about 1 ppm soluble arsenic as measured by EBC methods. In an embodiment, the diatomite product may further comprise less than about 10 ppm soluble arsenic as measured by EBC methods.

In an embodiment, the diatomite product may optionally have a cristobalite content determined by a method that differentiates between cristobalite and opal-C. In a refinement, the cristobalite content was determined through use of the LH method.

In any one of the embodiments above, the diatomite product may be a particulate product. In any one of the embodiments above, the sodium flux-calcined diatomite may be in particulate form.

In any one of the embodiments above, the diatomite product may be in powdered form. In any one of the embodiments above, the sodium flux-calcined diatomite may be in powdered form.

In any one of the embodiments above, the crystalline silica may be respirable crystalline silica.

In another embodiment, the diatomite product may have been acid washed and rinsed to reduce soluble impurities.

In another embodiment, the diatomite product may be a treated product that has undergone a hydration process to reduce beer soluble iron, as measured by the ASBC method.

In accordance with another aspect of the disclosure, a method of manufacturing a diatomite product is disclosed. The method may comprise selecting a diatomite ore that includes more than about 2.6 wt % aluminum in mineral form or more than about 5 wt % as aluminum oxide, and calcining the diatomite ore with a sodium flux, wherein the diatomite product manufactured comprises sodium flux-calcined diatomite that has a crystalline silica content of less than about 1 wt % and a permeability between 0.8 darcy and about 30 darcy.

Also disclosed is a method of filtering beer or wine using a composition as a precoat or bodyfeed in primary or secondary filtration, the composition comprising any one of the diatomite products described above. In a refinement of the method, the use may be in secondary filtration and the composition may further comprise one of silica xerogel, silca hydrogel, tannin, or PVPP.

In accordance with another aspect of the disclosure, a process for using any one of the diatomite products above is disclosed. In an embodiment, the process may comprise using any one of the above diatomite products as a filtration medium. In a refinement, the process may comprise using any one of the diatomite products described above as a filtration medium in filtration applications, in cellular separation, or in blood plasma processing and fractionation.

In accordance with another aspect of the disclosure, a method of regenerating a composition is disclosed. The method may comprise treating the composition with a liquid characterized by a pH of between about 7 and about 12. In an embodiment, the composition may comprise any one of the diatomite products described above and one of silica xerogel, silca hydrogel, tannin, or PVPP.

In accordance with another aspect of the disclosure, a method of regenerating a composition is disclosed. The method may comprise applying thermal energy to the composition, the composition may include any one of the diatomite products described above and one of silica xerogel, silica hydrogel, tannin, or PVPP.

In accordance with another aspect of the disclosure, a process is disclosed for using any one of the diatomite products described above as a component or additive in filter sheets, cartridges or other manufactured filtration products.

BRIEF DESCRIPTION OF THE DRAWINGS

FIGS. 31*a-b* illustrate a graph and table showing the Particle Size Distribution (PSD) of sample 18188-4;

FIGS. 32*a-b* illustrate a graph and table showing the Particle Size Distribution of sample FP-3 B17E2.

DETAILED DESCRIPTION

Figure 1:
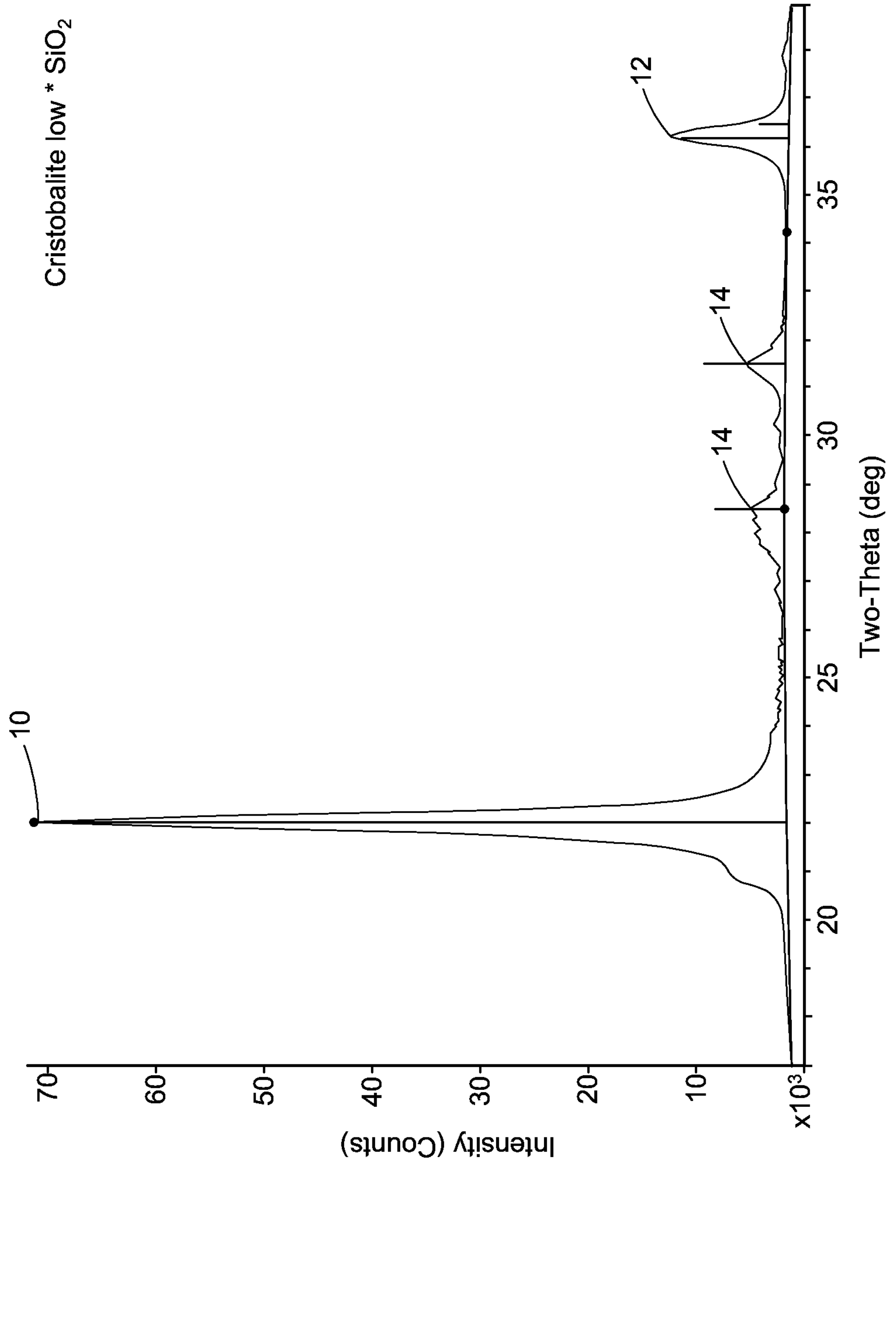
FIG. 1 is a graph of the X-ray Diffraction (XRD) pattern of Celite® 501 (sample #18362) with cristobalite phase plus minor (1 to 2 wt %) feldspars.

Historically it has not been possible for producers of straight-calcined and flux-calcined diatomite to distinguish between certain forms of opal (such as opal-CT and opal-C, which are also often found in products comprising straight-calcined and flux-calcined diatomite) and cristobalite and to accurately quantify such components, because test methods to distinguish and accurately quantify mineral phases of silicon dioxide in diatomite products have not existed. As a result, a number of products comprising straight-calcined and flux-calcined diatomite, which have been characterized by traditional analytical techniques, have included Silica Documentation that overstates the actual content of crystalline silica. As a result, it has not been possible to provide products comprising straight-calcined and flux-calcined diatomite with regulatory and technical support features that correctly document that these products may not contain cristobalite above detection limits while also not containing quartz or tridymite above detection limits, i.e. the appropriate Silica Documentation. This is important with regard to the practical application of these products. If the products do not comprise the appropriate Silica Documentation, unneeded restrictions in their use and unnecessary costs of compliance can accrue, limiting their applicability and possibly resulting in substitution by less efficacious products or technologies.

X-ray Diffraction (XRD) has traditionally been used to identify and quantify crystalline silica phases in diatomite products. This method is well-established, and is generally able to quantify at levels of 0.1 wt % and above except in some cases where interfering crystalline phases exist. The problem with XRD is not in the technique itself, but in the understanding of the results. The diffraction patterns of cristobalite and the opaline phases of diatomite (opal-CT and opal-C) are somewhat similar. Analysts have misidentified opal-C or opal-CT as cristobalite based on the location of the primary diffraction peak, and any discrepancies in the XRD pattern have been either attributed to faults and irregularities in the crystal structure, to small crystallite size, or to instrumental error. A complicating factor related to crystal structure and size is that the XRD pattern of cristobalite formed through thermal treatment of diatomite is always subtly different from that of cristobalite formed through thermal treatment of quartz sand (the defacto 'standard" cristobalite crystal structure). Whether this difference is due to non-siliceous impurities in diatomite, to the morphology of amorphous diatom frustules, or to other factors is unknown. However, the slight ambiguity it causes adds to the uncertainty of correct phase identification. Another source of confusion is that cristobalite exists in two forms, α-cristobalite and β-cristobalite. β-cristobalite is the high temperature phase and it inverts to the α-cristobalite phase at between 200 and 300° C., thus the α-cristobalite phase is the one that typically exists at ambient conditions. However, through mechanical constraints and chemical impurities, the β-cristobalite phase can sometimes resist complete inversion (see Damby et al). β-cristobalite has an XRD pattern even more closely aligned with opal-C than does α-cristobalite.

In recent years, a number of studies, including those by Miles et al. and Hillier et al., have shown that the standard analytic techniques used to determine the cristobalite content of mixtures of minerals, such as clays and diatomites, which rely solely on x-ray diffraction (XRD), may not be able to accurately differentiate between certain forms of opal, such as opal-C, and cristobalite. Both Miles and Hillier have proposed new methods of differentiating between cristobalite and opal-C, and these methods have been particularly effective when the opal-C is naturally-occurring, as is the case in certain clay products. However, these methods, which rely on the dissolution of the opaline content of a clay product or ore (the "Dissolution Methods"), are not as effective in the characterization of the opal-C content of certain types of rocks which comprise diatomite, where other mineral constituents may shield the opal-C from exposure to solvents.

A better method than the Traditional Methods (as defined herein) or the Dissolution Methods is desired to allow for a determination of the opal-C (and/or opal-CT) and cristobalite content of a broad range of compositions of diatomaceous earth. As used herein, "Traditional Methods" means the use of XRD analysis to measure and quantify (using such measurements) crystalline silica phases in a diatomite product(s) without regard to whether opaline phases (opal-C and opal-CT) or cristobalite are actually present, and assuming that said opaline phases are actually cristobalite. Each of cristobalite, quartz, or tridymite can be compared to its respective standard (for example NIST SRM 1878b for quartz) for quantification of the content, or be quantified through the use of an internal standard (such as corundum) and applicable relative intensity ratios. National Institute for Occupational Safety and Health (NIOSH) Method 7500 is an example of a Traditional Method for measuring respirable crystalline silica in dust samples, including dusts comprising diatomaceous earth. Method 7500 references a number of possible interfering phases, including micas, feldspars, and clays, but no mention is made of opal-C or opal-CT, and there is nothing in the test method providing for the quantification of these phases. In Traditional Methods, the quantification of the crystalline silica phases in diatomite product(s) includes the opaline phase (opal-C and opal-CT) content as well. More specifically, such Traditional Methods treat the opaline phases as if they were cristobalite and, as such, quantify the combination of cristobalite plus opaline phases as the "cristobalite content" of a product; this results in an overstatement of the cristobalite content of the product (and an overstatement of the crystalline silica content of the product).

The inventors have developed a new technique to characterize and quantify the opal-C, and cristobalite content of products. Differentiation between opal-C and opal-CT is not attempted in this disclosure. While it is not likely that both opal-C and opal-CT are present at the same time in the products discussed herein, if both phases are present the opal-C and opal-CT phases are not considered separately. Instead, the total of both phases is identified as opal-C and quantified in total (by wt %) as opal-C. In other words, if both phases are present they are treated collectively as if they were part of one phase. Hence, the term opal-C is used herein to mean opal-C and/or opal-CT, unless indicated otherwise by the context in which it is used.

They have used their new technique to characterize and quantify the opal-C (and/or opal-CT) and crystalline silica content (for example, cristobalite) of a number of commercial diatomite products that are either straight-calcined or flux-calcined and have determined that certain straight-calcined products and certain flux-calcined products for which the physical components are already in the public domain contain significant levels of opal-C (and/or opal-CT) but no detectable levels of cristobalite. This result, is both surprising and unexpected because these products had previously been determined, using the Traditional X-ray Diffraction technique, to contain detectable levels of cristobalite, and, as a result, the Silica Documentation components of these products is incorrectly overstated.

Further, in an equally surprising and unexpected result, the inventors have identified diatomite ores of certain compositions which can be flux-calcined using sodium-containing fluxes to produce novel products containing significant levels of opal-C (and/or opal-CT), but no detectable levels of crystalline silica. These opaline flux-calcined biogenic silica products can also meet other stringent requirements of particulate filtration media, such as low wet bulk density and low extractable iron, calcium, aluminum and arsenic. They can also be combined with other materials such as silica xerogels and hydrogels, tannins, and polyvinylpolypyrrolidone (PVPP) to make them more effective in specialized solid-liquid separations such as those common to wine and beer-making. In addition, these opaline flux-calcined biogenic silica products can be further treated by acid-washing to improve their suitability for use in high purity filtrations such as those related to specialty beverages, specialty chemicals and biopharmaceutical manufacturing. Acid washing improves their suitability because it removes trace impurities present in the products that can be potentially dissolved and transferred to the high purity suspensions being filtered. Due to the concerns associated with the inhalation of crystalline silica, there is a need for straight-calcined and flux-calcined diatomite products that do not contain crystalline silica. Significant effort has been devoted to the development of straight-calcined and flux-calcined diatomite products comprising reduced levels of crystalline silica with limited technical and essentially no commercial success. For flux-calcined products, which have traditionally been produced as white, bright powders that are classified to produce co-product filler and filter aid products, the efforts have concentrated on the development of white flux-calcined products containing low or no crystalline silica because the specifications for flux-calcined diatomite fillers require that the products possess high brightness and whiteness.

For one of the present inventions, the inventors decided to concentrate on the development of flux-calcined filter aids containing reduced or non-detectable levels of crystalline silica without regard for the color of the product and have been successful. While these novel products, which comprise both novel physical components and novel Silica Documentation, have limited utility as functional additives in many applications, they have outstanding utility when used as filtration media.

To make crystalline silica-free flux-calcined biogenic silica products requires proper ore selection, defined calcining conditions and post-calcination treatment, and proper characterization of silica phases and documentation thereof. Ore selection not only involves an evaluation of the diatom assemblage present and condition of the frustules, but also characterization of associated detrital and precipitated minerals. Diatom species come in a variety of shapes and sizes, and the species present in any particular diatomite deposit do influence the physical characteristics of finished products made therefrom. For example, some assemblages are more suitable for specific filtration applications than others. Also, the overall condition or integrity of the diatom frustules influences characteristics of the final products. Some diatomite deposits or strata therein contain a plethora of small frustule fragments and very few whole diatom frustules. Products made using such raw materials reflect this starting morphology by, for example, having very low permeability. Any quartz grains (associated detrital mineral) present in the ore must be characterized as to relative quantity and nominal size so that predictions can be made as to the feasibility of removing this phase during processing. Some ores are unsuitable because the quartz grains are too fine (sub-micron) and finely-dispersed within the diatomaceous matrix. In addition to quartz, the non-siliceous materials within the ore are of critical importance. Diatomaceous ores that do not contain extremely fine-grained aluminum and iron-bearing minerals (associated detrital and/or precipitated minerals) in sufficient quantity tend to de-vitrify when flux-calcined and quickly form cristobalite. Processing conditions are also important, although the quantity of flux and temperature of calcination are within the normal range for flux-calcined diatomite products in general. Extremely high temperatures (>1150° C.) and flux amounts (>8 wt % as $Na_2CO_3$) should be avoided. Finally, these products also comprise proper Silica Documentation. Without this essential element, their utility can be greatly and unnecessarily restricted. Proper Silica Documentation results from the use of the novel test methods/quantification described herein.

Description of the Test Methods

Opal-C (and/or Opal-CT) Vs. Cristobalite

There are distinguishing characteristics between opal-C (and/or opal-CT) and cristobalite that can be measured, albeit not always precisely. Opals always contain some water existing as internal or attached silane groups, while cristobalite is anhydrous. Thus, it is possible to perform a "loss on ignition test" to see if water of hydration exists in a sample. Such a test should be carried out at high temperature (for example 980° C.-1200° C., preferably, 982° C.-1000° C.) for a sufficient time (at least 1 hour) so that chemically-bound water has a chance to disassociate and volatilize. Precise measurement of sample mass (to the nearest 0.1 mg) before and after this treatment allows quantification of volatiles, including the water of hydration, with a resolution to better than 0.01%. American Society for Testing and Materials (ASTM) method C571 provides a suitable protocol for determination of loss on ignition of samples comprising diatomite. Samples that are determined to contain measurable (generally over 0.1 wt %) loss on ignition have the potential to be opal-C (and/or opal-CT).

XRD, such as bulk powder XRD, can also be used to differentiate between opal-C and α-cristobalite. The diffraction pattern of cristobalite contains sharp Bragg's peaks, most notably at 22.02°, 36.17°, 31.50°, and 28.49° $2^\theta$. The diffraction pattern of opal-C (and/or opal-CT) is less well-defined as compared to cristobalite, with broader and fewer peaks that may be indicative of radial scattering and not true Bragg's peaks. The locations of the primary and secondary peaks are similar to that of cristobalite, but the peaks at 31.50° and 28.49° $2^\theta$ are missing or very poorly developed. To summarize, the opal-C (and/or opal-CT) diffraction pattern differs from that of α-cristobalite in the following ways: the primary peak (22°) and the secondary peak (36°) are at higher d-spacing (lower 2θ angle), there is a broader primary peak for opal-C (and/or opal-CT) as measured using the "Full Width at Half Maximum" (FWHM) statistic, opal-C (and/or opal-CT) has poorly-defined peaks at 31.50° and 28.49° 2θ, and a much more significant amorphous background. For a more complete description of XRD, for example bulk powder XRD, terminology and practice, the volume by Klug and Alexander on XRD practice is hereby referenced.

Differentiating opal-C from β-cristobalite using XRD is more difficult, however Chao and Lu demonstrated that by grinding samples of β-cristobalite with alumina content less than 10 wt % to fine particle size, most of the β-cristobalite is inverted to the α-cristobalite phase with corresponding XRD pattern peak shifts. This does not occur when diatomite products comprising opal-C (and/or opal-CT) are finely ground and then analyzed using XRD—there is no peak shift. As a matter of standard XRD practice, all samples described herein were milled prior to bulk powder X-ray Diffraction analysis.

Where differentiation based just on XRD pattern is difficult, Miles et al. advocate a twenty-four hour thermal treatment of the sample at very high temperature (1050° C.). Theoretically, opal-C will de-hydrate and re-crystallize as cristobalite. Diffraction peaks will become sharper, more intense, and will shift. Sharper diffraction peaks are indicative of increasing long-range molecular order (larger crystallite size). Increasing peak intensity indicates an increasing quantity of the crystalline phase represented by the peak. A shift in peak location indicates a change in crystal structure with associated increase or reduction in d-spacing. If cristobalite is present in the original sample, the diffraction pattern will not change significantly. The potential problem with this technique is where a sample is comprised of individual particles, some of which could be opaline and others of which could be composed of cristobalite. Heating of such a sample would convert the opaline phase to cristobalite but not affect the cristobalite, and not much of an argument can subsequently be made that cristobalite was not also present in the original sample.

Another problem exists with the chemical dissolution techniques of Miles, Hillier and others. Hillier et al. successfully demonstrated the efficacy of a sodium hydroxide digest in determining whether various clay samples contained opaline phases or cristobalite. NaOH is capable of dissolving all forms of silica, but requires more contact time for the crystalline varieties in comparison to the opals. When used on diatomite samples (natural, straight-calcined, and flux-calcined), Hillier's method was not found to entirely remove the opaline phases, including opal-A. This is most likely because diatomite particles are coated with chemically-resistant precipitates in the natural state (such as limonite), iron oxides when straight-calcined, and a sodium-rich vitreous or glass-like phase when flux-calcined. While extending the NaOH contact time does increase the dissolution of the opaline phases, results can be inconsistent between diatomaceous product samples produced using varying processes and from different raw materials.

One relatively simple way to confirm the absence of cristobalite within a sample is to spike the sample (add a known amount of) with cristobalite standard reference material (i.e. National Institute of Standards and Technology (NIST) Standard Reference Material 1879A), run XRD analysis on the spiked sample and then compare the original un-spiked sample diffraction pattern with the spiked sample pattern. If the spiked sample diffraction pattern simply increases the intensity of the primary and secondary peaks but does not show a position shift or show additional peaks, then the original sample most likely contains cristobalite. If the primary peak shifts and becomes sharper (or resolves into two separate peaks), and secondary peaks appear or become much better defined, then opal-C (and/or opal-CT) and not cristobalite is present in the original sample.

In summary, to determine whether a sample of a product that includes diatomite contains cristobalite or opal-C (and/or opal-CT) then to quantify the opal-C (and/or opal-CT) and/or crystalline silica content involves a number of steps according to the Improved Method disclosed herein, hereinafter referred to as the "LH Method."

First, it is determined whether the sample contains water of hydration via high temperature loss on ignition testing. For example, a (representative) first portion of the sample is obtained and loss on ignition testing is performed on such first portion.

Second, bulk powder X-ray Diffraction is performed, and the resulting (first) diffraction pattern inspected. For example, preferably, a (representative) second portion of the sample is obtained and bulk powder XRD is performed on the second portion. Preferably, the second portion is milled prior to XRD. The resulting (first) diffraction pattern is analyzed for the presence or absence of opal-C (and/or opal-CT) and cristobalite. The resulting (first) diffraction pattern may also be analyzed for the presence or absence of other crystalline silica phases (for example, quartz and tridymite) within the (representative) second portion of the sample. If the (first) diffraction pattern is obviously indicative of opal-C (or opal-CT), then further analysis is not required to determine whether the sample contains cristobalite or opal-C (and/opal-CT). As discussed previously herein, the opal-C (and/or opal-CT) diffraction pattern differs from that of α-cristobalite in the following ways: the primary peak (22°) and the secondary peak (36°) are at higher d-spacing (lower 2θ angle), there is a broader primary peak for opal-C (and/or opal-CT) as measured using the "Full Width at Half Maximum" (FWHM) statistic, opal-C (and/or opal-CT) has poorly-defined peaks at 31.50° and 28.49° 2θ, and a much more significant amorphous background.

If the (first) diffraction pattern is questionable with regard to whether opal-C (and/or opal-CT) and/or cristobalite is present, then according to the LH Method a second XRD analysis is performed to determine whether opal-C (and/or opal-CT) and/or cristobalite is present. This time the analysis is performed on, preferably, another representative portion of the sample spiked with cristobalite standard reference material (NIST 1879a). For example, a (representative) third portion of the sample is obtained and then spiked with cristobalite standard reference material (NIST 1879a) and XRD is performed on the third portion. The resulting (second) diffraction pattern from the XRD on the third portion is analyzed. Preferably, the third portion is milled prior to XRD. If the original sample (for example, the representative second portion of) comprises opal-C (and/or opal-CT), the cristobalite spike significantly modifies the diffraction pattern (from that of the second portion) with additional peaks identifiable at 22.02° and 36.17° 2θ, along with more prominent peaks at 31.50° and 28.49° 2θ seen in the (second) diffraction pattern of the third portion. If the original sample (more specifically, the second portion of) comprises cristobalite, then addition of the cristobalite spike (to the third portion) only results in increased peak intensity and no other significant change from the (first) diffraction pattern of the second portion (as seen in the (second) diffraction pattern of the third portion).

Quantifying the opal-C (and/or opal-CT) content of a diatomite sample can be complicated as its diffraction pattern is a combination of broad peaks and amorphous background, and diatomite products often contain other x-ray amorphous phases in addition to opal. According to the LH Method, an estimate of the quantity is obtained by treating the opal-C (and/or opal-CT) peaks (collectively, if both phases are present) of the first diffraction pattern as if they are cristobalite and quantifying against cristobalite standards such as NIST 1879a. This method of quantification of opal-C (and/or opal-CT), which we call the XRD Method, will usually underestimate the opal-C (and/or opal-CT) content but is effective for a number of purposes, such as manufacturing quality control. For clarity, this XRD Method is part of the umbrella LH Method. Alternatively (under the LH Method), a measure may be obtained by heating a representative portion of the sample (for example, a fourth portion) at very high temperature (e.g., 1050° C.) for an extended period (for example 24 to 48 hours) until that heated portion is fully dehydrated. This completely dehydrates opaline phases and forms cristobalite (reduces amorphous background component). XRD analysis is then performed on the fourth portion and the cristobalite in the resulting (third) diffraction pattern of the fourth portion can be quantified against the cristobalite standards to give an estimate of original opal-C (and/or opal-CT) content. Preferably, the fourth portion is milled prior to XRD. As long as additional flux is not added prior to heating the fourth portion, and the temperature kept below 1400° C., any quartz present in the fourth portion will not be converted to cristobalite.

To obtain the total crystalline silica content wt % of the sample according to the LH Method, the weight percentage of the identified cristobalite (if any), the weight percentage of the quartz (if any) and the weight percentage of tridymite (if any) are added together to calculate the total weight percentage of the crystalline silica content in the sample. To obtain the weight percentage of quartz or tridymite found to be present during the analysis of the (first) diffraction pattern of the second portion of the sample, each of quartz or tridymite may be compared to its respective standard (for example, NIST SRM 1878b for quartz) for quantification of the content, or be quantified through the use of an internal standard (such as corundum) and applicable relative intensity ratios. If it is determined by the LH Method that cristobalite is present, the cristobalite seen in the (first) diffraction pattern of the second portion of the sample, may be compared to its respective standard (for example NIST 1879a) for quantification of the content, or be quantified through the use of an internal standard (such as corundum) and applicable relative intensity ratios. In the unusual case where there is both opal-C (or opal-CT) and cristobalite present and the primary peak of the opal-C (or opal-CT) cannot be differentiated or de-convoluted from that of cristobalite, the opal-C (or opal-CT) and cristobalite are quantified as one phase and reported as cristobalite. The quantity of cristobalite thus reported will be higher than the actual quantity in the sample. Because the sample is a representative sample of the product, the total weight percentage of the crystalline silica content in the sample is considered to accurately represent the total weight percentage of the crystalline silica content in the product from which the sample was taken.

All of the bulk powder XRD work detailed herein was performed using a Siemens® D5000 diffractometer controlled with MDI™ Datascan5 software, with CuKα radiation, sample spinning, graphite monochromator, and scintillation detector. Power settings were at 50 KV and 36 mA, with step size at 0.04° and 4 seconds per step. JADE (2010) software was used for analyses of XRD scans. Sample preparation included SPEX® milling in zirconia vials with zirconia grinding media.

Permeability and Wet Bulk Density

Permeability and bulk density of diatomite filter media are determined using various established methods. These parameters are useful in characterizing how diatomite products perform in filtration applications. The samples described herein were analyzed for these properties using a Celatom Permeameter (U.S. Pat. No. 5,878,374), which is an automated instrument that forms a "filter cake" from a diatomite sample of known mass and then measures all required parameters needed to calculate permeability and wet bulk density. The equations for calculating wet bulk density (WBD) and permeability are listed below:

$$\text{Wet Bulk Density (g/ml)}=m/(h*A)$$

$$\text{Permeability (Darcy)}=(V*u*h)/(A*\text{dP}*t)$$

Where:

A=cross-sectional area of the cake ($cm^2$)

dP=pressure drop across the cake (atm)

t=time of flow (s)

m=dry sample mass (g)

u=filtrate viscosity (cp)

V=filtrate volume (ml)

h=cake height (cm)

EBC Soluble Metals (Iron, Calcium, Aluminum, Arsenic)

The European Brewery Convention (EBC) has established a compendium of accepted test methods, including one designed to determine the soluble metal contribution of filter media to filtrate (i.e. beer). The EBC soluble metals test consists of suspending the sample (2.5% slurry concentration) for two hours at ambient temperature in a 1% solution of potassium hydrogen phthalate (pH of 4), filtering the suspension, and then analyzing the filtrate for metals content using AA or ICP spectrophotometers.

ASBC Iron

The American Society of Brewing Chemists (ASBC) also has established a set of test methods related to the manufacture of beer, and it includes one used to determine the soluble iron contribution to beer from filter media. This method is widely used in North America. The test calls for suspending the filter aid in de-gassed, room temperature beer (2.5% slurry concentration) for 6 minutes, filtering the suspension, and analyzing the filtrate for iron pickup using either a colorimetric method or atomic adsorption instrumental analysis.

Optical Properties

The optical properties of products may be characterized using the color space defined by the Commission Internationale de I'Eclairage (CIE), as the L*a*b* color space. The "L*" coordinate is a measure of reflected light intensity (0 to 100). The "a*" coordinate is the degree of redness (positive value) or greenness (negative value). The "b*" coordinate is the degree of yellowness (positive value) or blueness (negative value). A Konica Minolta® Chromameter CR-400 was used to measure the optical properties of samples described herein.

It has been observed that under the same calcining conditions (same flux amount and calcination temperature), flux-calcined products from diatomaceous ores of differing chemistry will have different color and brightness as expressed in terms of the L*a*b* color space. It has also been observed that the color of a flux-calcined product, especially the b* value inversely correlates well with the quantity of opal-C (and/or opal-CT) (as measured using the XRD Method) contained therein.

Respirable Cristobalite and Quartz

In order to address the issue of "how much respirable crystalline silica (RCS) is contained in a bulk material," the IMA Metrology Working Group developed a standardized methodology called the SWeRF—Size-Weighted Respirable Fraction (since changed to SWeFF, or Size-Weighted Fine Fraction). This approach quantifies the content of respirable particles in a bulk product which, if inhaled when made airborne, might reach the alveoli. It takes into account the particle size distribution (PSD) fractions as defined in the CEN EN481 Standard of the European Committee for Standardization (which includes a particle density factor), and the crystalline silica content of these particles, and is called the Size-weighted Fine Fraction—crystalline silica (SWeFFcs). This methodology was used with regard to the sample results reported herein. Bulk sample XRD was performed on the minus 500 mesh (25 um) fraction of each sample to determine the crystalline silica content of the fine fraction. Particle size distribution of each original sample was determined using a Microtrac® S3500 (ultrasonic dispersion, particle Refractive Index (RI) of 1.48, fluid RI of 1.333, irregular particle shape, transparent particles). An average particle density of 1.15 was also used in the SWeFF calculations.

Crystalline Silica Contents of Natural, Straight-Calcined and Flux-Calcined Diatomite Products Comprising Physical Components Already in the Public Domain Tables 1, 2 and 3 show the crystalline silica contents of a large number of natural, calcined and flux-calcined diatomite products, as reported in the crystalline silica data section of Safety Data Sheets (SDS) of EP Minerals, Imerys Filtration Minerals, Ceca, Dicalite Corp., and Showa Chemical. EP Minerals, Imerys Filtration Minerals, Ceca, Dicalite Corp. and Showa Chemicals are manufacturers of natural, calcined and flux-calcined diatomite products. "Celatom" is a trademark of EP Minerals. "Celite", "Kenite", and "Celpure" are trademarks of Imerys Filtration Minerals, "Clarcel" is a trademark of Ceca, "Radiolite" is a trademark of Showa Chemicals, and "Dicalite" is a trademark of Dicalite Corp. The table also shows the approximate permeability ranges of the diatomite products corresponding to the Silica Documentation.

As the tables show, the natural products, which are diatomite products that are processed thermally at temperatures sufficient to dry the material but low enough to prevent significant dehydration of the Opal-A component of the diatomite and also significant agglomeration of the diatomite, are available in permeability ranges of less than 0.01 to slightly over 0.1 darcy. Due to the lower processing temperatures, natural diatomite products have generally been reported as containing low or no measurable levels of crystalline silica, although some products contain up to about 4 wt % crystalline silica, generally in the form of quartz.

The tables also show that, based on Traditional Methods employed by the companies that supply the products listed therein, all commercial straight-calcined and flux-calcined diatomite products contain detectable levels of crystalline silica. The ranges of permeability and crystalline silica contents for these products are 0.01 to over 20 darcy and less than 5 wt % to over 90 wt % crystalline silica content.

TABLE 1

SDS Documentation and Permeability Range for Natural Diatomite Products Comprising Physical Components Already in the Public Domain

| | Product | | | Safety Data Sheet Information | | | | | |
|---|---|---|---|---|---|---|---|---|---|
| Producer | Grades | Perm. Darcy | Made in | Quartz wt % | Crist. wt % | For | Doc. # | Rev. | Year |
| EP | Celatom MN-2, FN-1, FN-2, FN-6 | 0.01-0.12 | US | | | US | | 9 | 2015 |
| EP | Celatom MN-3, MN-4, MN-4HT, MN-23, LCS-3 | n/a | US | | | US | | 9 | 2015 |
| EP | Celatom MN-47, MN-51, MN-53, MN-74, MN-84, Drill-n-Dry ™, Natural Crude Ore | n/a | US | | | US | | 9 | 2015 |
| EP | Celatom MP77, MP78, MP79 | n/a | US | | | US | | 9 | 2015 |
| EP | Natural DE AFA | n/a | US | | | US | | 9 | 2015 |
| Imerys | Celite for Concrete | n/a | Fernley, NV, US | | | US | 2213 | 5 | 2015 |
| Imerys | Diafil - all grades | n/a | Fernley, NV, US | | | US | 2800 | 7 | 2015 |
| Imerys | Celpure S25, C25, C25i | 0.025 | Lompoc, CA, US | | | US | 3105 | 10 | 2015 |
| Imerys | Celpure S65, C65, P65, NP, 65i | 0.065 | Lompoc, CA, US | | | US | 3110 | 13 | 2015 |
| Imerys | C206, C209, C209C, C230, C266, C266C, C292, C321, C392, C410, C441, C500, FC, Snow Floss, Snow Floss C, Celite for Concrete, Sil-O-Cel | n/a | Lompoc, CA, US | <4 | <3 | US, Asia | 2200 | 12 | 2015 |

TABLE 1-continued

SDS Documentation and Permeability Range for Natural Diatomite Products Comprising Physical Components Already in the Public Domain

| Producer | Product: Grades | Product: Perm. Darcy | Product: Made in | Safety Data Sheet Information: Quartz wt % | Safety Data Sheet Information: Crist. wt % | Safety Data Sheet Information: For | Safety Data Sheet Information: Doc. # | Safety Data Sheet Information: Rev. | Safety Data Sheet Information: Year |
|---|---|---|---|---|---|---|---|---|---|
| Imerys | Celite S, Kenite 100, Filter Cel, Filter Cel LV | n/a | Zacoalco, Mexico | | | US, Lat. Am. | 3225 | 5 | 2015 |
| Imerys | C209, C221, C221M, C221C, C280, C289, C400, C400A, C400D, C400TC, C490, C MNPP, Diactiv 21, Snow Floss | n/a | Zacoalco, Mexico | | | US, Lat. Am. | 2209 | 10 | 2015 |
| Imerys | CelTiX, CelTiX-P | n/a | Zacoalco, Mexico | | | US | 2214 | 7 | 2015 |
| Imerys | Diactiv 17, Diactiv 117, Diactiv 18C, Diactiv 18D, Ultrafiltracion | n/a | Arica Chile | <1 | <1 | Lat. Am. | 3520 | 6 | 2010 |
| Dicalite | Dicalite 104, 143, 153, 183, BP3, BP5, BP8, CC1, CA3, SA3, D4A, D4C, D4R, IG3, IG33. | n/a | US | <3 | <5 | Europe | 0011 | 3 | 2003 |
| Dicalite | Dicalite 104, 183, BP-3, BP-5, CA-3, CA-5, D4A, D4C, D4R, D4AFA, 677, 677S, SA3 | n/a | US | <2 | | | 002 | 0 | 2014 |

TABLE 2

SDS Documentation and Permeability Range for Calcined Diatomite Products Comprising Physical Components Already in the Public Domain

| Producer | Product: Grades | Product: Perm. Darcy | Product: Made in | Safety Data Sheet Information: Quartz wt % | Safety Data Sheet Information: Crist. wt % | Safety Data Sheet Information: For | Safety Data Sheet Information: Doc. # | Safety Data Sheet Information: Rev. | Safety Data Sheet Information: Year |
|---|---|---|---|---|---|---|---|---|---|
| EP | Celatom ® FP-1, FP-2, FP-22 | 0.01-0.15 | US | | <5 | US | | 14 | 2014 |
| EP | Celatom ® FP-3, FP-4, FP-6, FP-12 | 0.14-1.2 | US | | 10-40 | US | | 13 | 2014 |
| Imerys | Celpure S100, C100, P100 | 0.1 | Lompoc, CA, US | <1 | <10 | US | 3113 | 8 | 2015 |
| Imerys | Celpure S300, C300, P300 | 0.3 | Lompoc, CA, US | <1 | <15 | US | 3115 | 12 | 2015 |
| Imerys | C350, C507 | <0.02 | Lompoc, CA, US | <3 | <35 | US, Asia | 2303 | 2 | 2015 |
| Imerys | C577, C577 NF, Filter Cell, Filter Cell NF, Celite BPP | 0.1-0.2 | Lompoc, CA, US | <3.5 | <5.5 | US, Asia | 2320 | 8 | 2015 |
| Imerys | Std Super Cel, SSC, Std Super Cel BP | 0.2-0.3 | Lompoc, CA, US | <3 | <20 | US, Asia | 2310 | 6 | 2015 |
| Imerys | C3Z, C201, C270, C271, C350, C505, C507, C512, C512 Z, C520, Hyflo PZ, CR, X-3 | <0.9 | Lompoc, CA, US | <3 | <35 | US, Asia | 2300 | 11 | 2015 |
| Imerys | C315, C350, C505, C512, C512Z, C520, C520-CB, C577, Celite CM-7, Kenite 101, Kenite 200, Filter | <0.45 | Zacoalco, Mexico | <1 | <53 | US, Lat. Am. | 3230 | 12 | 2015 |

TABLE 2-continued

SDS Documentation and Permeability Range for Calcined Diatomite Products Comprising Physical Components Already in the Public Domain

| | Product | | | Safety Data Sheet Information | | | | | |
|---|---|---|---|---|---|---|---|---|---|
| Producer | Grades | Perm. Darcy | Made in | Quartz wt % | Crist. wt % | For | Doc. # | Rev. | Year |
| Dicalite | Cel M, Diactiv 14, Standard Super Cel PS, Dicalite 215, Superaid, UF, SA-UF, Speedflow, 231 | <0.5 | US | <5 | <20 | | 005 | 0 | 2014 |
| Ceca | Clarcel CBL | 0.025-0.05 | France | <20 | <20 | | 89316901 | 2.01 | 2003 |
| Ceca | Clarcel CBR | 0.08-0.2 | France | <20 | <60 | | 89346901 | 2.02 | 2005 |

TABLE 3

SDS Documentation and Permeability Range for Flux-Calcined Products Comprising Physical Components Already in the Public Domain

| | Product | | | Safety Data Sheet Information | | | | | |
|---|---|---|---|---|---|---|---|---|---|
| Producer | Grades | Darcy | Location | Quartz wt % | Crist. wt % | For | Doc. # | Rev. | Year |
| EP | Celatom ® FW-6, FW-12, FW-14, FW-18, FW-20, FW-40, FW-50, FW-60, FW-70, FW-80, SP | 0.4-7.5 | US | | 35-50 | US | | 12 | 2014 |
| EP | Celatom ® MW-25, MW-27, MW-31, Celabrite ®, Celabloc ® | n/a | US | | 40-70 | US | | 13 | 2014 |
| Imerys | Celpure S1000, C1000, P1000 | 1 | Lompoc, CA, US | <1 | <85 | US | 3125 | 11 | 2015 |
| Imerys | C110, C224, C226, C319, C501, C513, C522, FA for cooking oil, C HSC, Hyflo, HSC, X-4, X-5 | <1.3 | Lompoc, CA, US | <4 | <40 | US, Asia | 2400 | 12 | 2015 |
| Imerys | Aqual-Cel, C269, C503, C535, C545, C560, C566, C578P, C580, X-6, X-7 | <25 | Lompoc, CA, US | <4 | <50 | US, Asia | 2410 | 8 | 2015 |
| Imerys | C219, C233, C263, C281, C388, C427A, C499, SFSF, SF, White Mist, CWPP8 | n/a | Lompoc, CA, US | <2.5 | <70 | US, Asia | 2420 | 8 | 2015 |
| Imerys | C281, C535, C545, C555, C555R, C580, CPC, K300, K700, K1000, K2500, K3000, K5200, K5500, K5800, K7.5, Hyflo, Swimming Pools, X-4, X-5, X-6, X-7 | <25 | Quincy, WA, US | <1 | <60 | US, Asia | 3040 | 15 | 2015 |
| Imerys | Micro-Ken 118, 140, 800, 801, 805, 811, 900 | n/a | Quincy, WA, US | <1 | <93 | US, Asia | 3045 | 3 | 2015 |

TABLE 3-continued

SDS Documentation and Permeability Range for Flux-Calcined Products Comprising Physical Components Already in the Public Domain

| | Product | | | Safety Data Sheet Information | | | | | |
|---|---|---|---|---|---|---|---|---|---|
| | | | | Quartz | Crist. | | | | |
| Producer | Grades | Darcy | Location | wt % | wt % | For | Doc. # | Rev. | Year |
| Imerys | C281, C281D, C281 USA, C499, Super Floss, Super Floss MX, Super Floss Q | n/a | Zacoalco, Mexico | <1 | <77 | US, Lat. Am. | 3242 | 4 | 2015 |
| Imerys | C281, C499, C501, C501-F, C503, C508, C535, C545, Diactiv 12, Diactive 34, Hyflo AN, Hyflo Z, Hyflo ZS, Hyflo SC, Kenite 700, Kenite 300 | <1.1 | Zacoalco, Mexico | <1 | <77 | US, Lat. Am. | 3240 | 16 | 2015 |
| Imerys | C110, C281, C281-A, C281-M, C388, C427, C501, C501-A, C503, C508, C513, C535, C535-QM, C545, C545-D, Celite BP-1, Celite FCFA, Celite SW, Diactiv 34, Hyflo AN, Hyflo Z, Hyflo ZS, Hyflo Super Cel, Kenite 700, Kenite 1000, Kenite 2500, Kenite 3000, Super Floss, Super Floss-P, Super Floss-MX, Super Floss-Q, QP-HSC, C564 | <4 | Arica, Chile | <1 | <77 | Lat. Am. | 3580 | 2 | 2010 |
| Imerys | C503, C520A, C535, C545, Diactiv 7, Diactiv 8, Diactiv 9, Diactiv 10, Diactiv 11, Diactiv 12, Diactiv 13, Diactiv 14, Diactiv 14F, Diactiv 15F, Hyflo Super Cel, QS | <4 | Arica, Chile | <1 | <67 | Lat. Am. | 3540 | 6 | 2009 |
| Imerys | Diactiv 16, Microfiltrcion | | Arica, Chile | <1 | <51 | Lat. Am. | 3560 | 6 | 2010 |
| Dicalite | Dicalite 341, Speedplus, 375, Speedex, 2500, Swimpool, 4200, 4500, 4500C, 5000, 6000, 7000, WB-6, WB-6A | <12 | US | <5 | <70 | | 001 | 0 | 2014 |
| Ceca | Clarcel DIC, DICB, DICH, DIFB, DIFBO, DIFD, DIFN, DIFR, FD | | France | | 65 | | 891509-001 | 2.1 | 2011 |
| Showa | Radiolite #600, 700, 900, 900S, 1100, Ace II, F, Deluxe W-50 | | Japan, China | Amorphous silica may crystalize | | | SW-1 | | 2011 |

As can be seen in Tables 1, 2 and 3, it is a common practice in the industry for companies to report ranges of the crystalline silica content in their Safety Data Sheets. These ranges are sometimes expressed as "less than" a certain level of content. When this reporting format is used, it indicates that the product(s) contain detectable levels of either quartz or cristobalite, as the case may be, up to the numerical amount indicated. When there is no quartz or cristobalite present, the suppliers do not report a range for the level of content.

While the reporting methods, if understood, indicate which commercial products contain, based on the Traditional Methods, measurable amounts of quartz or cristobalite, the reporting methods do not provide a clear indication of the average or typical crystalline silica contents of these products. As a result, the inventors have included actual measurements of selected products in Table 4 (measured using the Traditional Methods).

Table 4 shows the permeabilities and crystalline silica contents (as determined using Traditional Methods) of a number of commercial diatomite products comprising physical components already in the public domain, as characterized in EP Minerals' Research and Development laboratories. The data in this table are consistent with the data of Tables 1, 2 and 3, and show that diatomite products characterized using traditional X-ray Diffraction techniques for crystalline silica content with permeabilities between 0.03 and 10 darcy all contain levels of crystalline silica above the detection limit, with the lowest percentage content of crystalline silica at a level of 0.1 wt % and the highest above 80 wt %. This table also shows that, when measured by using Traditional Methods, all straight-calcined and flux-calcined products contain measurable levels of crystalline silica and that some natural diatomite products do not contain measurable levels of crystalline silica.

TABLE 4

Estimates of Quartz and Cristobalite Contents Prepared through Traditional Methods for Commercial Diatomite Products Comprising Physical Components Already in the Public Domain

| Product | Sample ID | Permeability (Darcy) | Quartz (wt %) | Cristobalite (wt %) |
|---|---|---|---|---|
| Ceca Clarcel 78 | 23139 | 0.02 | 0.8 | 0.0 |
| Imerys Celite S | 20633 | 0.03 | 0.2 | 0.0 |
| Ceca Clarcel Dif N | 17956 | n/a | 0.0 | 80.4 |
| EP Minerals FN-2 | 25037 | 0.06 | 0.1 | 0.0 |
| EP Minerals MN-4 | 25061 | 0.01 | 0.0 | 0.0 |
| Dicalite Superaid | 19918 | 0.05 | 0.7 | 3.9 |
| Ceca CBL | 22602 | 0.06 | 11.0 | 15.0 |
| Ceca CBL-3 | 22603 | 0.03 | 3.0 | 7.0 |
| Ceca Clarcel CBR | 3234 | 0.14 | 8.1 | n/a |
| Imerys Celite 505 | 19154 | 0.04 | 0.7 | 4.2 |
| Imerys Celite 512 | 24081 | 0.43 | 3.0 | 12.0 |
| Imerys Celite 512 | 21881 | 0.79 | 11.4 | 25.2 |
| Imerys Celite Std. Supercel | 27115 | 0.20 | 4.4 | 4.7 |
| Imerys Celite 577 | 27116 | 0.10 | 1.9 | 3.3 |
| Showa Radiolite 200 | 27117 | 0.10 | 2.1 | 7.9 |
| Showa Radiolite 300 | 27118 | 0.20 | 3.5 | 14.7 |
| Imerys Cynergy 200 | 27121 | 0.20 | 2.1 | 3.4 |
| EP Minerals FP-2 | B12C0 | 0.20 | 0.0 | 16.0 |
| EP Minerals FP-3 | B17E2 | 0.24 | 0.0 | 18.6 |
| EP Minerals FP-4 | 2H11B4 | 0.37 | 0.0 | 38.1 |
| EP Minerals FP-6 | 2B11F1 | 0.70 | 0.0 | 71.1 |
| Imerys Celite 501 | 18362 | 1.50 | 0.0 | 74.0 |
| EP Minerals FW-6 | 1D17B14 | 0.72 | 0.0 | 17.7 |
| EP Minerals FW-14 | 2E16I14 | 1.55 | 0.0 | 41.2 |
| Imerys Celite 501 | 18362 | 1.50 | 0.0 | 45.9 |
| Imerys Celite 508 | 22813 | 1.00 | 0.0 | 64.0 |

TABLE 4-continued

Estimates of Quartz and Cristobalite Contents Prepared through Traditional Methods for Commercial Diatomite Products Comprising Physical Components Already in the Public Domain

| Product | Sample ID | Permeability (Darcy) | Quartz (wt %) | Cristobalite (wt %) |
|---|---|---|---|---|
| Imerys Celite Hyflo | 22814 | 1.40 | 0.0 | 55.0 |
| Imerys Celite 535 | 22800 | 2.80 | 0.0 | 58.0 |
| Imerys Celite 545 | 27113 | 3.50 | 1.5 | 35.4 |
| Chuo H-600 | 21196 | 2.60 | 3.0 | 23.0 |
| Dicalite Speedex | 21164 | 3.20 | 0.0 | 68.7 |
| Dicalite Speedflow | 19917 | 1.72 | 0.0 | 80.8 |
| Dicalite 4500 | 24541 | 7.30 | 0.0 | 50.8 |
| [1]Showa Radiolite 500 | 21195 | 1.60 | 3.0 | 18.8 |
| Showa Radiolite 700 | 27119 | 2.20 | 1.2 | 50.5 |
| [1]Showa Radiolite 800 | 15291 | 1.11 | 1.3 | 10.1 |
| Showa Radiolite 900S | 27120 | 4.10 | 1.9 | 35.6 |
| Showa Radiolite 1100 | 24340 | 4.50 | 1.2 | 58.0 |
| EP Minerals FW-80 | E19A1XR | 9.89 | 0.0 | 47.9 |
| Ceca Clarcel AK Starch | 25084 | 9.40 | 0.0 | 38.7 |
| Ceca Clarcel DIF BO | 19894 | 0.90 | 0.1 | 41.0 |
| Imerys Celite Superfloss | 19638 | n/a | 0.0 | 85.2 |
| Imerys Celite 281 | 19559 | n/a | 0.1 | 42.2 |
| Imerys Kenite 2500 | 21838 | 5.27 | 0.0 | 45.2 |

[1]Shown Radiolite 500 and 800 are straight-calcined products.

Some straight-calcined and flux-calcined products, when analyzed by Traditional Methods have been reported to contain very low or non-detectable levels of crystalline silica. These products have been reported in the patent literature, but have not to date been commercialized. See for, example, U.S. Pat. No. 8,084,392 (Lenz, et al), U.S. Pat. No. 5,179,062 (Dufour), and U.S. Pat. No. 9,095,842 (Nannini et al).

EXAMPLES

Example 1—Products Comprising Physical Components in the Public Domain and Novel Silica Documentation Table 5 shows the results of using the LH Method for differentiating opal-C from cristobalite on the samples listed in Table 4. Almost half of the samples have been reclassified from comprising cristobalite to comprising opal-C. However only a few of these are completely free of crystalline silica as quartz is still present in the majority. Still, through use of the LH Method, the Silica Documentation associated with these would be revised to reflect the absence of cristobalite and a reduced or non-detectable level of crystalline silica.

TABLE 5

Products Comprising Physical Components in the Public Domain and Novel Silica Documentation

| Product | Sample ID | Opal-C(wt %)[1] | Quartz (wt %) | Cristobalite (wt %) |
|---|---|---|---|---|
| Ceca Clarcel 78 | 23139 | 0.0 | 0.8 | 0.0 |
| Imerys Celite S | 20633 | 0.0 | 0.2 | 0.0 |
| Ceca Clarcel Dif N | 17956 | 0.0 | 0.0 | 80.4 |
| EP Minerals FN-2 | 25037 | 0.0 | 0.1 | 0.0 |
| EP Minerals MN-4 | 25061 | 0.0 | 0.0 | 0.0 |
| Dicalite Superaid | 19918 | 3.9 | 0.7 | 0.0 |
| Ceca CBL | 22602 | 13.9 | 11.0 | 0.0 |
| Ceca CBL-3 | 22603 | 6.6 | 3.0 | 0.0 |
| Ceca Clarcel CBR | 3234 | 0.0 | 8.1 | 22.9 |
| Imerys Celite 505 | 19154 | 4.2 | 0.7 | 0.0 |

TABLE 5-continued

| Products Comprising Physical Components in the Public Domain and Novel Silica Documentation | | | | |
|---|---|---|---|---|
| Product | Sample ID | Opal-C(wt %)[1] | Quartz (wt %) | Cristobalite (wt %) |
| Imerys Celite 512 | 24081 | 12.0 | 3.0 | 0.0 |
| Imerys Celite 512 | 21881 | 0.0 | 11.4 | 25.2 |
| Imerys Celite Std. Supercel | 27115 | 3.6 | 4.4 | 0.0 |
| Imerys Celite 577 | 27116 | 1.3 | 1.9 | 0.0 |
| Showa Radiolite 200 | 27117 | 5.6 | 2.1 | 0.0 |
| Showa Radiolite 300 | 27118 | 11.3 | 3.5 | 0.0 |
| Imerys Cynergy 200 | 27121 | 2.1 | 2.1 | 0.0 |
| EP Minerals FP-2 | B12C0 | 16.0 | 0.0 | 0.0 |
| EP Minerals FP-3 | B17E2 | 18.6 | 0.0 | 0.0 |
| EP Minerals FP-4 | 2H11B4 | 38.1 | 0.0 | 0.0 |
| EP Minerals FP-6 | 2B11F1 | 0.0 | 0.0 | 71.1 |
| Imerys Celite 501 | 18362 | 0.0 | 0.0 | 58.0 |
| EP Minerals FW-6 | 1D17B14 | 17.7 | 0.0 | 0.0 |
| EP Minerals FW-14 | 2E16I14 | 0.0 | 0.0 | 41.2 |
| Imerys Celite 501 | 18362 | 0.0 | 0.0 | 45.9 |
| Imerys Celite 508 | 22813 | 0.0 | 0.0 | 64.0 |
| Imerys Celite Hyflo | 22814 | 0.0 | 0.0 | 55.0 |
| Imerys Celite 535 | 22800 | 0.0 | 0.0 | 58.0 |
| Imerys Celite 545 | 27113 | 0.0 | 1.5 | 35.4 |
| Chuo H-600 | 21196 | 0.0 | 3.0 | 23.0 |
| Dicalite Speedex | 21164 | 0.0 | 0.0 | 68.7 |
| Dicalite Speedflow | 19917 | 0.0 | 0.0 | 80.8 |
| Dicalite 4500 | 24541 | 0.0 | 0.0 | 50.8 |
| [2]Showa Radiolite 500 | 21195 | 18.8 | 3.0 | 0.0 |
| Showa Radiolite 700 | 27119 | 0.0 | 1.2 | 50.5 |
| [2]Showa Radiolite 800 | 15291 | 10.1 | 1.3 | 0.0 |
| Showa Radiolite 900S | 27120 | 0.0 | 1.9 | 35.6 |
| Showa Radiolite 1100 | 24340 | 0.0 | 1.2 | 58.0 |
| EP Minerals FW-80 | E19A1XR | 0.0 | 0.0 | 47.9 |
| Ceca AK Starch | 25084 | 0.0 | 0.0 | 38.7 |
| Ceca Clarcel DIF BO | 19894 | 0.0 | 0.1 | 41.0 |
| Imerys Celite Superfloss | 19638 | 0.0 | 0.0 | 85.2 |
| Imerys Celite 281 | 19559 | 0.0 | 0.1 | 42.2 |
| Imerys Kenite 2500 | 21838 | 0.0 | 0.0 | 45.2 |

[1]Opal-C quantification is based on the XRD Method

[2]Showa Radiolite 500 and 800 are straight-calcined products

Figure 2:
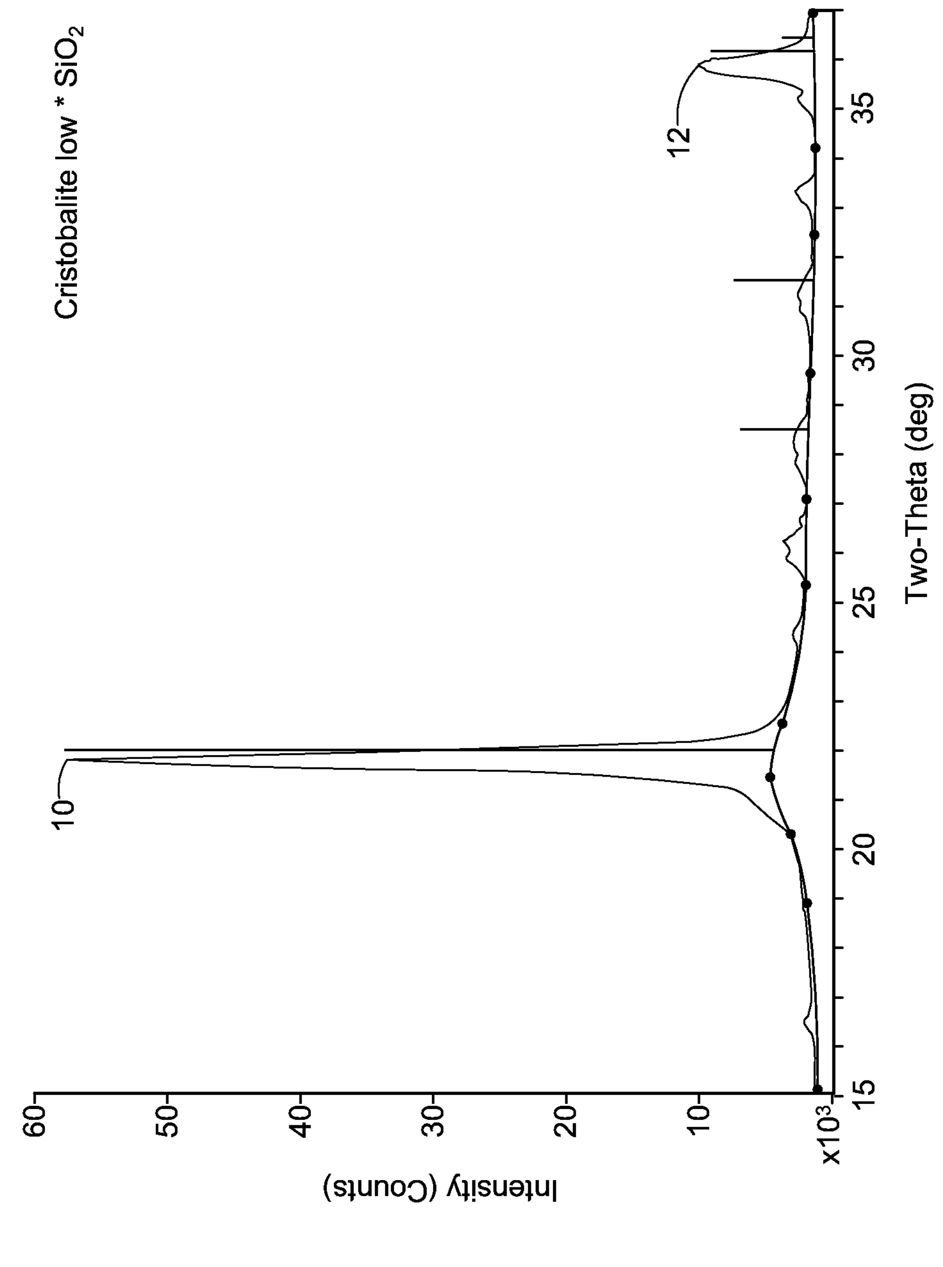
FIG. 2 is a graph of the XRD pattern of FP-4 (2H11B4) showing Opal-C phase plus feldspars and possible hematite.
Figure 3:
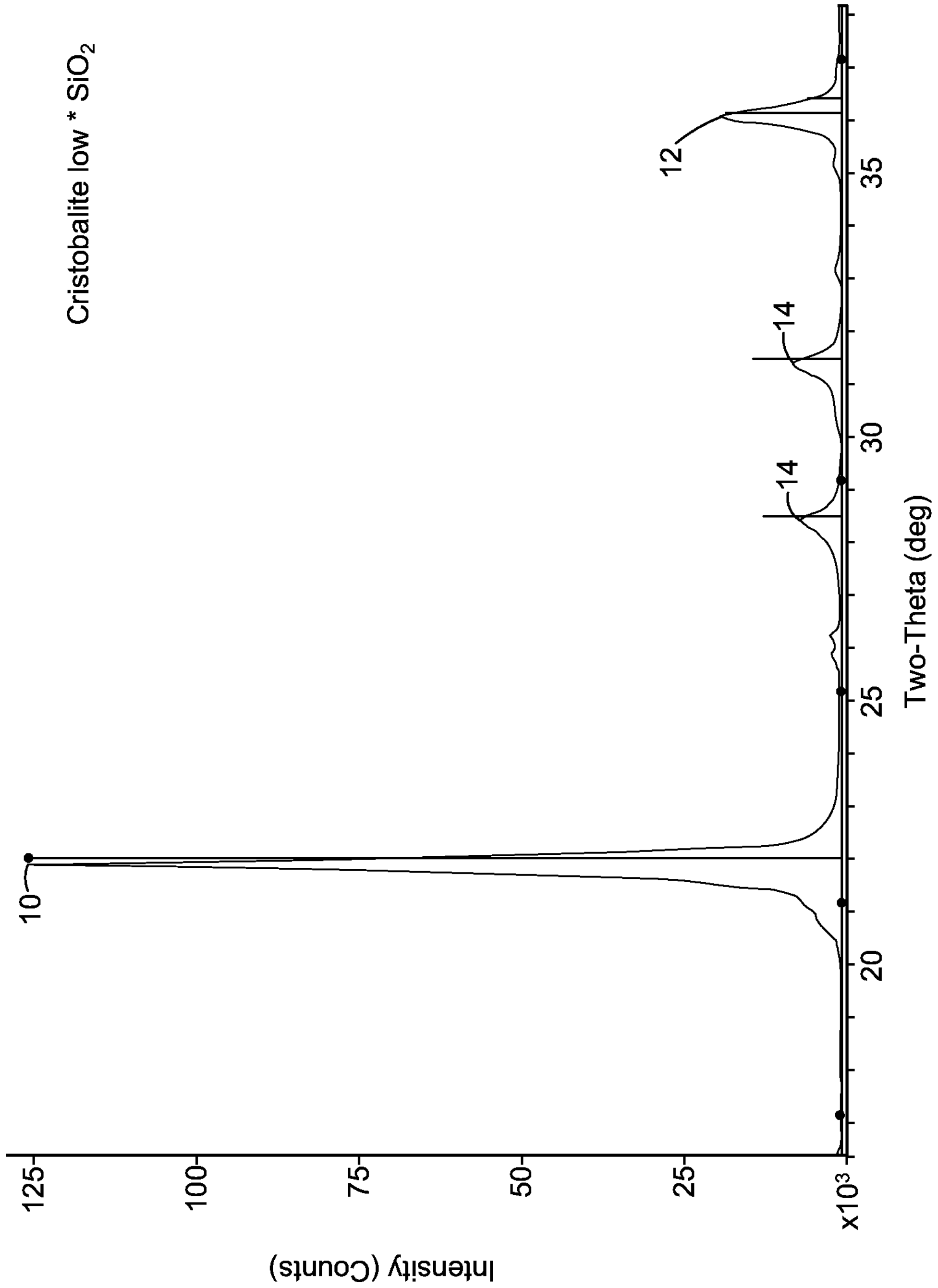
FIG. 3 is a graph of the XRD pattern of FP-6 (2B11F1) showing cristobalite phase plus feldspars.
Figure 4:
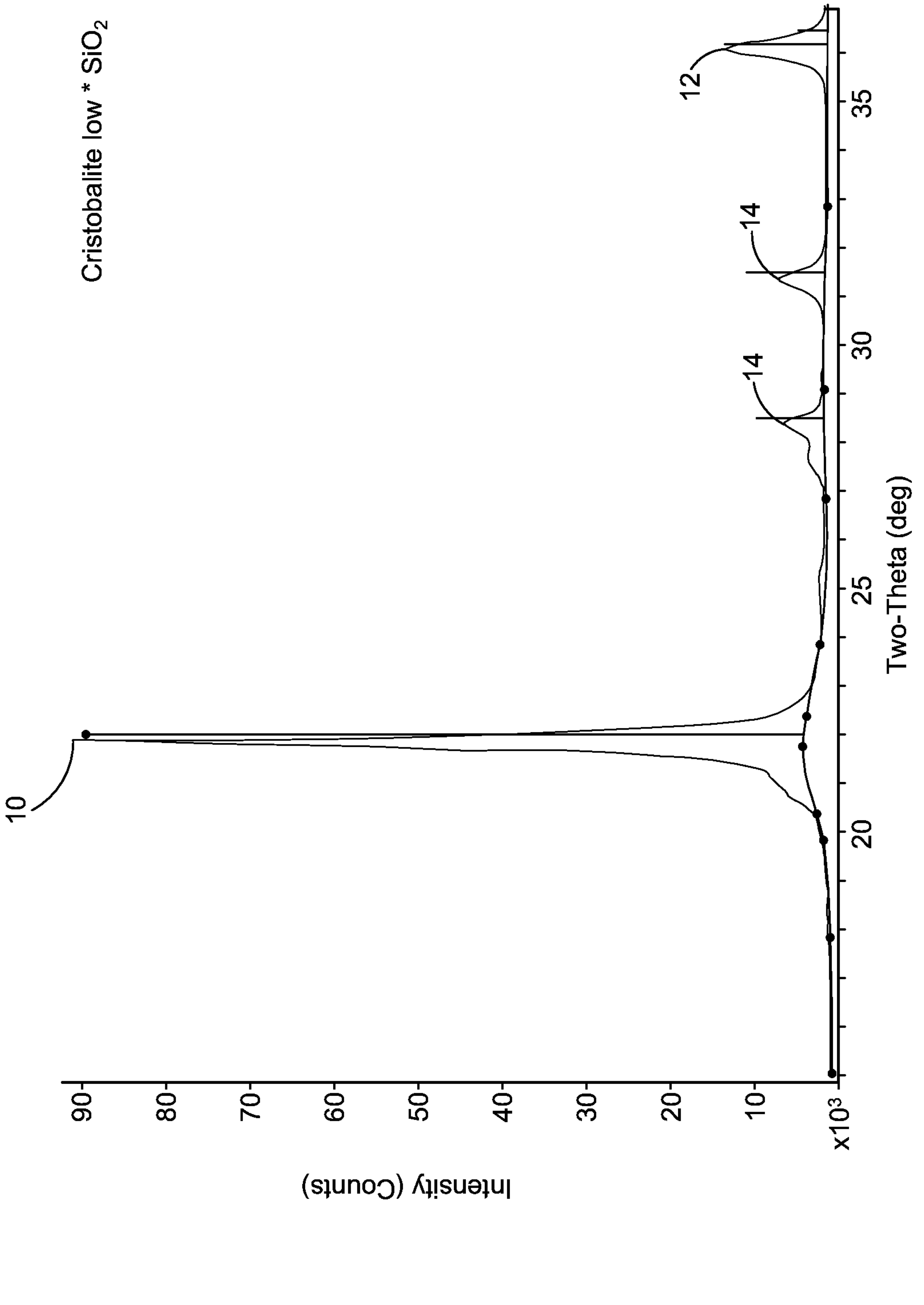
FIG. 4 is a graph of the XRD pattern of Dicalite® 4500 showing cristobalite phase plus minor feldspars.

FIGS. 1 through 4 are X-ray Diffraction patterns of four of the samples listed in Table 5 with the standard stick pattern of low cristobalite super-imposed. FIG. 1 shows the pattern for a sample of Celite 501. This flux-calcined filter aid comprises cristobalite but does not contain either quartz or opal-C. The current SDS accurately reflects this information. FIG. 2 shows the XRD pattern for a sample of FP-4, a straight-calcined filter aid. Reference number 10 identifies the primary peak and reference number 12 identifies the secondary peak on the FIGS. This sample was found to comprise opal-C along with minor amounts of feldspars and possibly hematite. The Silica Documentation for this product should be modified to reflect the lack of cristobalite. FIG. 3 is the diffraction pattern of another straight-calcined filter aid, FP-6. In this case, the principal crystalline phase is cristobalite and no change needs to be made to the SDS. FIG. 4 is the diffraction pattern of Dicalite 4500, a flux-calcined filter aid. This sample also comprises cristobalite, and the current SDS reflects this.

Tables 6 and 7 present physical and chemical data obtained on many of the samples listed in table 5.

TABLE 6

Physical and Chemical Data for Selected Diatomite Products Comprising Physical Components in the Public Domain

| | Sample | | | | | |
|---|---|---|---|---|---|---|
| | FP-2 B12C0 | FP-3 B17E2 | FW-6 1D17B14 | FW-14 2E16I14 | Radiolite 800 | Celabrite 2A20A 13F |
| | Type | | | | | |
| | Straight-calcined | Straight-calcined | Flux-calcined | Flux-calcined | Straight-calcined | Flux-calcined |
| Total Chemistry (XRF expressed as oxides) | | | | | | |
| $SiO_2$ (wt %) | 94.3 | 94.5 | 90.8 | 91.2 | 85.6 | 94.5 |
| $Al_2O_3$ (wt %) | 2.5 | 2.4 | 2.9 | 2.7 | 7.9 | 1.6 |
| CaO (wt %) | 0.6 | 0.6 | 0.4 | 0.7 | 1.0 | 0.4 |
| MgO (wt %) | 0.3 | 0.2 | 0.2 | 0.3 | 0.4 | 0.2 |
| $Na_2O$ (wt %) | 0.4 | 0.4 | 3.8 | 3.1 | 1.6 | 2.1 |
| $K_2O$ (wt %) | 0.2 | 0.3 | 0.3 | 0.3 | 0.7 | 0.1 |
| $Fe_2O_3$ (wt %) | 1.5 | 1.4 | 1.4 | 1.6 | 2.5 | 0.9 |
| $TiO_2$ (wt %) | 0.1 | 0.1 | 0.1 | 0.1 | 0.2 | 0.1 |
| Permeability (darcy) | 0.20 | 0.24 | 0.72 | 1.55 | 1.11 | |
| Wet Bulk Density (g/ml) | 0.37 | 0.36 | 0.32 | 0.33 | 0.33 | |
| EBC Soluble Metals | | | | | | |
| Fe (ppm) | | | | | 75 | |
| As (ppm) | 3.3 | 3.2 | 5.8 | 1.3 | 1.2 | |
| Loss on Ignition (wt %) | 0.2 | 0.2 | 0.1 | 0.1 | 0.2 | <0.1 |

TABLE 6-continued

Physical and Chemical Data for Selected Diatomite Products Comprising Physical Components in the Public Domain

| | FP-2 B12C0 | FP-3 B17E2 | FW-6 1D17B14 | FW-14 2E16I14 | Radiolite 800 | Celabrite 2A20A 13F |
|---|---|---|---|---|---|---|
| Type | Straight-calcined | Straight-calcined | Flux-calcined | Flux-calcined | Straight-calcined | Flux-calcined |
| **Opal-C/Cristobalite Analysis** | | | | | | |
| Primary Peak centroid (Å) | 4.09 | 4.08 | 4.08 | 4.07 | 4.08 | 4.06 |
| FWHM (° $2^{\theta}$) | 0.35 | 0.34 | 0.44 | 0.33 | 0.41 | 0.30 |
| Peaks between 10°-37° $2^{\theta}$ | 2 of 4 | 2 of 4 | 2 of 4 | 4 of 4 | 3 of 4 | 4 of 4 |
| Opal-C (wt %)[1] | 16.0% | 18.6% | 17.7% | 0.0% | 10.1% | 0.0% |
| Cristobalite (wt %) | 0.0% | 0.0% | 0.0% | 41.2% | 0.0% | 56.8% |
| Quartz (wt %) | 0.0% | 0.0% | 0.0% | 0.0% | 1.3% | 0.0% |

[1]Opal-C quantification is based on the XRD Method

Note:

FP-2, FP-3, FW-6, FW-14 and Celabrite are products of EP Minerals LLC; Radiolite 800 is a product of Showa Chemical.

TABLE 7

Physical and Chemical Data for Additional Selected Diatomite Products Comprising Physical Components in the Public Domain

| | Dicalite 4500 | Kenite 2500 | Celite 512 | Celite Std. Supercel | FP-6 2B11F1 |
|---|---|---|---|---|---|
| Type | Flux-calcined | Flux-calcined | Straight-calcined | Straight-calcined | Straight-calcined |
| **Total Chemistry (XRF expressed as oxides)** | | | | | |
| $SiO_2$ (wt %) | 91.7 | 90.1 | 90.0 | 89.0 | 91.9 |
| $Al_2O_3$ (wt %) | 2.3 | 2.0 | 5.0 | 5.4 | 4.7 |
| CaO (wt %) | 0.2 | 3.4 | 0.5 | 0.6 | 0.5 |
| MgO (wt %) | 0.1 | 0.3 | 0.7 | 0.9 | 0.3 |
| $Na_2O$ (wt %) | 4.4 | 2.3 | 0.7 | 0.7 | 0.2 |
| $K_2O$ (wt %) | 0.1 | 0.4 | 0.7 | 0.9 | 0.1 |
| $Fe_2O_3$ (wt %) | 0.9 | 0.9 | 1.6 | 1.9 | 2.0 |
| $TiO_2$ (wt %) | 0.1 | 0.1 | 0.2 | 0.3 | 0.3 |
| Permeability (darcy) | 7.30 | 5.27 | 0.30 | 0.25 | 0.70 |
| Wet Bulk Density (g/ml) | 0.31 | 0.36 | 0.40 | 0.33 | 0.42 |
| **EBC Soluble Metals** | | | | | |
| Fe (ppm) | 34 | 35 | 146 | 73 | |
| As (ppm) | 0.5 | 0.5 | 2.3 | 6.4 | 1.0 |
| Loss on Ignition (wt %) | <0.1 | 0.5 | 0.4 | 0.2 | 0.1 |
| **Opal-C/Cristobalite Analysis** | | | | | |
| Primary Peak centroid(Å) | 4.06 | 4.06 | 4.07 | 4.08 | 4.06 |
| FWHM (°$2^{\theta}$) | 0.32 | 0.31 | 0.37 | 0.44 | 0.31 |
| Peaks between 10°-37° $2^{\theta}$ | 4 of 4 | 4 of 4 | 3 of 4 | 2 of 4 | 4 of 4 |
| Opal-C (wt %)[1] | 0.0% | 0.0% | 13.4% | 1.3% | 0.0% |
| Cristobalite (wt %) | 52.1% | 39.2% | 0.0% | 0.0% | 71.1% |
| Quartz (wt %) | 0.0% | 0.0% | 3.1% | 3.5% | 0.0% |

[1]Opal-C quantification is based on the XRD Method

Note:

Dicalite 4500 is a product of Dicalite Minerals; Kenite 2500, Celite 512 and Celite Standard Super-Cel are products of Imerys Filtration Minerals; FP-6 is a product of EP Minerals LLC.

Figure 5:
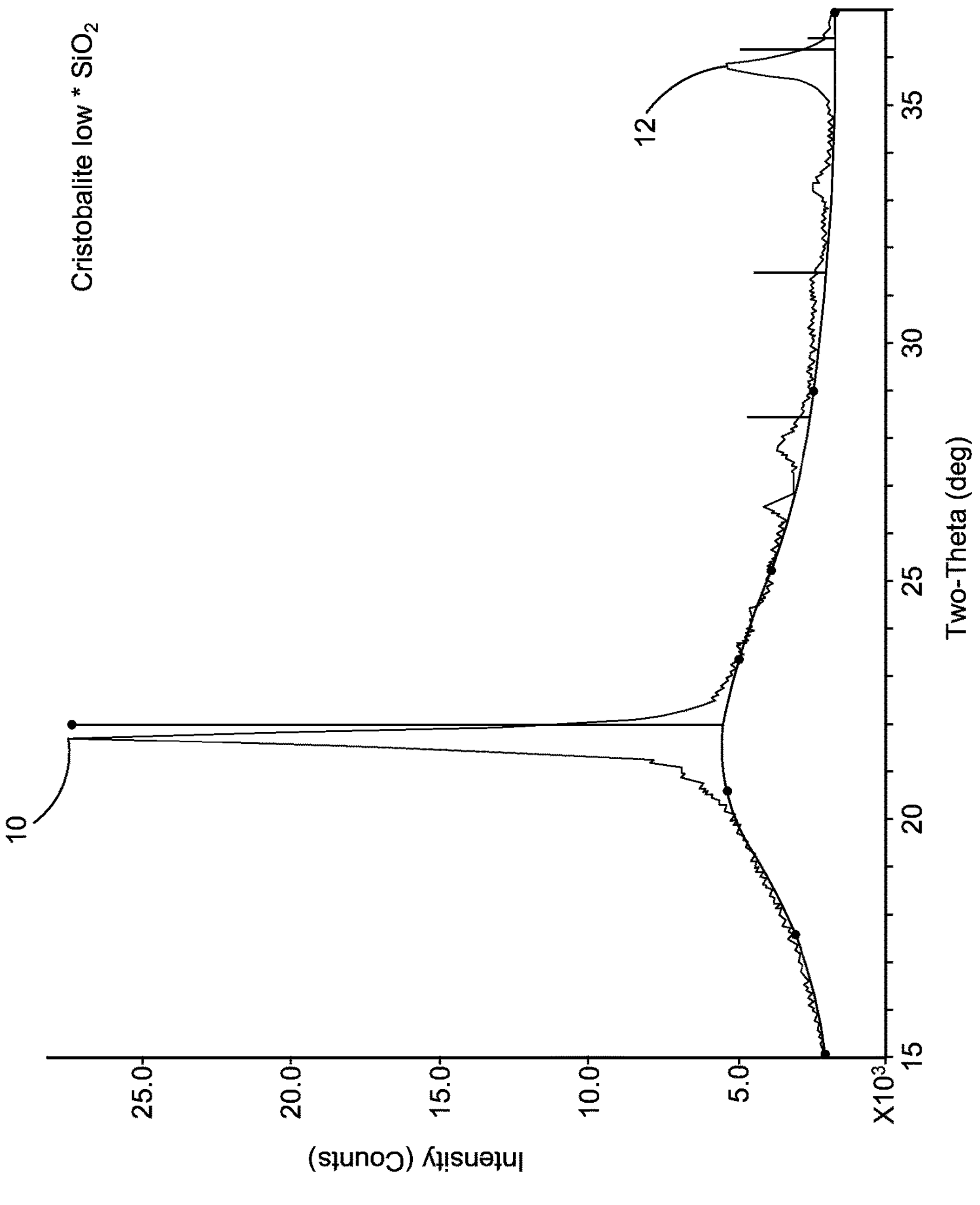
FIG. 5 is a graph of the XRD pattern of sample "FP-2 B12C0"

FIG. 5 shows the XRD pattern of sample FP-2 (B12C0) (see Tables 4, 5, and 6) with the standard stick pattern of α-cristobalite super-imposed. As can be seen, the FP-2 primary peak (reference no. 10 on FIG. 5) and secondary peak (reference no. 12 on FIG. 5) are offset (higher d-spacing) and the peaks at 31.50° and 28.49° 2θ are very poorly developed. These factors along with a relatively broad FWHM indicate that the silica phase represented is opal-C. Minor peaks attributable to feldspars are also evident.

Figure 6:
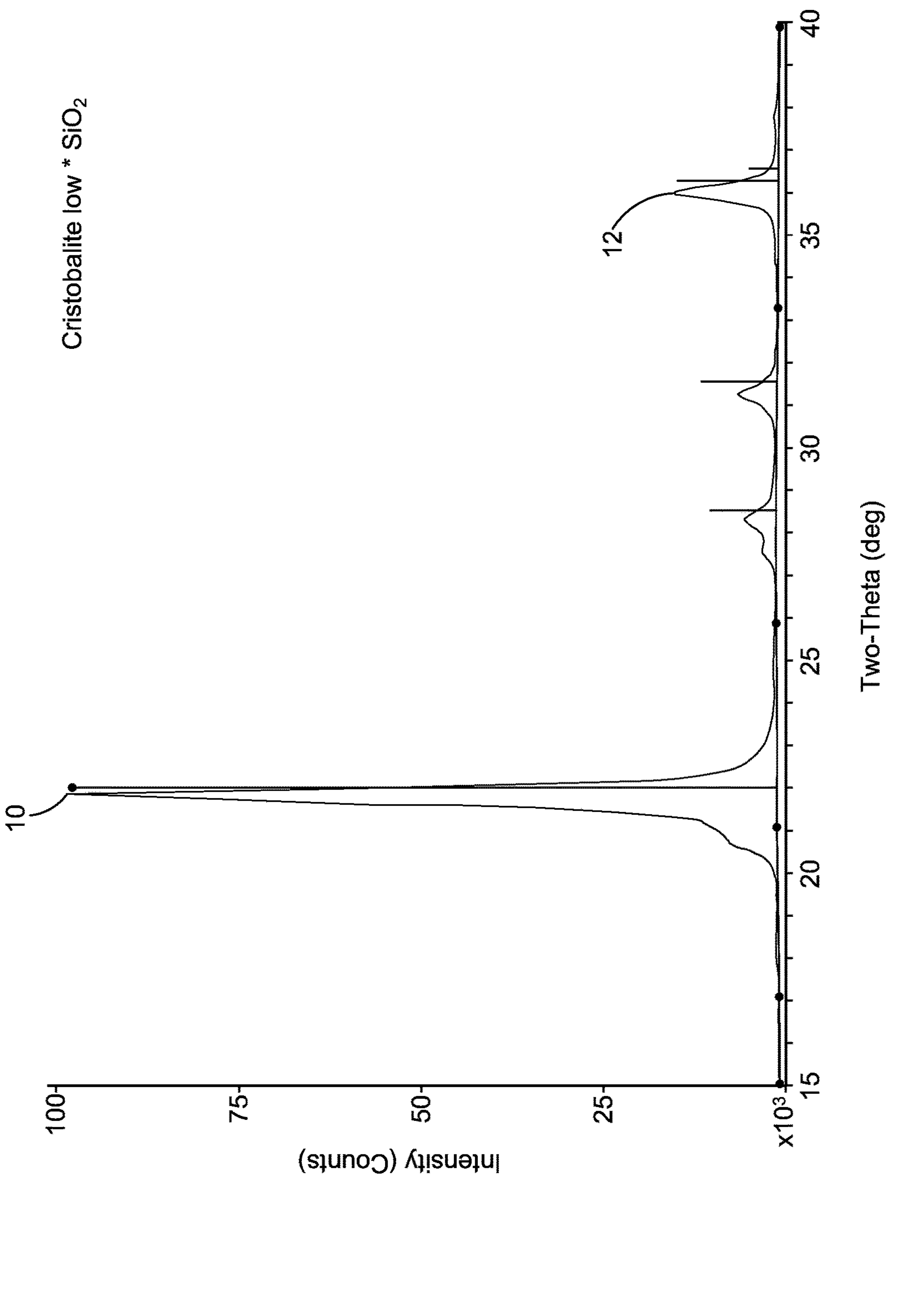
FIG. 6 is a graph of the XRD pattern of sample "Celabrite® 2A20A13F"

FIG. 6 shows the XRD pattern of the "Celabrite 2A20A13F" sample with the standard stick pattern of α-cristobalite super-imposed. This product is a flux-calcined fine filler, and the XRD pattern matches that of "standard" cristobalite fairly well.

Figure 7:
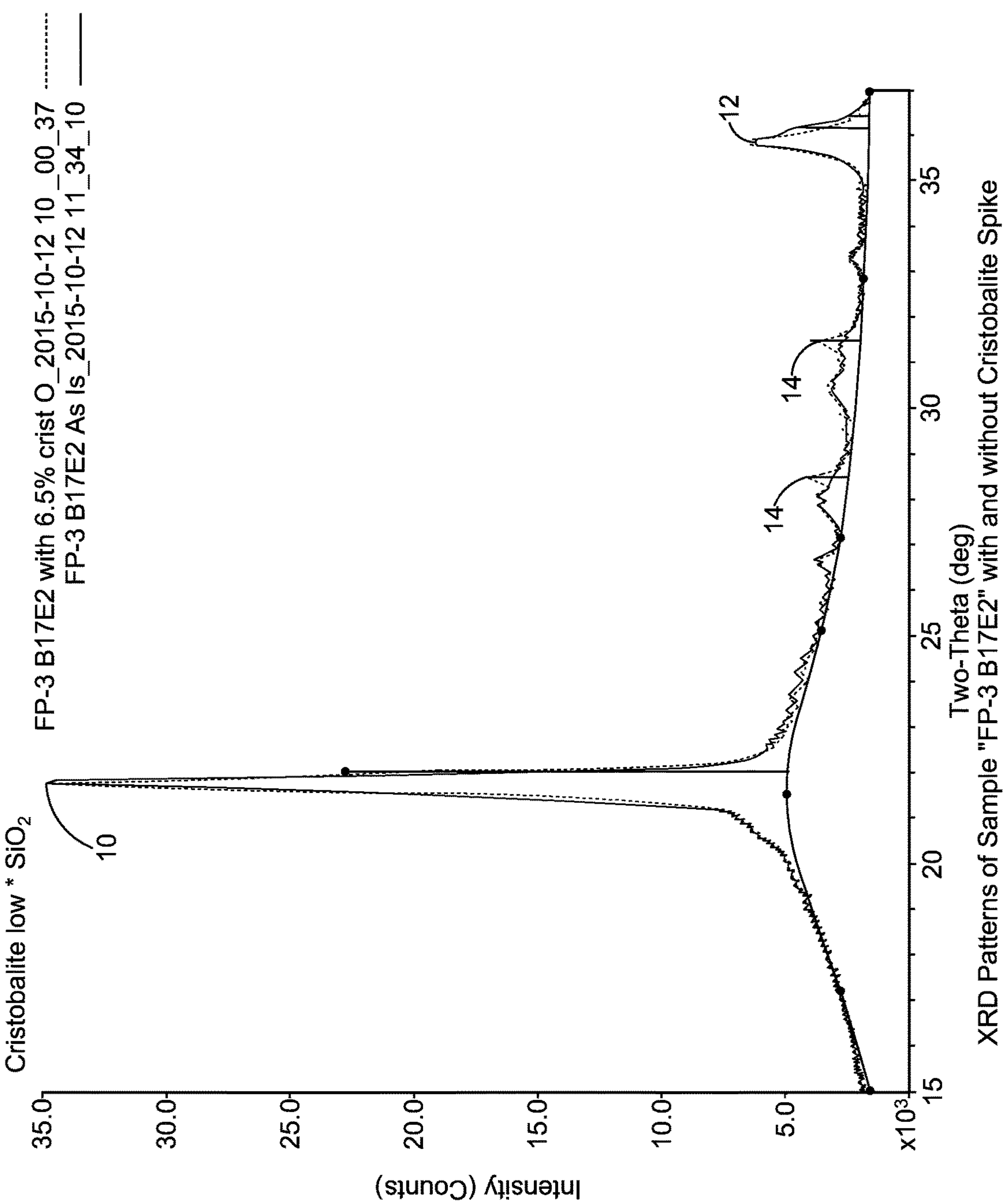
FIG. 7 is a graph of the XRD patterns of sample "FP-3 B17E2" with and without cristobalite spike.
Figure 8:
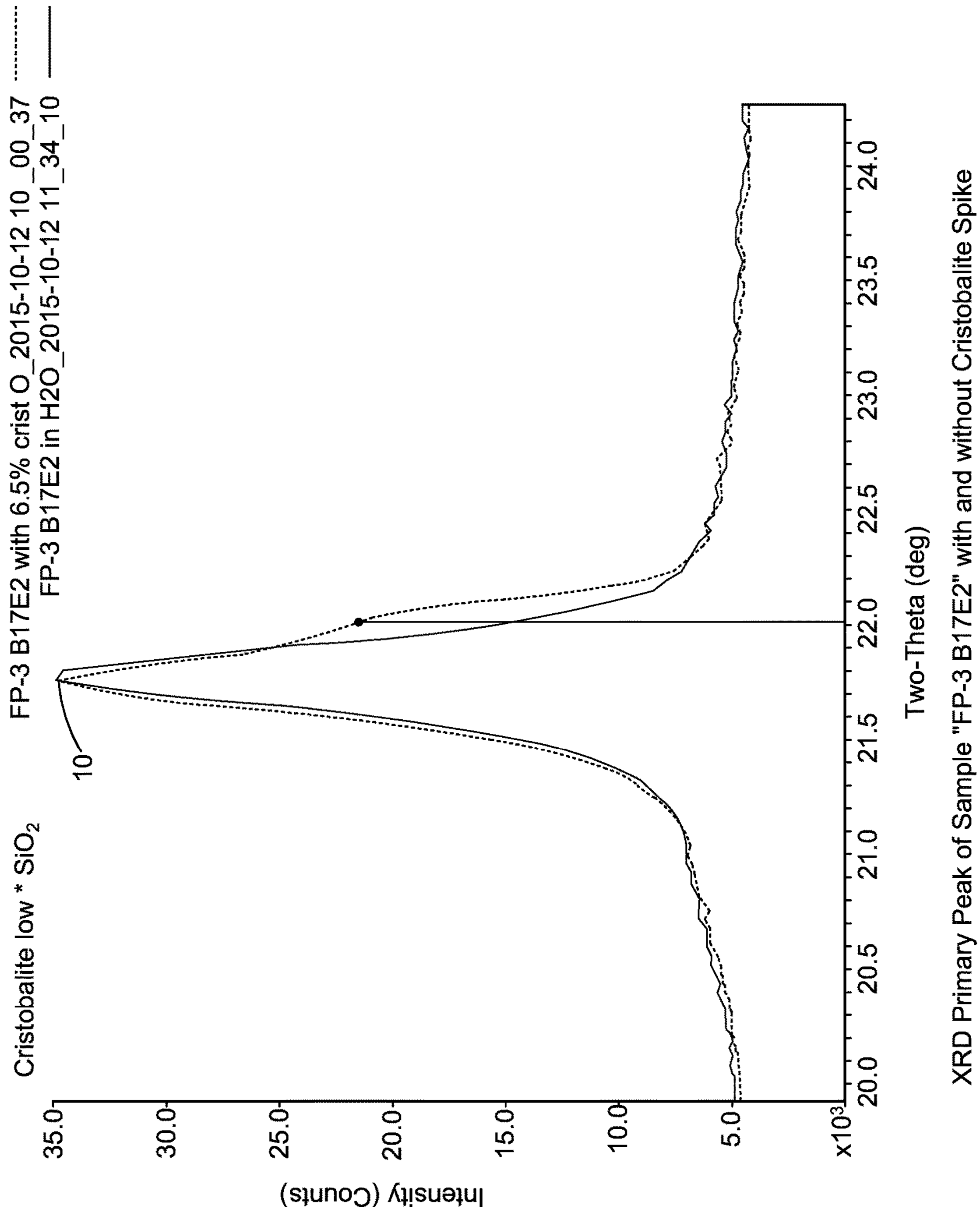
FIG. 8 is a graph of the XRD primary peak of sample "FP-3 B17E2" with and without cristobalite spike"

FIGS. 7 and 8 show XRD patterns of sample "FP-3 B17E2" before and after spike addition of cristobalite standard. FIG. 8 is an enlarged view of the primary peaks in the XRD patterns for sample "FP-3 B17E2." The standard stick pattern of α-cristobalite is super-imposed in FIGS. 7-8. As compared to the XRD pattern of the non-spiked sample, the cristobalite spike resulted in a well-defined secondary peak (see reference number 12), well-defined tertiary peaks (see reference number 14) at 31.50 and 28.49° 2θ and a visible "hump" on the shoulder of the primary peak (see reference number 10). This is fairly clear evidence that the original sample comprises opal-C and not cristobalite.

Examples 2 Through 6: Flux-Calcined Diatomite Products Comprising Novel Physical Components and Novel Silica Documentation A number of samples of opaline flux-calcined biogenic silica products have been prepared in the EP Minerals Research and Development laboratory from selected ores of unusual chemical composition. While there is evidence that opal-C and not cristobalite can form from standard ores when flux-calcined at relatively low temperatures (i.e. FW-6 1D17B14), that is not usually the case with flux-calcined products. However with these selected ores, opal-C (and/or opal-CT) forms even when flux-calcined at high temperatures, for example 920° C. to 1150° C. Without being bound by theory, it is theorized that unusually high levels of finely-divided aluminum and iron compounds in these ores inhibit the formation of cristobalite during flux-calcination, although other factors could also be of influence. Table 8 presents information regarding processing conditions, physical and chemical characteristics, and silica phase determination for several opaline flux-calcined biogenic silica products.

TABLE 8

Five Examples of Novel Flux-calcined Diatomite Products

| | Sample | | | | |
|---|---|---|---|---|---|
| | 18184-3 | 18188-2 | 18188-4 | 18188-7 | 18188-9 |
| | | | Type | | |
| | Flux-calcined | Flux-calcined | Flux-calcined | Flux-calcined | Flux-calcined |
| Soda Ash Addition level (wt %) | 2.0 | 2.0 | 2.0 | 5.0 | 8.0 |
| Calcination Temperature (° C) | 1038 | 954 | 1038 | 1104 | 1104 |
| Calcination Time (min.) | 40 | 40 | 40 | 40 | 40 |
| Total Chemistry (XRF expressed as oxides) | | | | | |
| $SiO_2$ (wt %) | 88.7 | 87.3 | 87.8 | 87.7 | 86.4 |
| $Al_2O_3$ (wt %) | 5.6 | 6.9 | 6.5 | 5.4 | 5.3 |
| CaO (wt %) | 0.6 | 0.6 | 0.6 | 0.6 | 0.6 |
| MgO (wt %) | 0.3 | 0.4 | 0.4 | 0.3 | 0.3 |
| $Na_2O$ (wt %) | 1.4 | 1.5 | 1.5 | 2.6 | 4.0 |
| $K_2O$ (wt %) | 0.2 | 0.2 | 0.2 | 0.2 | 0.2 |
| $Fe_2O_3$ (wt %) | 2.8 | 2.7 | 2.8 | 2.8 | 2.8 |
| $TiO_2$ (wt %) | 0.3 | 0.4 | 0.4 | 0.4 | 0.4 |
| Permeability (darcy) | 1.27 | 1.16 | 1.66 | 4.43 | 8.91 |
| Wet Bulk Density (g/ml) | 0.28 | 0.29 | 0.28 | 0.28 | 0.26 |
| EBC Soluble Metals | | | | | |
| Fe (ppm) | 31 | 39 | 23 | 29 | 45 |
| Ca (ppm) | 54 | 90 | 43 | 39 | 41 |
| Al (ppm) | 69 | 116 | 54 | 29 | 21 |
| As (ppm) | 1.4 | 0.3 | 0.6 | 0.4 | 0.2 |
| ASBC Beer Soluble Iron (ppm) | 13 | | 14 | | |
| Loss on Ignition (wt %) | 0.2 | 0.5 | 0.3 | 0.1 | 0.1 |
| Opal-C/Cristobalite Analysis | | | | | |
| Primary Peak centroid(Å) | 4.08 | 4.08 | 4.10 | 4.08 | 4.07 |
| FWHM (°$2^θ$) | 0.39 | 0.43 | 0.39 | 0.46 | 0.50 |
| Peaks between 10°-37° $2^θ$ | 2 of 4 | 2 of 4 | 2 of 4 | 2 of 4 | 3 of 4 |
| Opal-C (wt %)[1] | 10.9% | 2.6% | 9.0% | 16.1% | 22.4% |
| Cristobalite (wt %) | 0.0% | 0.0% | 0.0% | 0.0% | 0.0% |
| Quartz (wt %) | 0.0% | 0.0% | 0.0% | 0.0% | 0.0% |

[1]Opal-C quantification is based on XRD Method

All of the samples listed in Table 8 were prepared from crude ore by the following steps: drying at 120° C. for 24 hours; crushing (jaw crusher) to minus 1.25 cm; milling (with a hammer-mill) until 99% passes 70 mesh (210 um); classifying using a Federal Equipment Company cyclonic classifier with coarse fraction discarded (average of 10%); soda ash addition and mixing using a paint shaker; calcination in a muffle furnace in ceramic crucibles; and sieving at 70 mesh with overs brushed through the sieve.

Figure 9:
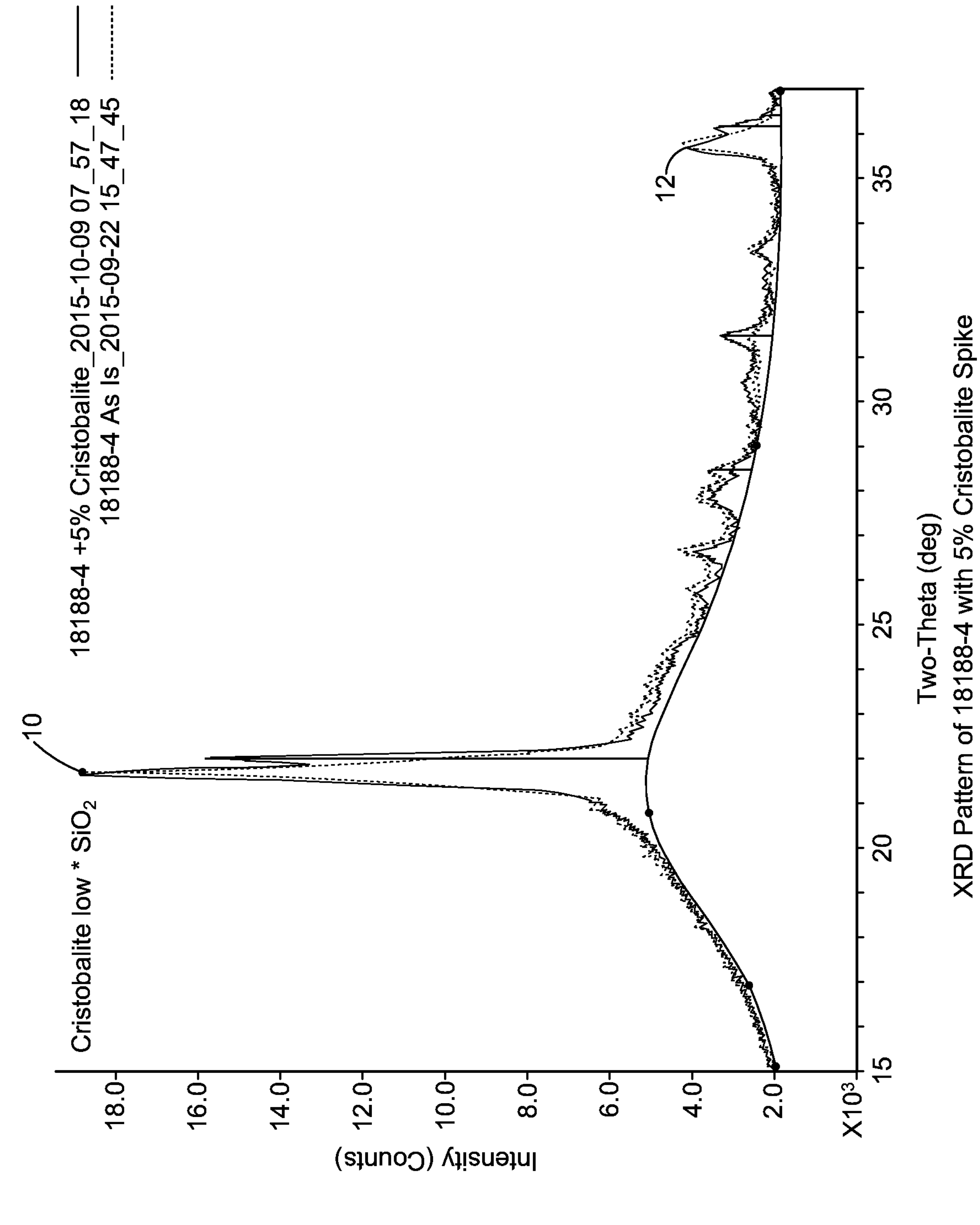
FIG. 9 is a graph of the XRD pattern of 18188-4 with 5 wt % cristobalite spike.

FIG. 9 shows the XRD pattern of sample 18188-4 with and without a 5 wt % cristobalite spike. The standard stick pattern of α-cristobalite is super-imposed in FIG. 9. As can be seen in FIG. 9, the cristobalite spike is easily distinguished from the original opal-C phase through use of the LH Method. This presents solid proof that the identification of the opal-C phase is correct when the LH Method is used. There would not be the need to include warnings about crystalline silica in the Silica Documentation for these five flux-calcined products, even though analysis using Traditional Methods and traditional interpretation of XRD patterns would indicate that all of these samples would have been considered to comprise cristobalite at roughly the same percentages as are listed for opal-C and, as such, crystalline silica warnings would be needed. As a result, both the compositions of these products and their Silica Documentation are novel.

Figure 10:
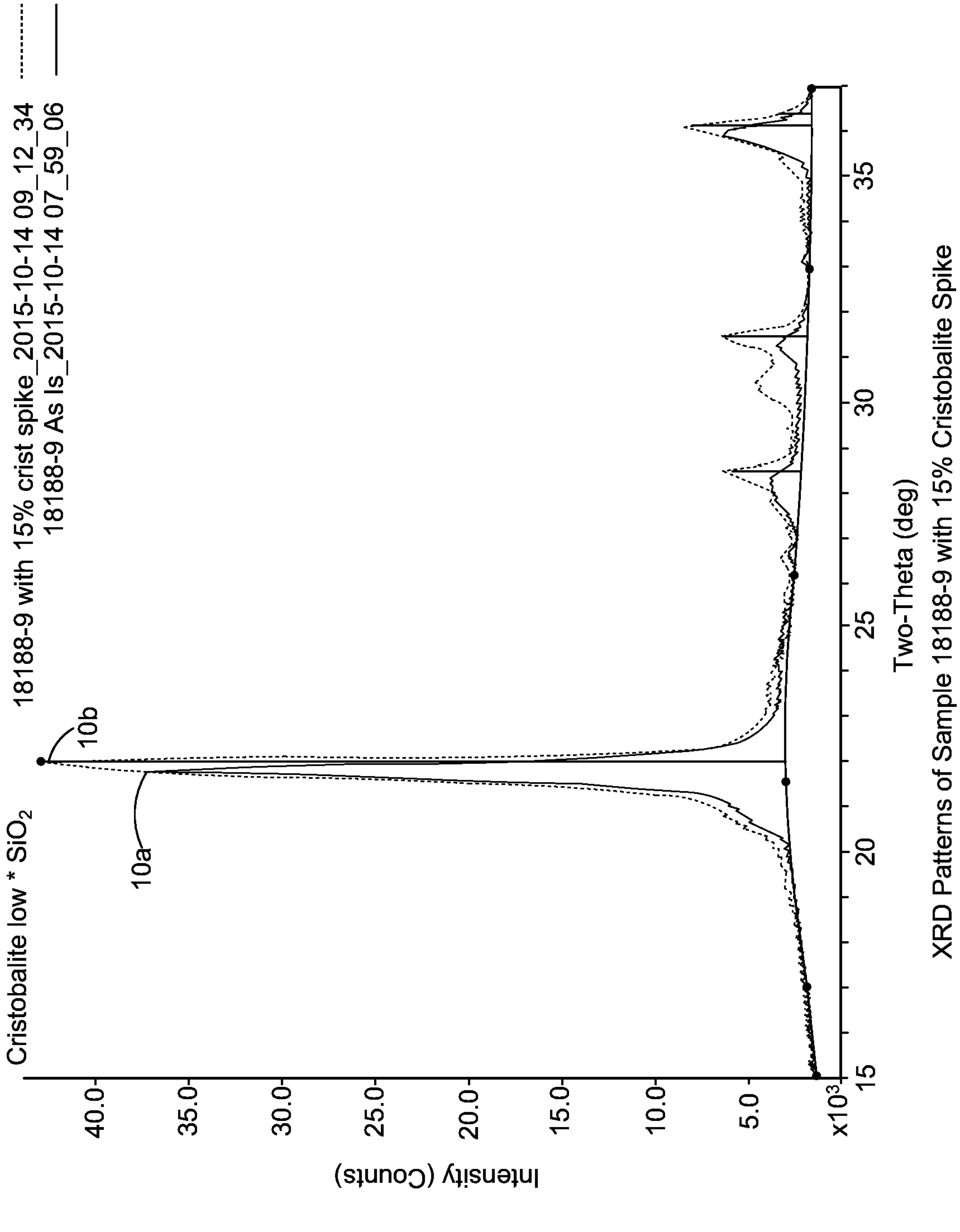
FIG. 10 is a graph of the XRD pattern of sample 18188-9 with 15 wt % cristobalite spike.
Figure 11:
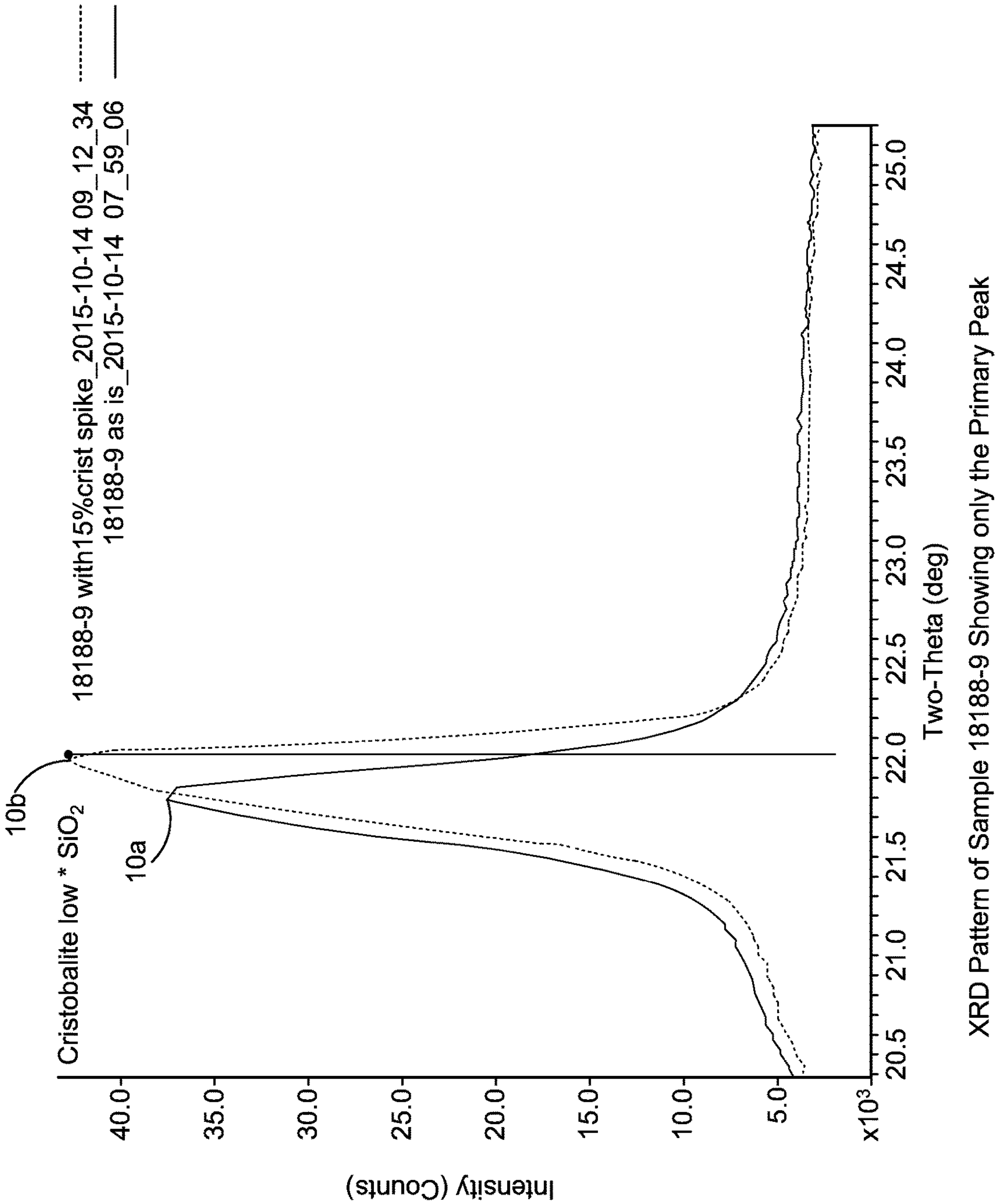
FIG. 11 is a graph of the XRD pattern of sample 18188-9 showing only the primary peak.

FIG. 10 is the X-ray diffraction pattern of sample 18188-9 overlaying the same sample with a 15 wt % cristobalite spike. The standard stick pattern of α-cristobalite is super-imposed in FIG. 10. While the cristobalite primary peak (10*b*) in this case still overlaps the opal-C primary peak (10*a*), the addition of the spike shows a significant change in the pattern and not just an increase in intensity. FIG. 11 is an enlarged view of the same diffraction pattern but centered only on the primary peak area.

Splits of samples 18184-3 and 18188-4 were subjected to post-calcination hydration treatments to reduce beer soluble iron as measured via the ASBC protocol. The hydration treatment consisted of adding 6% deionized water to each sample, heating at 90° C. for 5 hours in a sealed container, and then drying at 105° C. in an open container to remove any remaining free moisture. ASBC beer soluble iron was reduced from 13 ppm to 7 ppm in sample 18184-3, and from 14 ppm to 4 ppm in sample 18188-4.

Figure 12:
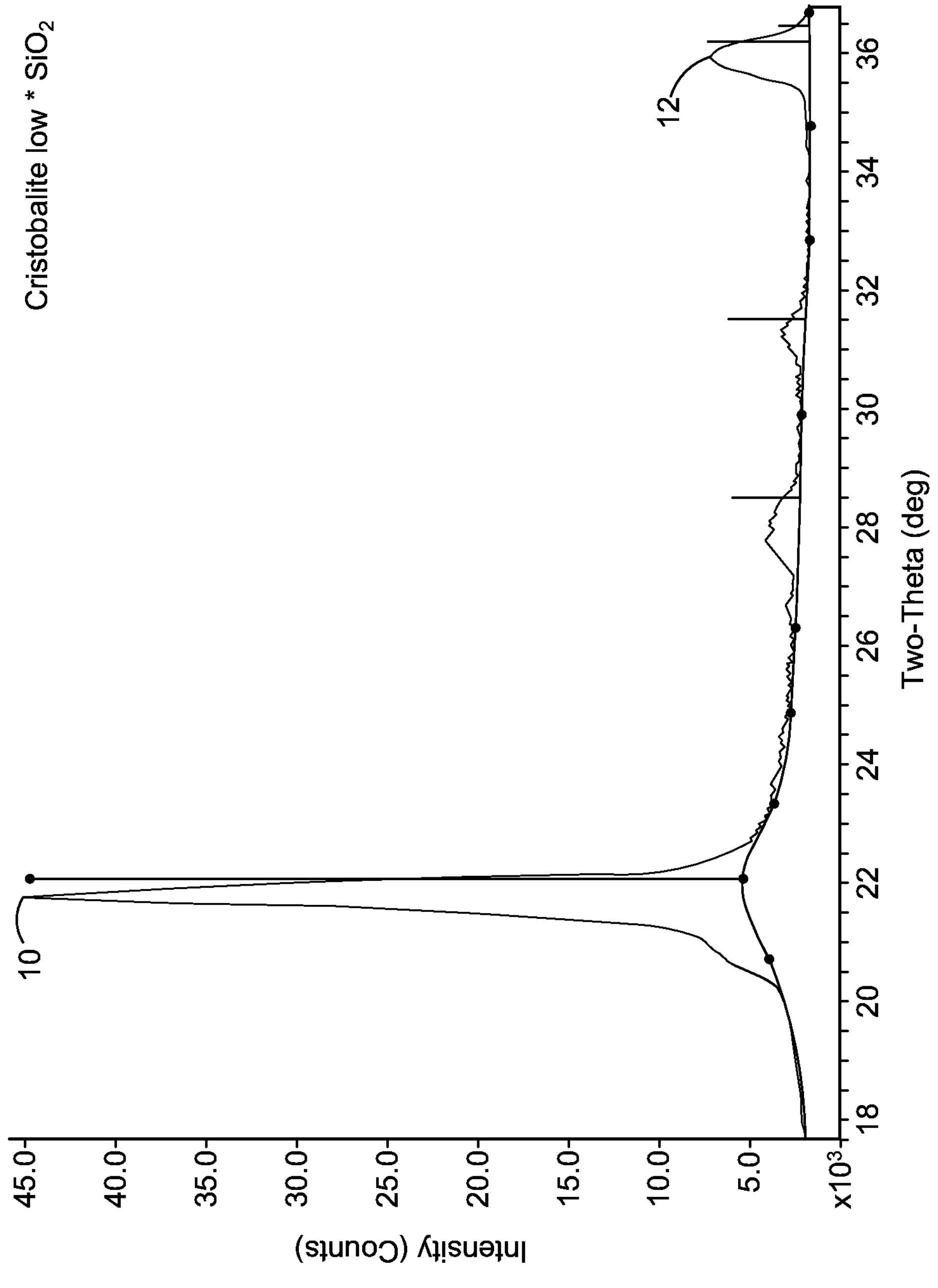
FIG. 12 is a graph of the XRD pattern of sample "S31 15-4-7B"

Example 7 Flux-Calcined Diatomite Product Comprising Novel Physical Component and Novel Silica Documentation A diatomite ore (S31 15-4-7B 35-40) was hammer milled, dried and classified using the Federal Equipment Company cyclonic classifier to obtain two size fractions. The coarse fraction had a mass yield of 27% and a particle size distribution of d10=30, d50=73 and d90=141 micrometers. A high permeability product was made from the coarse fraction by mixing with 7 wt % soda ash as the fluxing agent, calcining in a muffle furnace at 1038° C. for 40 minutes and brushing through a 70 mesh screen for dispersion. The product had 30.5 darcy permeability and 0.33 g/ml wet bulk density. FIG. 12 shows the XRD diffraction pattern for this sample. The standard stick pattern of α-cristobalite is super-imposed in FIG. 12. The primary peak (10) offset, FWHM, and lack of developed tertiary peaks 31.50° and 28.49° 2θ indicate that the phase present is opal-C. The relative quantity of opal-C, calculated using the XRD Method, is 31.3 wt %. Once again, through use of the LH Method, the correct Silica Documentation would show that the crystalline silica content of the product is non-detectable, whereas traditional Silica Documentation comprising data developed through Traditional Methods would improperly show that the sample contains about 31 wt % crystalline silica.

Example 8 Flux-Calcined Diatomite Product Comprising Novel Physical Component and Novel Silica Documentation A sample of ore from another deposit (SIS B-7) was dried, crushed, hammer-milled, then sieved at 80 mesh (177 um). Soda ash (5% by weight) was blended with the minus 80 mesh portion, and the mixture calcined in an electric muffle furnace at 927° C. for 40 minutes. Table 9 presents the data on the resultant product. In this case, the Silica Documentation when prepared with information developed from the LH Method would show 0.1 wt % as quartz, but Silica Documentation when prepared using Traditional Methods would show about 3 wt % combined quartz and cristobalite.

TABLE 9

| Example 8 - Product Data on Sample SIS B-7 | |
|---|---|
| Total Chemistry (XRF expressed as oxides) | |
| $SiO_2$ (wt %) | 85.7 |
| $Al_2O_3$ (wt %) | 6.2 |
| CaO (wt %) | 0.9 |
| MgO (wt %) | 1.0 |
| $Na_2O$ (wt %) | 2.7 |
| $K_2O$ (wt %) | 0.2 |
| $Fe_2O_3$ (wt %) | 2.6 |
| $TiO_2$ (wt %) | 0.4 |
| Permeability (darcy) | 2.61 |
| Wet Bulk Density (g/ml) | 0.26 |
| EBC Soluble Metals | |
| Fe (ppm) | 53 |
| Ca (ppm) | 903 |
| Al (ppm) | 59 |
| As (ppm) | 2.2 |
| Loss on Ignition (%) | 0.4 |
| Opal-C/Cristobalite Analysis | |
| Primary Peak centroid (Å) | 4.08 |
| FWHM (°2θ) | 0.45 |
| Peaks between 10°-37° 2θ | 1 of 4 |
| Opal-C (wt %)[1] | 2.8 |
| Cristobalite (wt %) | 0.0 |
| Quartz (wt %) | 0.1 |

[1]Opal-C quantification is based on XRD Method

Examples 9 Through 13: Flux-Calcined Diatomite Products Comprising Novel Physical Components and Novel Silica Documentation Table 10 presents information regarding processing conditions, physical and chemical characteristics, and silica phase determination for several more flux-calcined and one straight-calcined diatomite products produced in the lab, and not yet commercially available. Most, but not all of these comprise opal-C. Processing conditions include flux composition, flux quantity, calcination or sintering temperature, calcination time, sintering time or the like. All of the samples listed in Table 10 were prepared from different crude ores by the following steps:

drying at 120° C. for 24 hours;

crushing (jaw crusher) to minus 1.25 cm;

milling (hammer-mill) until 99% passes 70 mesh (210 um);

classifying using Federal Equipment Company cyclonic classifier with coarse fraction discarded (typically 10%);

soda ash addition and mixing using a paint shaker;

calcination in muffle furnace in ceramic crucibles; and sieving at 70 mesh with overs brushed through the sieve.

TABLE 10

| Five Additional Examples of Novel Diatomite Products. | | | | | |
|---|---|---|---|---|---|
| | Sample | | | | |
| | 9 HV2BH-E | 10 HV2-F | 11 S3115-C | 12 S3115-E | 13 LCS3-H |
| | Type | | | | |
| | Flux-calcined | Flux-calcined | Straight-Calcined | Flux-calcined | Flux-calcined |
| Soda Ash Addition level (wt %) | 3.0 | 3.0 | 0.0 | 3.0 | 7.0 |
| Calcination Temperature (° C.) | 1020 | 1140 | 1140 | 1020 | 1020 |
| Calcination Time (min.) | 40 | 40 | 40 | 40 | 40 |
| Total Chemistry (XRF expressed as oxides) | | | | | |
| $SiO_2$ (wt %) | 84.7 | 85.6 | 82.6 | 80.7 | 88.3 |
| $Al_2O_3$ (wt %) | 6.5 | 6.6 | 8.3 | 8.2 | 3.3 |
| CaO (wt %) | 0.8 | 0.8 | 2.3 | 2.3 | 0.9 |
| MgO (wt %) | 0.4 | 0.4 | 0.7 | 0.8 | 0.3 |
| $Na_2O$ (wt %) | 2.3 | 2.1 | 0.7 | 2.3 | 4.2 |
| $K_2O$ (wt %) | 0.2 | 0.2 | 0.3 | 0.3 | 0.4 |
| $Fe_2O_3$ (wt %) | 2.9 | 3.2 | 4.2 | 4.2 | 1.8 |
| $TiO_2$ (wt %) | 0.4 | 0.4 | 0.6 | 0.6 | 0.1 |
| Permeability (darcy) | 0.86 | 4.09 | 0.77 | 1.26 | 2.42 |
| Wet Bulk Density (g/ml) | 0.30 | 0.28 | 0.47 | 0.44 | 0.32 |
| EBC Soluble Metals | | | | | |
| Fe (ppm) | 36 | 36 | 49 | 29 | 76 |
| Ca (ppm) | 152 | 95 | 460 | 541 | 253 |
| Al (ppm) | 70 | 72 | 152 | 64 | 25 |
| As (ppm) | 3.3 | 3.9 | 9.3 | 6.4 | 6.2 |
| Loss on Ignition (wt %) | 1.8 | 0.6 | 0.1 | 0.5 | 0.3 |
| Opal-C/Cristobalite Analysis | | | | | |
| Primary Peak centroid(Å) | 4.09 | 4.09 | 4.09 | 4.09 | 4.06 |
| FWHM (°2$^\theta$) | 0.42 | 0.38 | 0.46 | 0.42 | 0.44 |
| Peaks between 10°-37° 2$^\theta$ | 2 of 4 | 3 of 4 | 3 of 4 | 2 of 4 | 4 of 4 |
| Opal-C (wt %)[1] | 8.5% | 27.1% | 23.8% | 7.6% | 0.0% |
| Cristobalite (wt %) | 0.0% | 0.0% | 0.0% | 0.0% | 46.7% |
| Quartz (wt %) | 0.1% | 0.0% | 0.0% | 0.5% | 0.0% |

[1]Opal-C quantification is based on XRD Method

Figure 13:
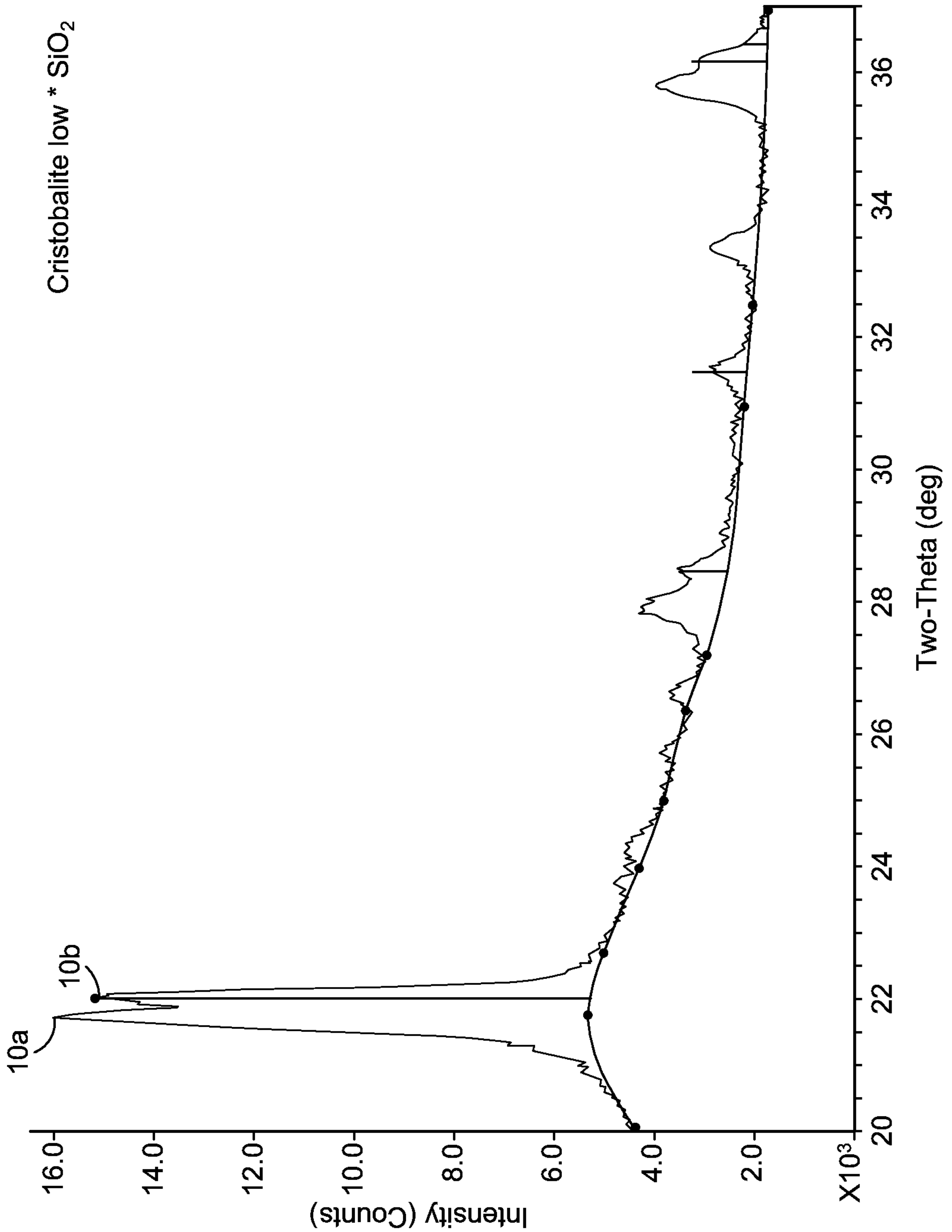
FIG. 13 is a graph of the diffraction pattern of sample HV2BH-E with 5 wt % cristobalite spike (NIST 1879A)
Figure 14:
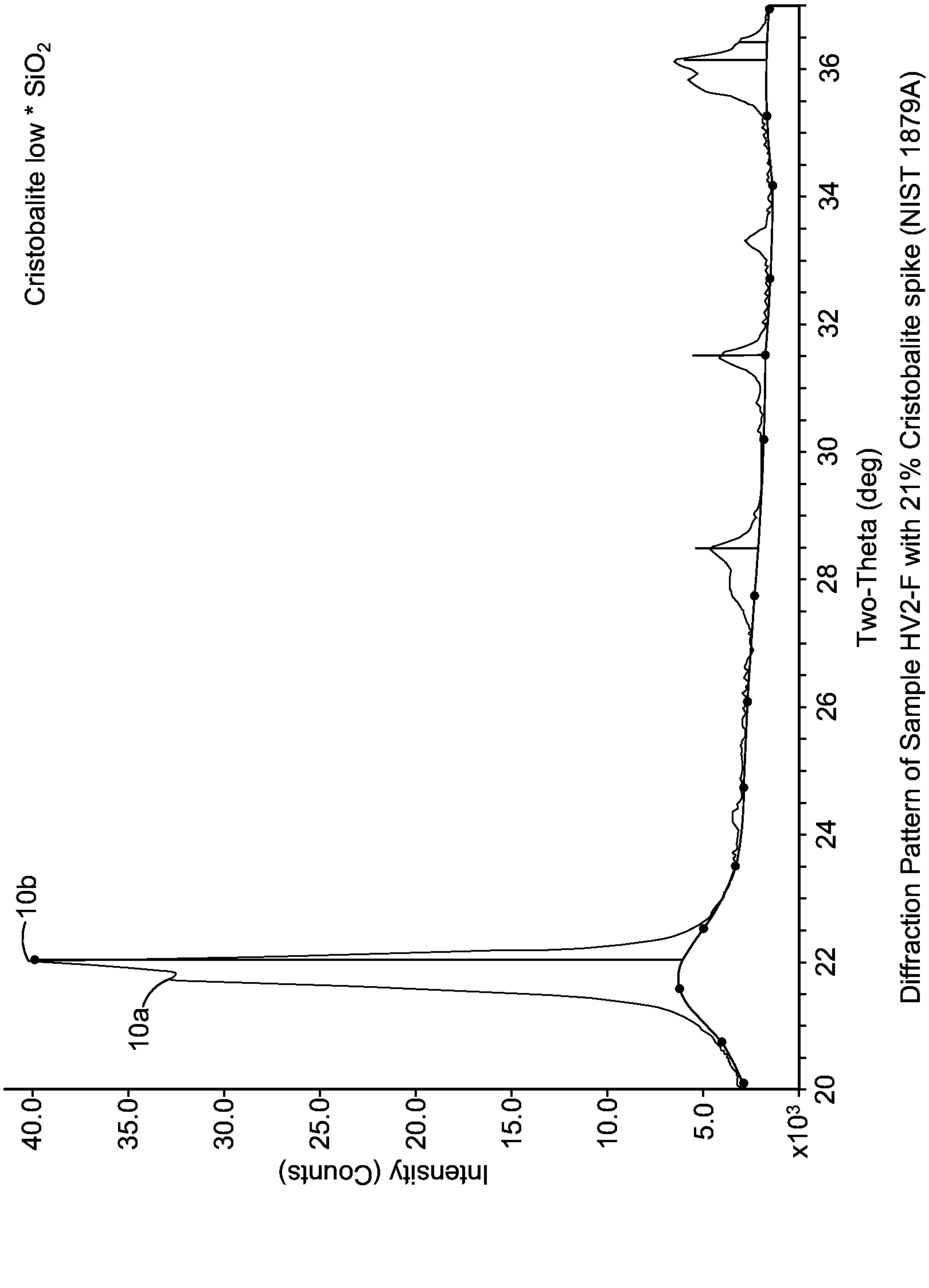
FIG. 14 is a graph of the diffraction pattern of sample HV2-F with 21 wt % cristobalite spike (NIST 1879A)
Figure 15:
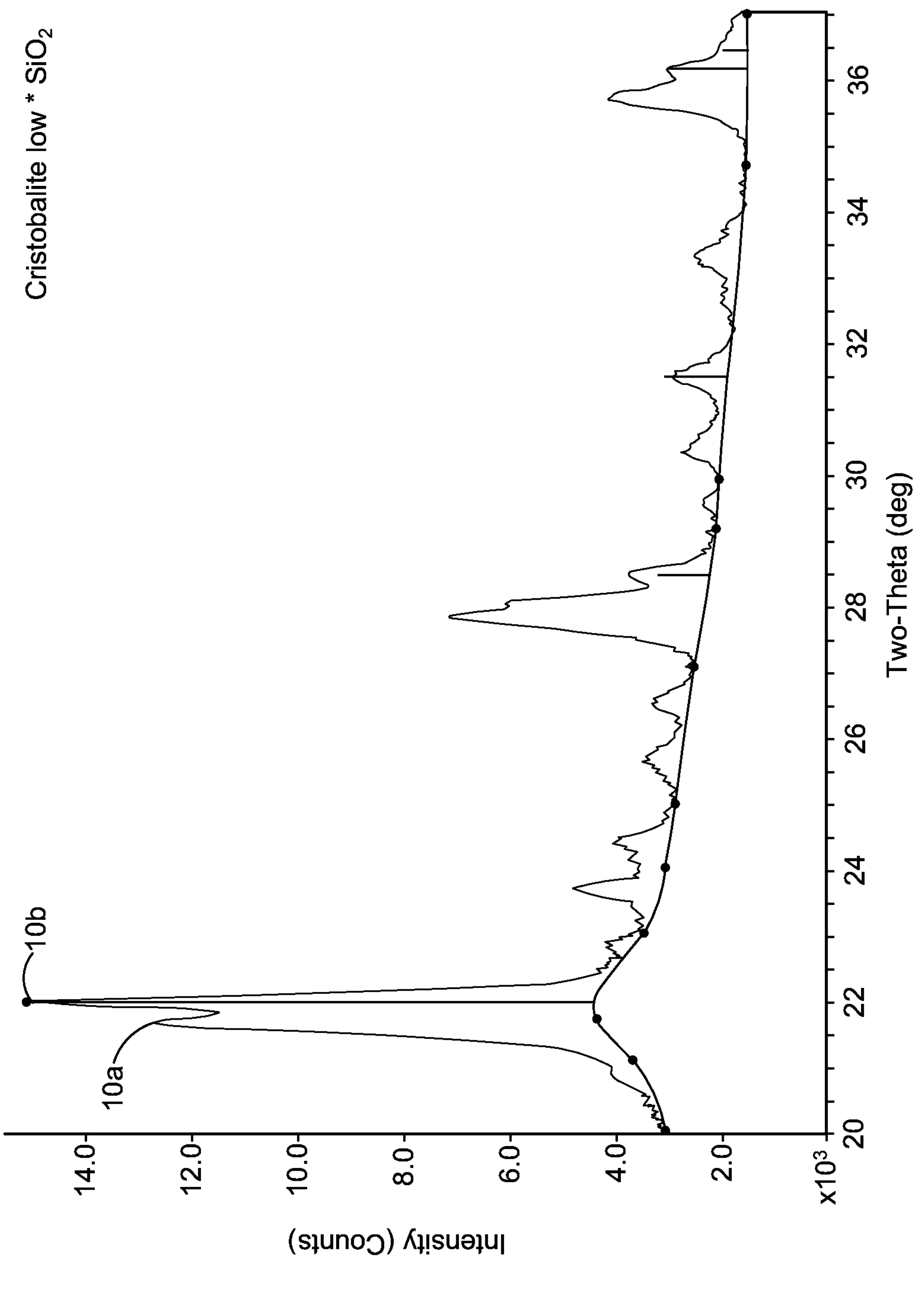
FIG. 15 is a graph of the XRD pattern of sample S3115E with 5 wt % cristobalite spike (NIST 1879A)
Figure 16:
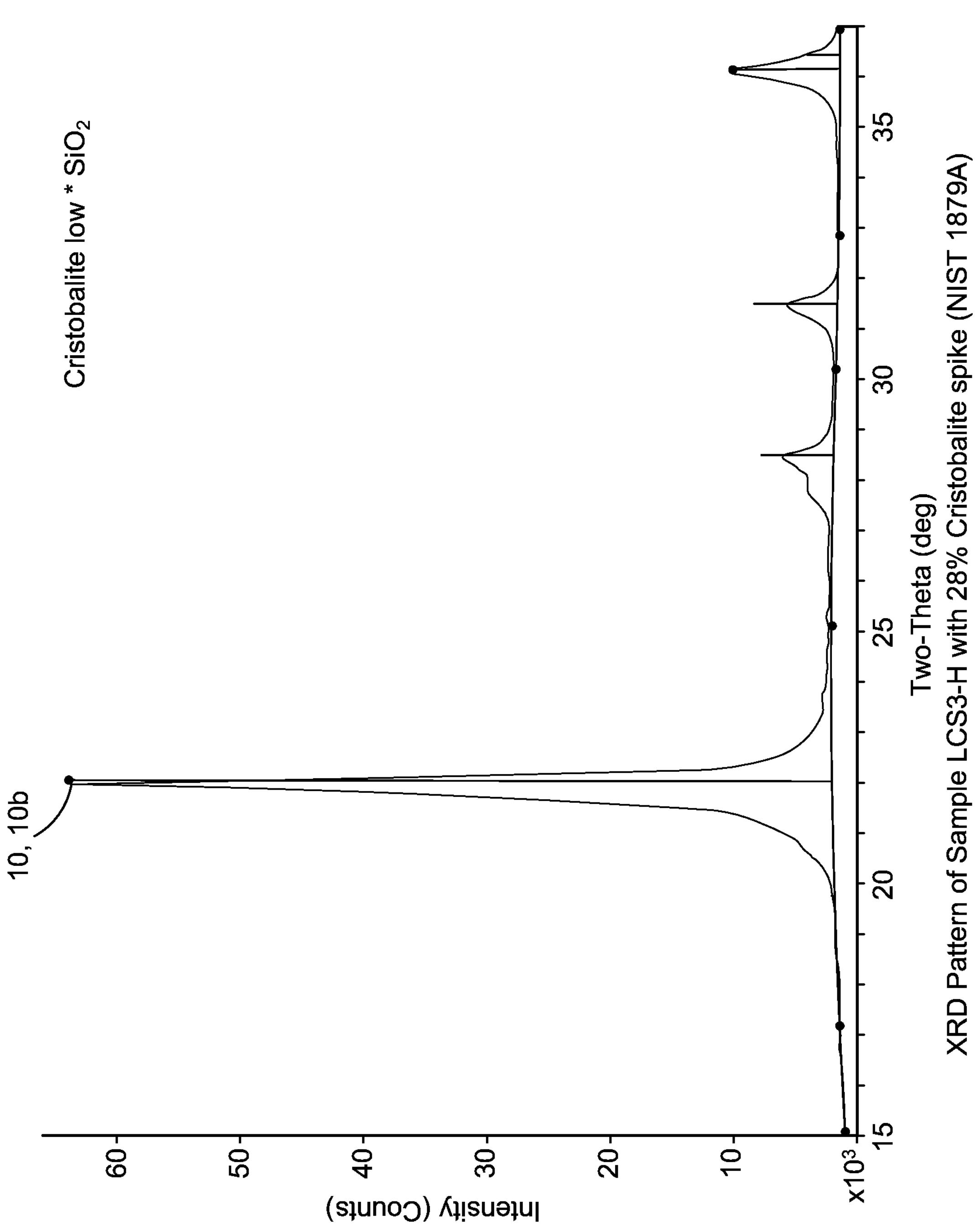
FIG. 16 is a graph of the XRD pattern of sample LCS3-H with 28 wt % cristobalite spike (NIST 1879A)

FIG. 13 shows the diffraction pattern of sample HV2BH-E (Table 10) with a 5 wt % cristobalite spike added. The standard stick pattern of α-cristobalite is super-imposed in FIG. 13. Once again, the primary peak (10*a*) of opal-C is easily distinguished from the primary peak (10*b*) of cristobalite. FIG. 14 shows a similar pattern for sample HV2-F. Both of these samples also comprise minor quantities of feldspar and possible hematite. FIG. 15 presents the diffraction pattern of sample S3115-E with a 5 wt % cristobalite spike and the standard stick pattern of α-cristobalite super-imposed. This sample also comprises significant feldspars, 0.5 wt % quartz, and other crystalline phases, but contains no cristobalite. FIG. 16 shows the XRD pattern of sample LCS3-H, spiked with 28 wt % cristobalite spike and the standard stick pattern of α-cristobalite super-imposed. In this case, the added cristobalite primary peak (10*b*) is not distinguishable from the original primary peak (10). Thus it is most likely that the original sample comprises cristobalite, albeit somewhat poorly-ordered. This sample contains a relatively low percentage of aluminum and iron. When characterized using the LH Method, the Silica Documentation for the first four samples would show non-detectable levels of cristobalite, but two of the four would show low levels of quartz (0.1 wt % and 0.5 wt % respectively). When characterized using Traditional Methods, the Silica Documentation of the first four samples would show 9 wt %, 27 wt %, 24 wt %, and 8 wt % total crystalline silica, respectively. Example 13 (LCS3-H) when characterized by either the LH Method or Traditional Methods would show about 47 wt % cristobalite before addition of the spike.

Examples 14 Through 18: Flux-Calcined Diatomite Products Comprising Novel Physical Components and Novel Silica Documentation Table 11 contains data related to samples collected from a production-scale trial conducted in December, 2015 in EP Minerals' Vale, Oreg. facility. All samples were flux-calcined with soda ash. Example 14 is a sample of a finished product from the production-scale trial. Examples 15 and 16 are samples of kiln discharge that were classified in the laboratory. Examples 17 and 18 are samples of kiln feed that were flux-calcined in the laboratory under controlled conditions.

TABLE 11

Sample Data from Plant Trial, December 2015

| | Sample | | | | |
|---|---|---|---|---|---|
| | 14 FEBH 15:15 | 15 KD 11:30 | 16 KD 15:30 | 17 2-31 10:15 | 18 2-31 13:15 |
| | Type | | | | |
| | Flux-calcined | Flux-calcined | Flux-calcined | Flux-calcined | Flux-calcined |
| Calcination Temperature (° C.) | n/a | n/a | n/a | 927 | 1020 |
| Calcination Time (min.) | n/a | n/a | n/a | 40 | 40 |
| Total Chemistry (XRF expressed as oxides) | | | | | |
| $SiO_2$ (wt %) | 89.7 | 85.6 | 85.6 | 86.0 | 83.4 |
| $Al_2O_3$ (wt %) | 3.9 | 5.8 | 5.4 | 5.5 | 6.0 |
| CaO (wt %) | 0.5 | 0.7 | 0.7 | 0.7 | 0.8 |
| MgO (wt %) | 0.3 | 0.4 | 0.4 | 0.4 | 0.4 |
| $Na_2O$ (wt %) | 2.9 | 3.9 | 4.2 | 3.8 | 5.2 |
| $K_2O$ (wt %) | 0.1 | 0.1 | 0.1 | 0.2 | 0.2 |
| $Fe_2O_3$ (wt %) | 1.6 | 2.8 | 3.0 | 2.7 | 3.2 |
| $TiO_2$ (wt %) | 0.2 | 0.3 | 0.4 | 0.3 | 0.4 |
| Permeability (darcy) | 0.09 | 0.78 | 2.72 | 0.61 | 1.60 |
| Wet Bulk Density (g/ml) | 0.42 | 0.30 | 0.35 | 0.32 | 0.31 |
| EBC Soluble Metals | | | | | |
| Fe (ppm) | 126 | 158 | 63 | 93 | 55 |
| Ca (ppm) | 106 | 184 | 107 | 197 | 226 |
| Al (ppm) | 43 | 53 | 33 | 46 | 37 |
| As (ppm) | 1.5 | 0.9 | 1.7 | 1.0 | 0.6 |
| Loss on Ignition (wt %) | 0.8 | 0.3 | 0.1 | 0.3 | 0.3 |
| Opal-C/Cristobalite Analysis | | | | | |
| Primary Peak centroid(Å) | 4.08 | 4.08 | 4.08 | 4.07 | 4.09 |
| FWHM (°2$^{\theta}$) | 0.50 | 0.46 | 0.49 | 0.48 | 0.52 |
| Peaks between 10°-37° 2$^{\theta}$ | 2 of 4 | 3 of 4 | 3 of 4 | 3 of 4 | 2 of 4 |
| Opal-C (wt %)[1] | 18.5% | 6.4% | 31.9% | 6.9% | 6.7% |
| Cristobalite (wt %) | 0.0% | 0.0% | 0.0% | 0.0% | 0.0% |
| Quartz (wt %) | 0.0% | 0.0% | 0.1% | 0.0% | 0.0% |

[1]Opal-C quantification is based on XRD Method

Figure 17:
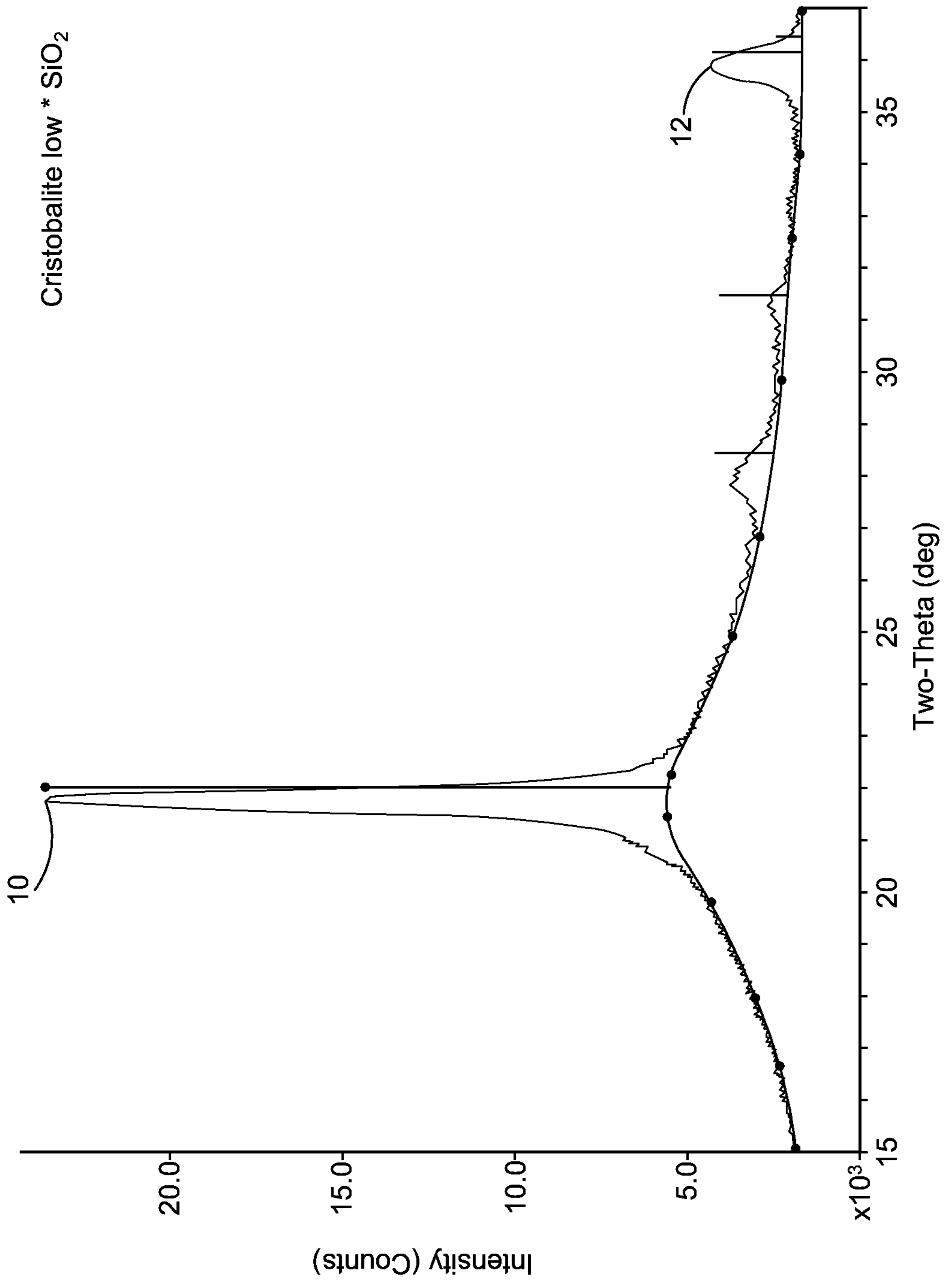
FIG. 17 is a graph of the diffraction pattern of sample FEBH showing opal-C plus minor feldspar.
Figure 18:
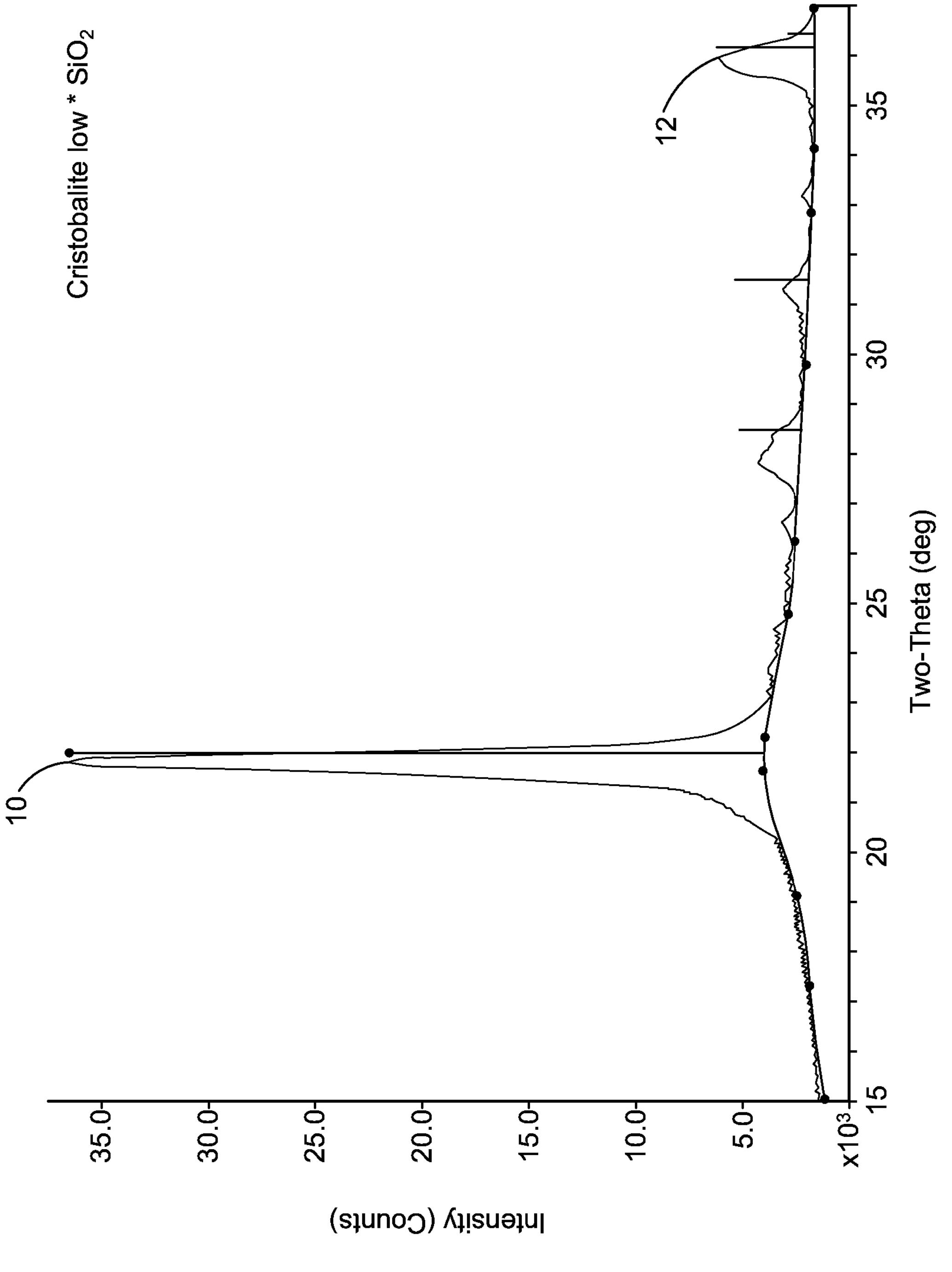
FIG. 18 is a graph of the diffraction pattern of example 15 (KD 15:30) showing opal-C plus feldspar.

FIG. 17 shows the XRD pattern for example 14 (FEBH). This sample comprises opal-C plus minor feldspar. FIG. 18 shows the XRD pattern associated with example 16 (KD 15:30). Once again, it exhibits characteristics of opal-C. These two patterns are typical of all those associated with the trial. The standard stick pattern of α-cristobalite is super-imposed in FIGS. 17-18.

For four of these five samples, the Silica Documentation would show non-detectable levels of crystalline silica when characterized using the LH Method, while example 16 (KD 15:30) would show no cristobalite but 0.1 wt % quartz. Using the Traditional Method for characterization, the five samples would show about 18 wt %, 6 wt %, 32 wt %, 7 wt %, and 7 wt % crystalline silica respectively.

Figure 19:
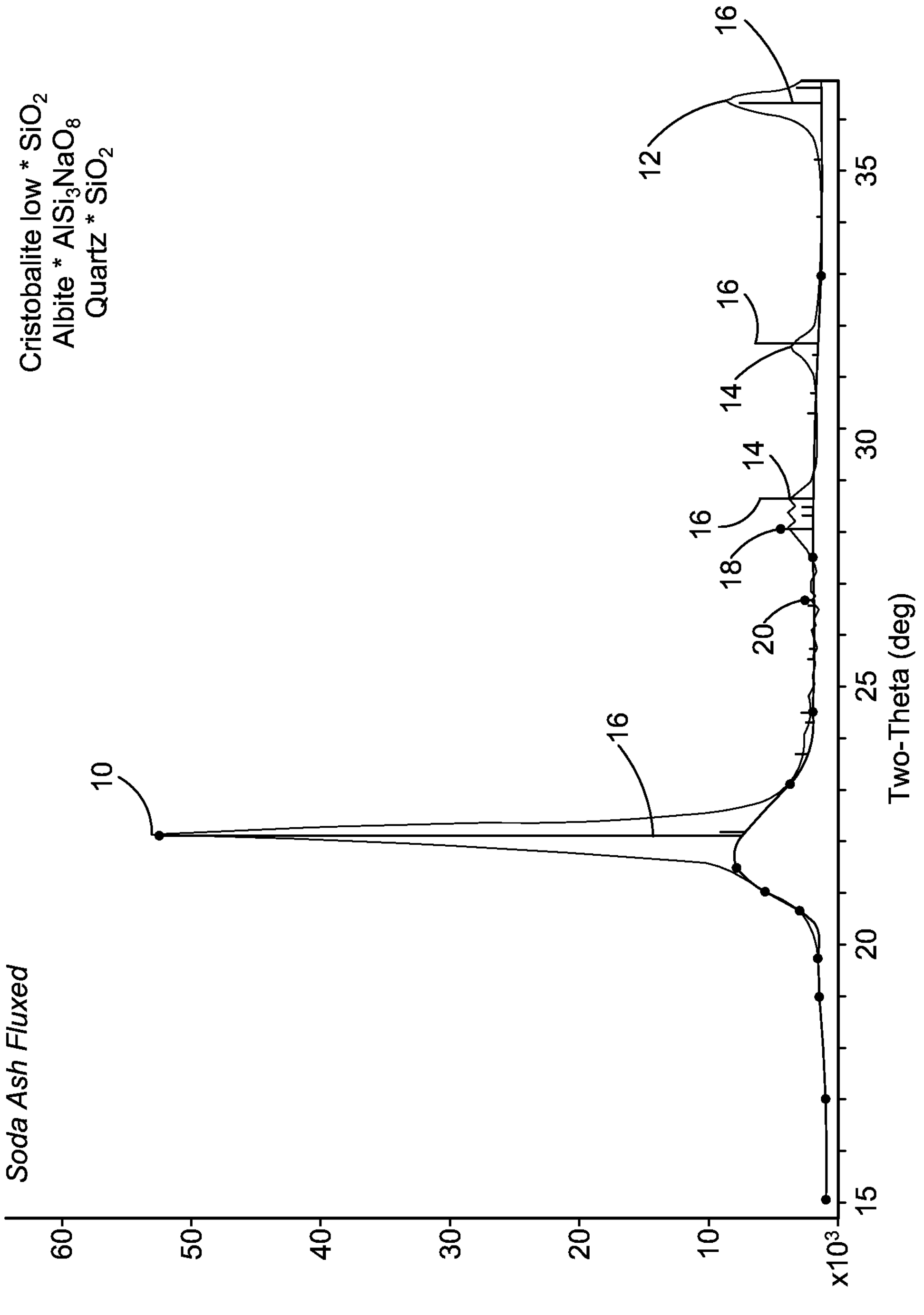
FIG. 19 is a graph of the XRD scan pattern of soda ash flux-calcined diatomite made from LCS-3, showing the presence of cristobalite.
Figure 20:
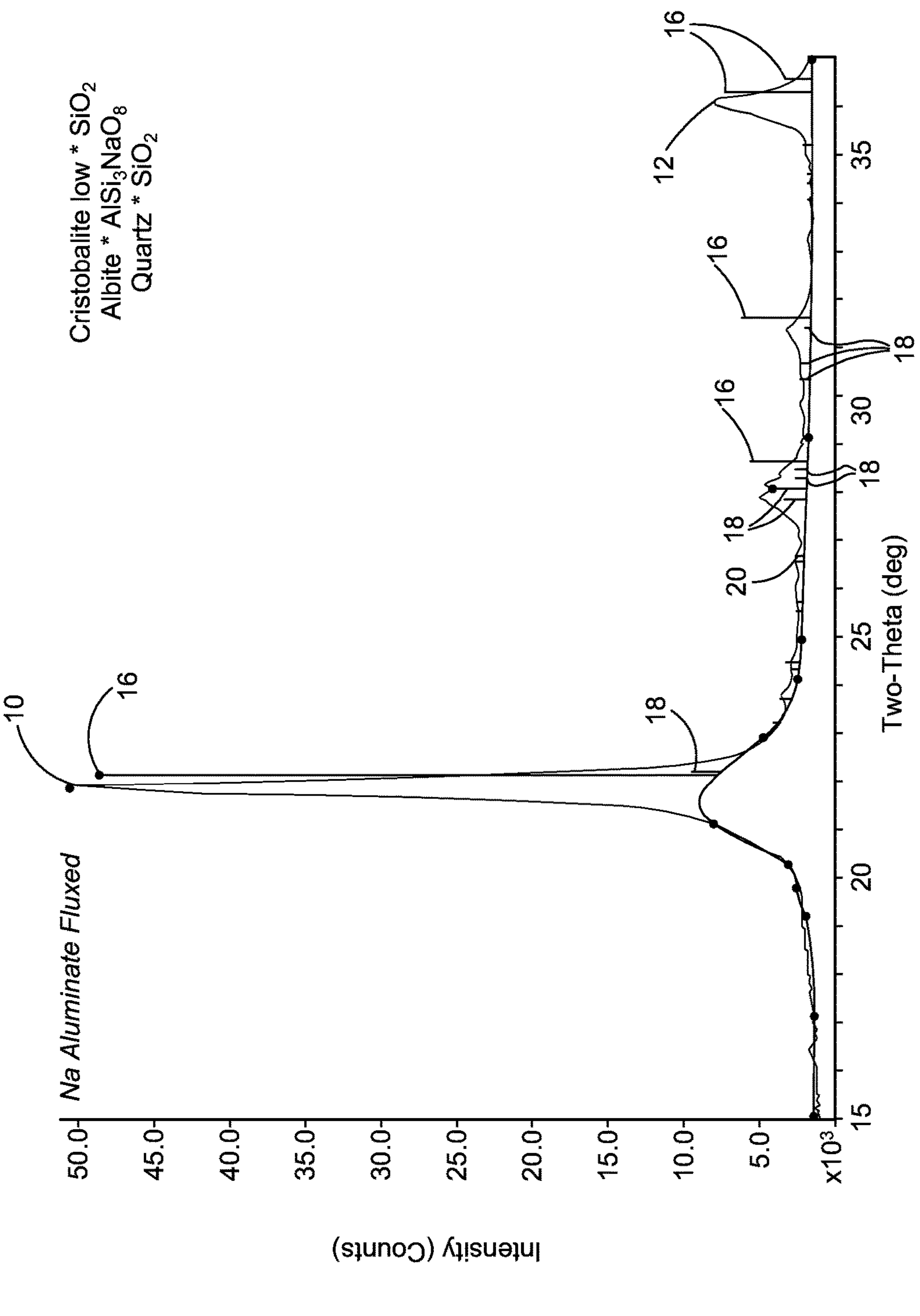
FIG. 20 is a graph of the XRD scan patterns of sodium aluminate flux-calcined diatomite made from LCS-3, showing the presence of opal-C and 0.1 wt % quartz.

Example 19: Diatomite Products Comprising Alkali Metal Aluminates and Novel, Silica Documentation US Patent Publication 2014/0,035,243A1 by Wang et al. teaches a method of producing reduced content of soluble iron in diatomite filter aids by using an alkali metal aluminate as a fluxing agent. In this example, the impact of the fluxing agent on crystalline silica formation during flux-calcination of diatomite is examined by comparing a sodium aluminate ($NaAlO_2.xH_2O$) fluxed sample against a soda ash fluxed sample. A natural diatomite product of EP Minerals, LCS-3, made from an ore mined from the Horseshoe Basin deposit in northern Nevada, was used as the starting material. The major elemental composition of the diatomite, as determined by wave-length dispersive x-ray fluorescence (XRF) analysis and presented on the ignited basis, is listed in Table 12. It had a relatively low content of $Al_2O_3$. The soda ash used was of −325 mesh (−44 μm) and, before use, was brushed through a 100-mesh sieve on to the diatomite in a desired ratio. The sodium aluminate used was a moist powder and contained 24.6 wt % total free and bound water. A desired amount of sodium aluminate was premixed and co-milled with 0.5 g of the same diatomite by hand in a mortar and pestle set and then brushed through a 100-mesh sieve on to the rest of diatomite to be calcined. Each of the flux-added diatomite samples were mixed in a jar in a paint shaker. Flux-calcination was carried out in a ceramic crucible by heating in a muffle furnace at 649° C. for 40 minutes. After cooling, the flux-calcined samples were dispersed through a 70-mesh screen by ro-tapping. Both 4 wt % soda ash and 8 wt % sodium aluminate fluxed samples had similar permeability (about 1.3-1.5 darcy) and similar wet bulk density (about 0.28 g/cc). Analytical results (using the LH Method and the XRD Method) of the flux-calcined products are shown in Table 13 and FIGS. 19-20. FIG. 19 illustrates the results for the soda ash flux-calcined diatomite sample, and FIG. 20 illustrates the results for the sodium aluminate flux-calcined diatomite sample. The standard stick patterns of α-cristobalite (16), albite (18) and quartz (20) are super-imposed on FIGS. 19-20. Both samples had about the same X-ray diffraction counts at the 22° primary peak (10), however, their silica crystallinities are significantly different: the soda ash fluxed sample (FIG. 19) shows an XRD scan pattern of cristobalite but the sodium aluminate fluxed sample (FIG. 20) is clearly opal-C, as demonstrated by the shifts of the primary (10) and secondary (12) peaks and absence of the tertiary peaks (14) at 31.50° and 28.49° 2θ (see also, Table 13). The formation of opal-C instead of cristobalite in the sodium aluminate fluxed product negates the need to list cristobalite in its Safety Data Sheet as a health hazard. It is conceivable that a diatomite feed material containing less than 0.1 wt % or non-detectable level of quartz would result in less than 0.1 wt % or non-detectable level of quartz in the product which enables non-listing quartz in the safety data sheet as well.

In Example 19, the Silica Documentation would show about 35 wt % and 0.1 wt % crystalline silica for the two samples respectively when prepared through use of the LH Method, but about 35 wt % and about 32 wt % crystalline silica respectively when prepared through use of Traditional Methods.

TABLE 12

Major Oxide Composition of Natural Diatomite LCS-3 used in this Study (Ignited Basis)

| | $SiO_2$ | $Al_2O_3$ | CaO | MgO | $Na_2O$ | $K_2O$ | $Fe_2O_3$ | $TiO_2$ | LOI |
|---|---|---|---|---|---|---|---|---|---|
| wt % | 92.7 | 3.23 | 0.87 | 0.35 | 0.46 | 0.36 | 1.73 | 0.13 | 7.4 |

TABLE 13

XRD analysis Using the LH Method and the XRD Method on flux-calcined LCS-3 based DE samples with or without Al-additive

| Fluxing Agent or Additive* | 22° peak | | Secondary and tertiary cristobalite peaks | | | 4 Å phase determination | | Quartz | Total crystal. silica |
|---|---|---|---|---|---|---|---|---|---|
| (wt %) | Centroid Å | FWHM ° | 36.2° | 31.5° | 28.5° | Phase | wt % | wt % | wt % |
| 4.0% $Na_2CO_3$ | 4.02 | 0.378 | Yes | Yes | Yes | Cristobalite | 34.5 | ND | 34.5 |
| 8.0% $NaAlO_2$ | 4.06 | 0.385 | Shifted | Poor | Poor | Opal-C | 32.4 | 0.1 | 0.1 |
| 5.1% $Na_2CO_3$ + 4.2% 0.3μ $Al_2O_3$ | 4.07 | 0.432 | Shifted | Poor | Poor | Opal-C | 24.0 | 0.3 | 0.3 |
| 5.0% $Na_2CO_3$ + 6.2% 1.7μ $Al(OH)_3$ | 4.06 | 0.436 | Yes | Poor | Poor | Cristobalite | 28.5 | <0.1 | 28.6 |
| 6.2% 18μ $Al(OH)_3$ | 4.07 | 0.311 | Shifted | Poor | no | Opal-C | 9.0 | 0.2 | 0.2 |
| None | 4.08 | 0.334 | Shifted | Poor | no | Opal-C | 8.5 | 0.25 | 0.25 |

*As-is basis.

Example 20: Diatomite Products Comprising Alumina Additives and Novel Silica Documentation US Patent Publication 2015/0129490A1 by Wang et al. teaches a method of producing reduced content of soluble iron in diatomite filter aids by using fine powder of alumina ($Al_2O_3$) or aluminum hydroxide ($Al(OH)_3$) as an additive. Aluminum hydroxide is otherwise called aluminum trihydrate or ATH. In one of the embodiments described in the application, an alumina or ATH additive is used in conjunction with soda ash in diatomite flux-calcination. In this example, the effect of the alumina or aluminum hydroxide on crystalline silica formation of soda ash flux-calcined diatomite is examined. The aluminum additives tested include a 0.3-μ α-alumina powder from Electron Microscopy Sciences, Hatfield, Pa., USA (cat. #50361-05) and an aluminum hydroxide powder of Huber Engineered Materials, Atlanta, Ga., USA, Hydral® 710. Analyses on the samples show the former having a free moisture of <0.2 wt % and a specific surface area of 24.2 $m^2/g$ and the latter a free moisture of 12.9 wt %, a specific surface area of 4.0 $m^2/g$ and a median particle size of 1.7 μm. The same natural diatomite LCS-3 and soda ash and the same experimental procedures and conditions used in Example 19 were used in the current examples. The sample made with 5.1 wt % soda ash and 4.2 wt % 0.3μ-alumina had 0.88 darcy permeability and 0.33 g/cc wet bulk density while the one made with 5.0 wt % soda ash and 6.2 wt % of the 1.7μ aluminum hydroxide (Hydral 710) had 1.2 darcy permeability and 0.29 g/cc wet bulk density.

Figure 21:
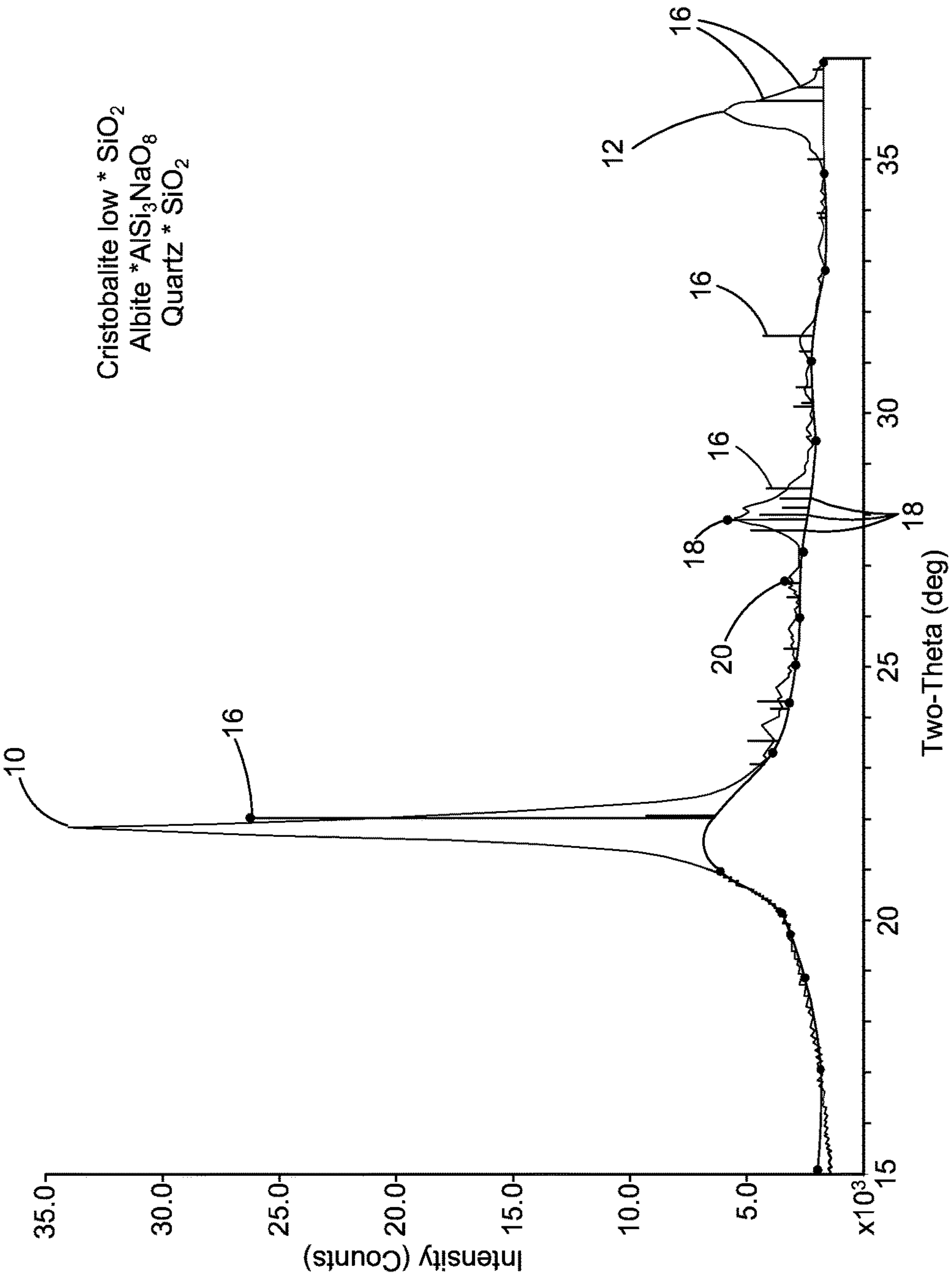
FIG. 21 is a graph of the XRD scan patterns of soda ash and 0.3μ alumina flux-calcined diatomite made from LCS-3, showing the presence of opal-C and 0.3 wt % quartz.
Figure 22:
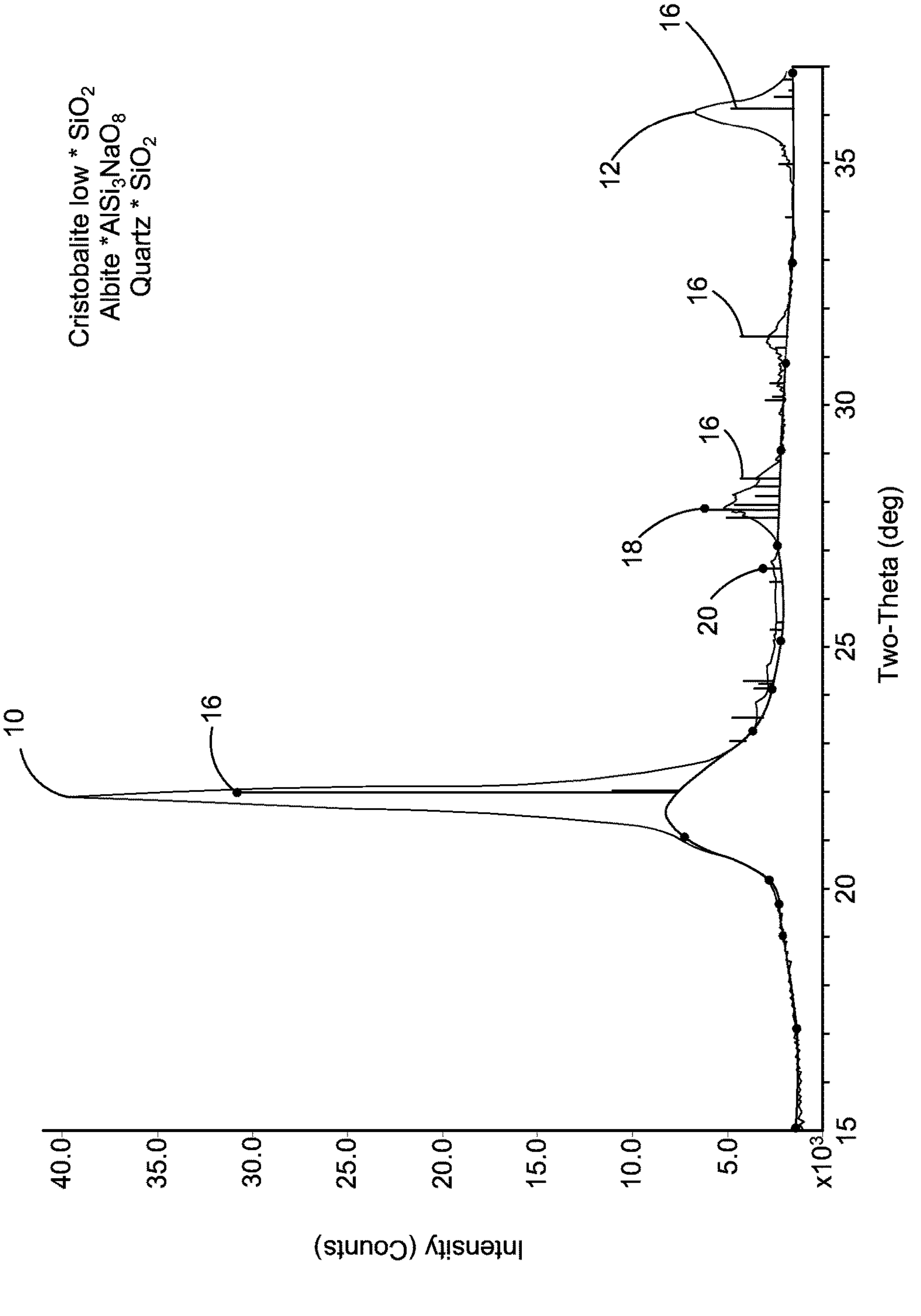
FIG. 22 is a graph of the XRD scan patterns of soda ash and 1.7μ ATH flux-calcined diatomite made from LCS-3, showing the presence of cristobalite and <0.1 wt % quartz.

FIG. 21 illustrates the results for the soda ash and 0.3μ-alumina flux-calcined diatomite sample, and FIG. 22 illustrates the results for the soda ash and 1.7μ ATH flux-calcined diatomite sample. The standard stick patterns of α-cristobalite (16), albite (18) and quartz (20) are super-imposed on FIGS. 21-22. Analysis on the products show that while the soda ash fluxed sample of FIG. 19 has an XRD scan pattern of cristobalite, the addition of 3p, alumina changed the phase to that of opal-C (see FIG. 21), as demonstrated by the shifts of the primary and secondary peaks (10, 12) and the absence of the tertiary peaks (see also Table 13). However, the addition of 1.7μ ATH to flux-calcination of diatomite did not inhibit cristobalite formation (Table 13, FIG. 22). More than 0.1 wt % quartz remained in the product in which 0.3μ alumina was added which can be avoided if a non-quartz containing diatomite is used as the feedstock.

In Example 20, the Silica Documentation would show that the products contain about 0.3 wt % and 29 wt % crystalline silica respectively when characterized through use of the LH Method, but would contain about 24 wt % and about 29 wt % crystalline silica respectively when characterized through use of the Traditional Method.

Example 21: Diatomite Products Comprising Alumina Additives and Novel Silica Documentation Patent Publication WO 2015/0,069,432A1 by Wang et al. teaches a method of producing reduced content of soluble arsenic in diatomite filter aids by using aluminum hydroxide or tri-hydrate (ATH) as an additive. In one of the embodiments described in the application, ATH powder is used as an additive in straight-calcination of diatomite. In this example, the impact of ATH on crystalline silica formation in straight-calcined diatomite is examined. The ATH additive tested was a powder from R.J. Marshall Co., Southfield, Mich., USA, having a 18 μm median particle size, 1.0 $m^2/g$ specific surface area and <1 wt % free moisture. Straight-calcinations of the same natural diatomite LCS-3, with or without the ATH additive, were carried out with the same experimental procedures and under the same conditions used in Example 19. The straight-calcined samples, with 6.2 wt % ATH and without, had 0.16 and 0.15 darcy permeability and 0.25 and 0.34 g/cc wet bulk density, respectively.

Figure 23:
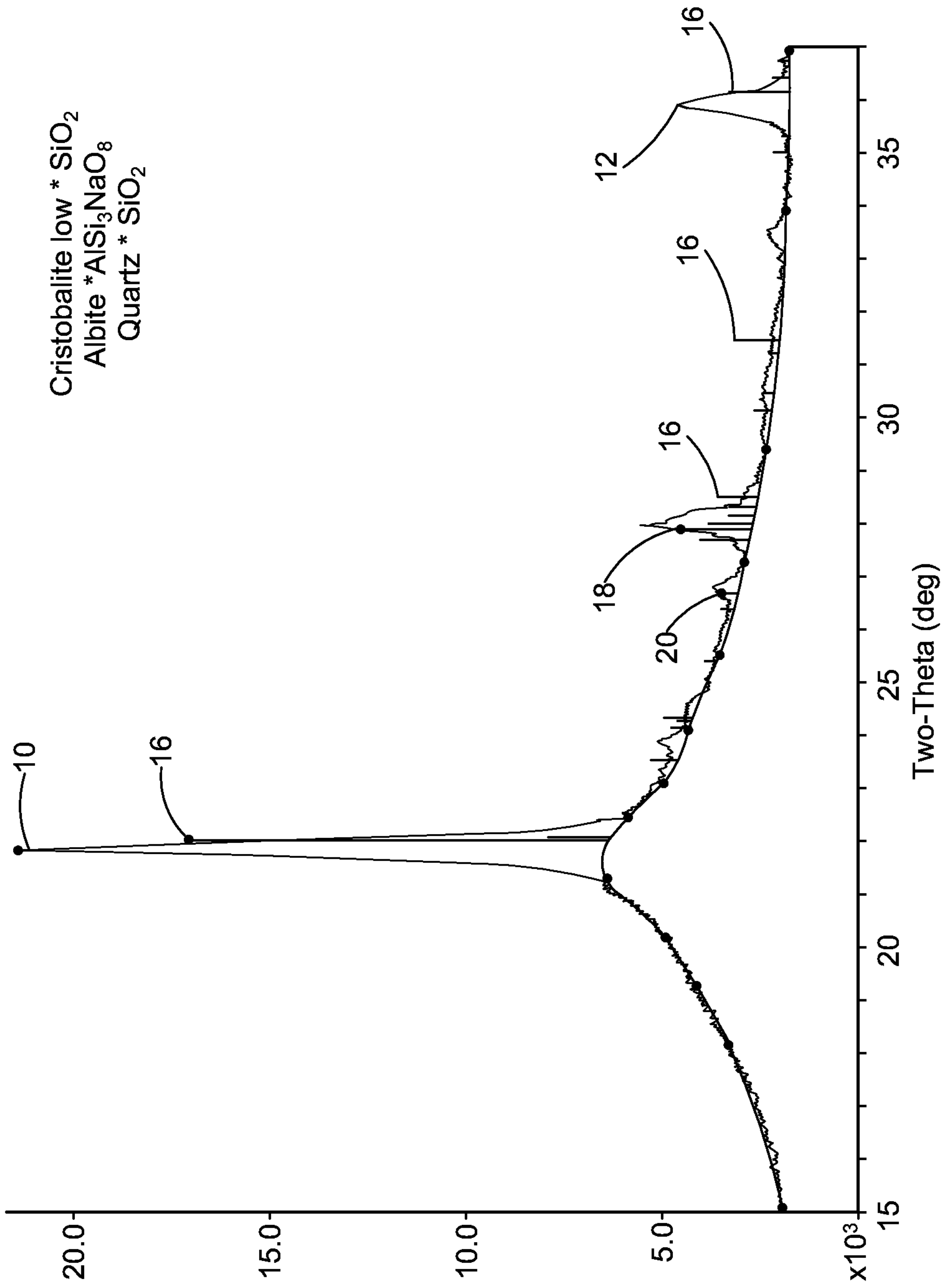
FIG. 23 is a graph of the XRD scan patterns of calcined diatomite made from LCS-3, showing the presence of opal-C and 0.2 wt % quartz.
Figure 24:
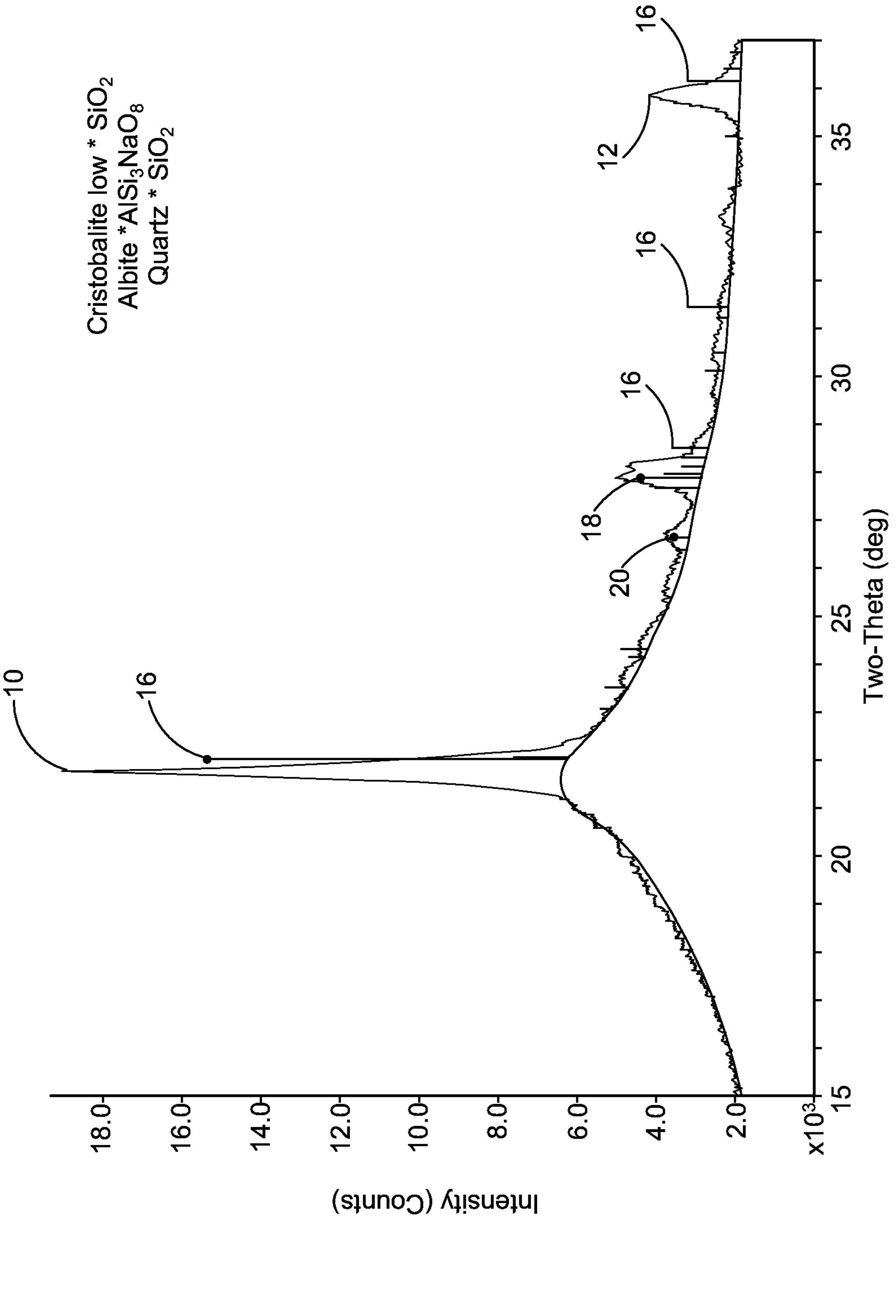
FIG. 24 is a graph of the XRD scan patterns of calcined diatomite made from LCS-3 with ATH additive, showing the presence of opal-C and 0.25 wt % quartz.

FIG. 23 illustrates the results for the straight-calcined diatomite sample, and FIG. 24 illustrates the results for the straight-calcined diatomite sample with ATH additive. The standard stick patterns of α-cristobalite (16), albite (18) and quartz (20) are super-imposed on FIGS. 23-24. Cristobalite did not form in either product as demonstrated by their XRD scan patterns in which both primary and secondary peaks (10, 12) were disposed at respective lower angles than that of of cristobalite and the tertiary peaks were absent (FIGS. 23-24 and Table 13). More than 0.1 wt % quartz remained in both products which can be avoided if a non-quartz diatomite is used as the feedstock.

In Example 21, the Silica Documentation would show that the products contain about 0.2 wt % and about 0.3 wt % crystalline silica when characterized through use of the LH Method, but about 9 wt % crystalline silica in each when characterized through use of the Traditional Method.

Figure 25:
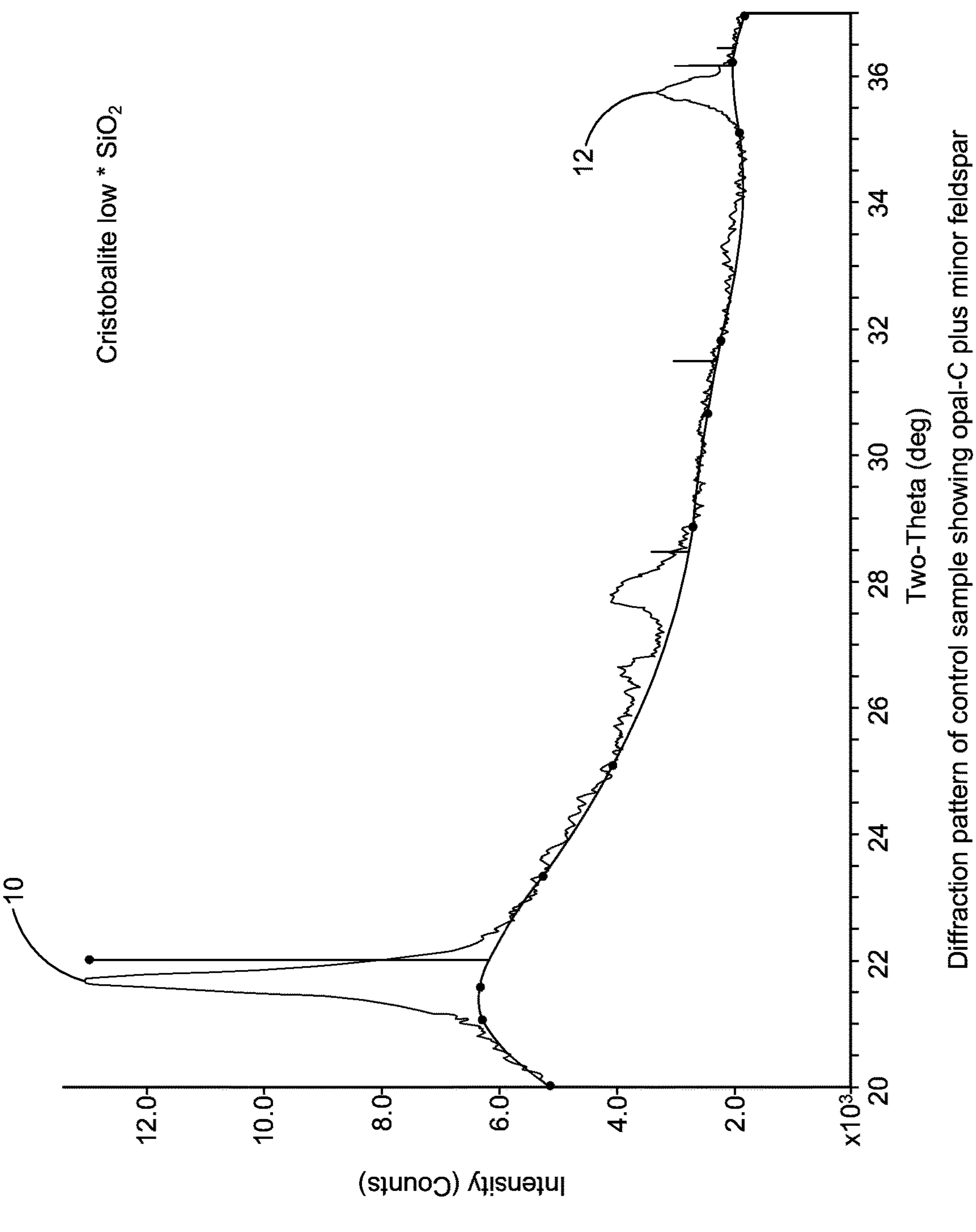
FIG. 25 is a graph of the diffraction pattern of control sample showing opal-C plus minor feldspar.
Figure 26:
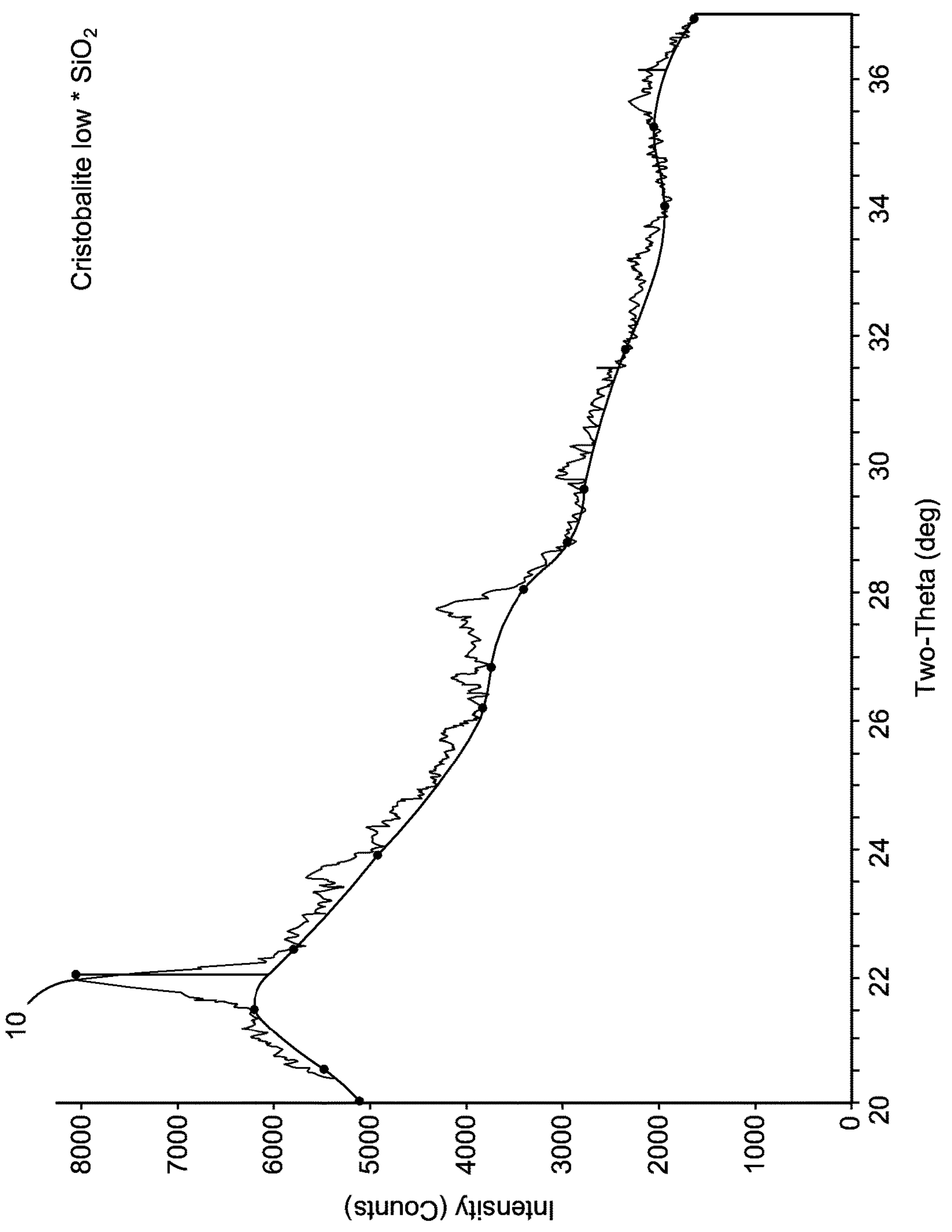
FIG. 26 is a graph of the diffraction pattern of test sample with 5 wt % KASOLV® showing possible cristobalite.

Example 22: Diatomite Products Comprising a Potassium Silicate Binder and Novel Silica Documentation U.S. Pat. No. 9,095,842 by Nannini et al. teaches a method of producing low crystalline silica diatomite products with a large permeability range by adding potassium silicate to the natural diatomite and calcining. A sample was prepared using this technique, and compared with a sample of the same material straight-calcined without the potassium silicate additive, ie the control sample. A natural diatomite product called Celawhite™ was used as the starting material. Five (5) wt % of potassium silicate (KASOLV® 16 potassium silicate) was added to one representative portion of the Celawhite, and then it and another representative portion of the Celawhite without the additive were placed in ceramic crucibles and straight-calcined in a laboratory muffle furnace at 1038° C. for 45 minutes. After cooling, the two samples were dispersed through a 70-mesh sieve and analyzed. Use of the additive increased the permeability of the product to 0.29 darcy in comparison to a permeability of 0.13 darcy with the control sample (the sample without potassium silicate additive). The primary diffraction peak also decreased about 80% from that of the control (from 6.2% to 1.3%, quantified using the XRD method). The primary peak (10) of the control sample (FIG. 25) is indicative of opal-C. Interestingly, the primary peak (10) of the test sample with 5 wt % KASOLV®, as compared to that of the control sample, is shifted toward a peak indicative of cristobalite (see FIG. 26). FIGS. 25 and 26 show the diffraction patterns of the control and test sample respectively. The standard stick pattern of α-cristobalite is super-imposed on FIGS. 25-26.

In Example 22, the Silica Documentation would show that the straight-calcined control product contains no crystalline silica when characterized through use of the LH Method, but 6.2 wt % crystalline silica when characterized through use of the Traditional Method. The straight-calcined sample with potassium silicate additive would have Silica Documentation that shows 1.3 wt % cristobalite via either method.

Example 23: Composite Filtration Media Comprising Novel Silica Documentation

PCT Patent Application No. PCT/US15/65572 by Wang et al. teach a method of producing composite filtration media of diatomite and expanded perlite, with or without the presence of a fluxing agent. In certain embodiments of the invention, the composite filtration media may contain neither more than 0.1 wt % of any phase of crystalline silica nor opal-C or opal-CT. In other embodiments of the invention, the composite filter media may contain opal-C or opal-CT quantified according to the LH Method, phases that might be characterized as cristobalite by the Traditional Method. In further other embodiments, the composite filter media may contain a small amount of cristobalite as determined by either method. A few examples of these composite filter media products are listed in Table 14. All of these products contain either less than 0.1 wt % or non-detectable amount of quartz.

TABLE 14

Example 23 - XRD analysis on selected diatomite-perlite composite products

| | Feed and process parameters | | | | Composite product crystallinity | | | | | |
|---|---|---|---|---|---|---|---|---|---|---|
| | | | | | 22° 2θ Peak | | 28.5° | | | |
| Examp. | DE/Perlite | Fluxing agent | | Temp. | | FWHM | 2θ | LOI | 4-Å phase | |
| 23- | wt ratio | Type | wt % | ° C. | d Å | ° 2θ | Peak | wt % | Phase | wt % |
| 1 | 75/25 | None | 0 | 982 | 4.08 | 0.33 | no | 0.43 | Opal-C/CT | <0.1 |
| 2 | 50/50 | $Na_2CO_3$ | 1.0 | 982 | 4.06 | 0.30 | no | 0.80 | Opal-C/CT | 0.5 |
| 3 | 50/50 | $Na_2CO_3$ | 2.0 | 927 | 4.03 | 0.34 | poor | 1.1 | Cristobalite | 1.2 |
| 4 | 25/75 | $Na_2CO_3$ | 2.0 | 927 | 4.05 | 0.29 | poor | 1.2 | Opal-C/CT | 0.5 |
| 5 | 75/25 | $Na_2CO_3$ | 5.0 | 871 | 4.06 | 0.42 | poor | 0.17 | Opal-C/CT | 17.5 |

TABLE 14-continued

Example 23 - XRD analysis on selected diatomite-perlite composite products

| | Feed and process parameters | | | | Composite product crystallinity | | | | | |
|---|---|---|---|---|---|---|---|---|---|---|
| | | | | | 22° 2θ Peak | | 28.5° | | | |
| Examp. | DE/Perlite | Fluxing agent | | Temp. | | FWHM | 2θ | LOI | 4-Å phase | |
| 23- | wt ratio | Type | wt % | ° C. | d Å | ° 2θ | Peak | wt % | Phase | wt % |
| 6 | 50/50 | $Na_2CO_3$ | 5.0 | 871 | 4.06 | 0.40 | poor | 0.19 | Opal-C/CT | 13.3 |
| 7 | 25/75 | $Na_2CO_3$ | 5.0 | 871 | 4.08 | 0.40 | poor | 0.29 | Opal-C/CT | 5.8 |
| 8 | 50/50 | $Na_2CO_3$ | 7.0 | 704 | 4.06 | 0.31 | poor | 1.2 | Opal-C/CT | 2.3 |
| 9 | 50/50 | $Na_2CO_3$ | 7.0 | 760 | 4.02 | 0.35 | poor | 0.63 | Cristobalite | 2.9 |
| 10 | 25/75 | $Na_2CO_3$ | 7.0 | 760 | 4.06 | 0.34 | no | 0.64 | Opal-C/CT | 1.3 |
| 11 | 50/50 | $H_3BO_3$ | 3.0 | 816 | 4.06 | 0.29 | no | 0.99 | Opal-C/CT | 0.1 |
| 12 | 50/50 | $K_2CO_3$ | 5.0 | 816 | 4.05 | 0.33 | no | 1.4 | Opal-C/CT | 1.2 |
| 13 | 50/50 | $K_2SiO_3$ | 5.0 | 816 | 4.06 | 0.29 | poor | 1.5 | Opal-C/CT | 1.3 |
| 14 | 25/75 | $K_2SiO_3$ | 6.8 | 816 | 4.06 | 0.27 | poor | 1.2 | Opal-C/CT | 1.4 |

Example 24: Grinding to Differentiate Opal-C from β-Cristobalite

Figure 27:
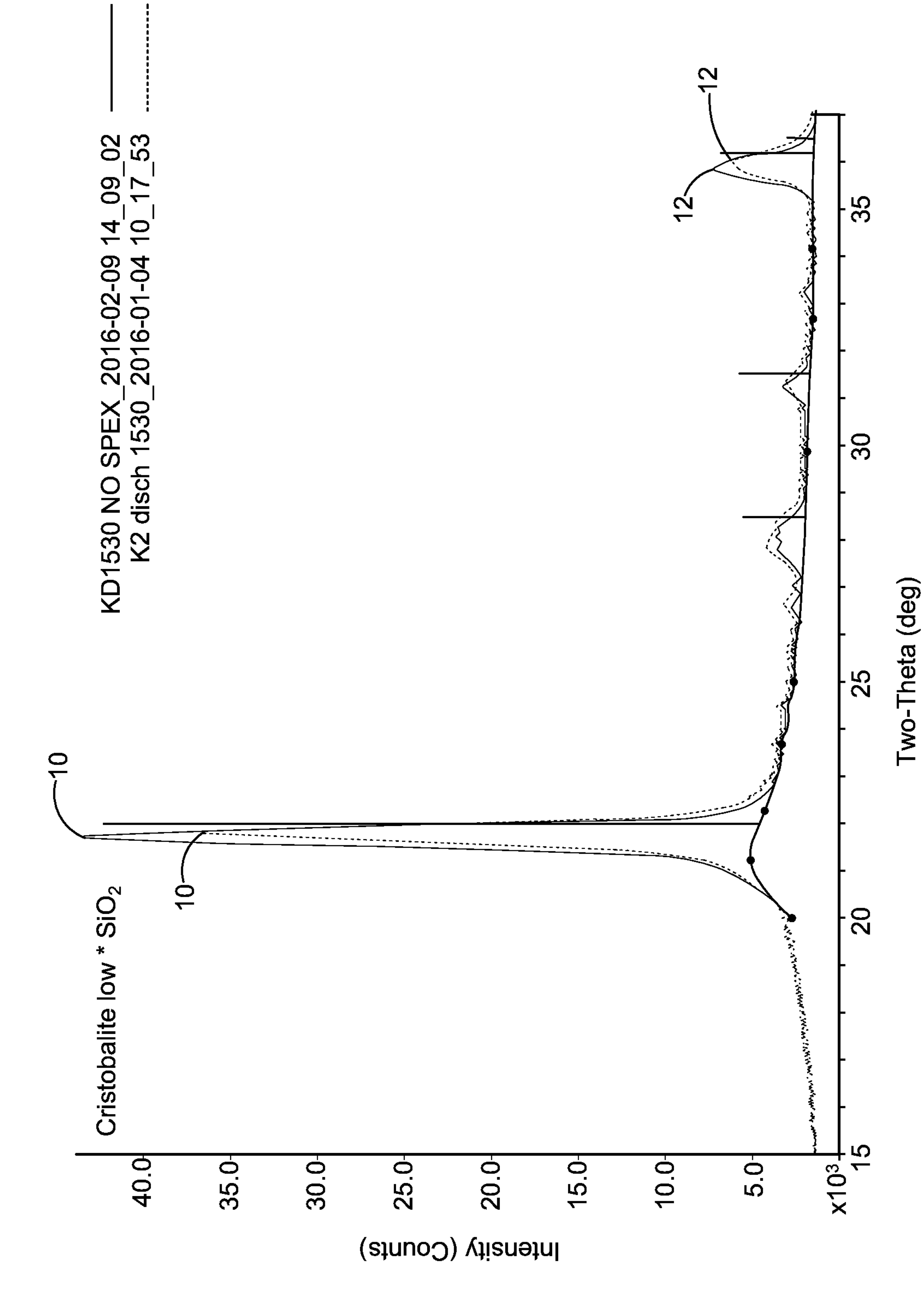
FIG. 27 is a graph of the XRD Pattern of KD15:30 before and after fine grinding showing no phase change.

To confirm that the silica phase identified as opal-C in products comprising diatomaceous earth is not poorly-ordered β-cristobalite, the sample described in Example 16 was analyzed before and after grinding in accordance with the evidence presented by Chao and Lu. They found that grinding of a sample containing β-cristobalite that comprises less than 10 wt % alumina will result in a change of phase from β-cristobalite to α-cristobalite. Therefore, a significant peak shift and additional peaks should be apparent in the XRD pattern after grinding if in fact the original sample comprises 0-cristobalite. FIG. 27 shows the XRD patterns of sample KD 15:30 before grinding (KD 1530 NO SPEX in FIG. 27) and after grinding (K2 disch 1530 in FIG. 27). The standard stick pattern of α-cristobalite is super-imposed on FIG. 27. A split of the sample was ground using a Spex® mill with ceramic media. The d90 of the material before milling was 122 um, and the d90 after milling was 43 um. As can be seen in FIG. 27, milling of the sample did not result in a significant peak shift nor did additional peaks appear in the pattern. The milled sample did have somewhat lower peak intensity, but this is most likely due to non-uniform distribution of the opal-C phase in the coarser original sample.

Example 25: Phase Reversion

Figure 28:
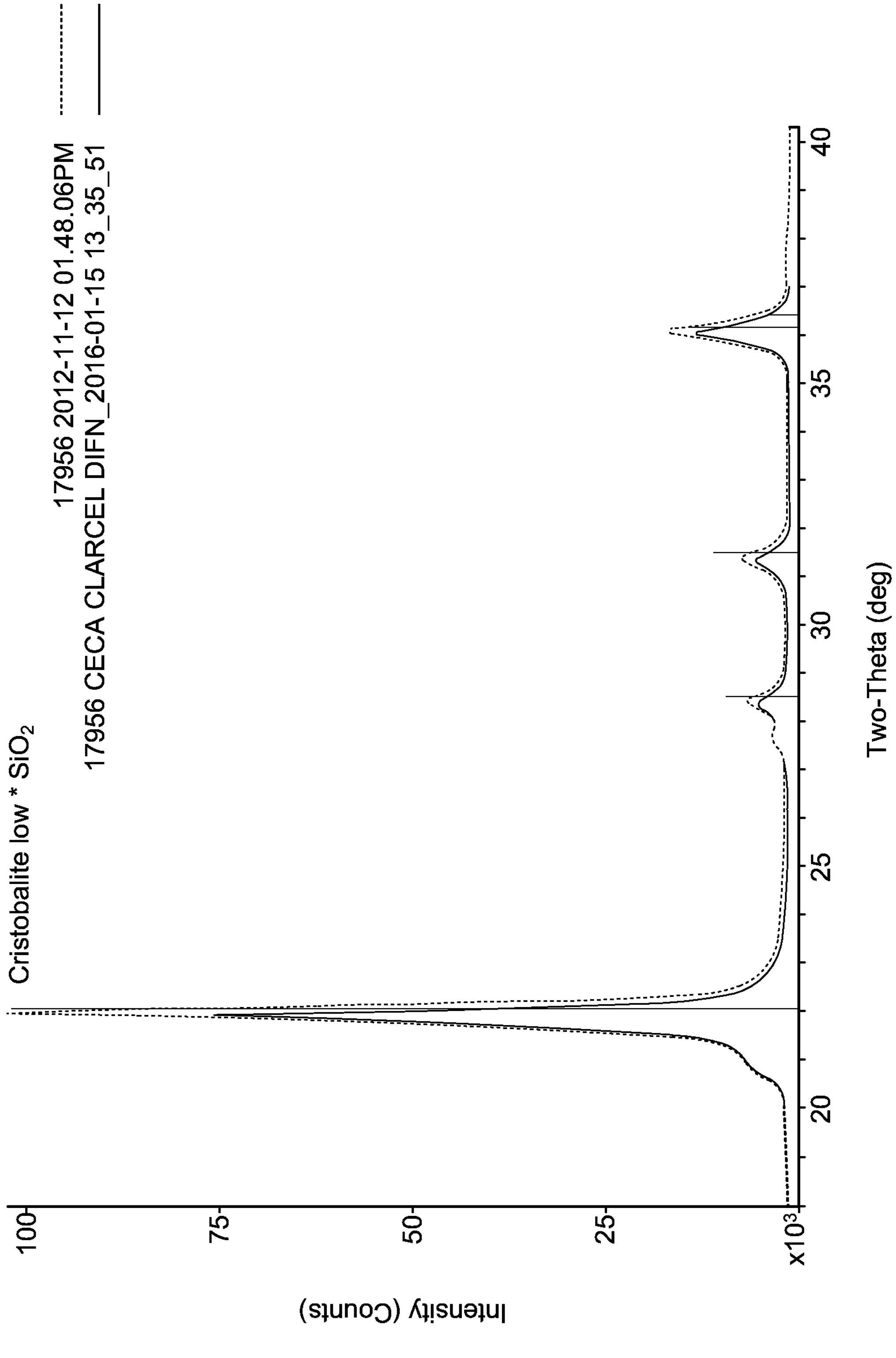
FIG. 28 is a graph of an overlaid XRD pattern of Clarcel DIF-N™ showing partial reversion to amorphous phase.

FIG. 28 shows two XRD patterns of a sample of Ceca Clarcel DIF-N® (sample #17956). The standard stick pattern of α-cristobalite is super-imposed on FIG. 28. The sample was first analyzed in November 2012 (17956 2012-11-12 in FIG. 28), and then stored in a sealed plastic container. It was re-analyzed in January 2016 (17956 CECA CLARCEL DIFN_2016-01-15 in FIG. 28), just over three years later. After accounting for differences in x-ray tube intensity via the periodic monitoring of control standards, the difference in patterns still suggests a net loss in cristobalite content of about 25%, dropping from 80% cristobalite to 60% cristobalite. This sample also contains a minor amount of feldspar, and the quantity of feldspar did not change over the three year period.

Figure 29:
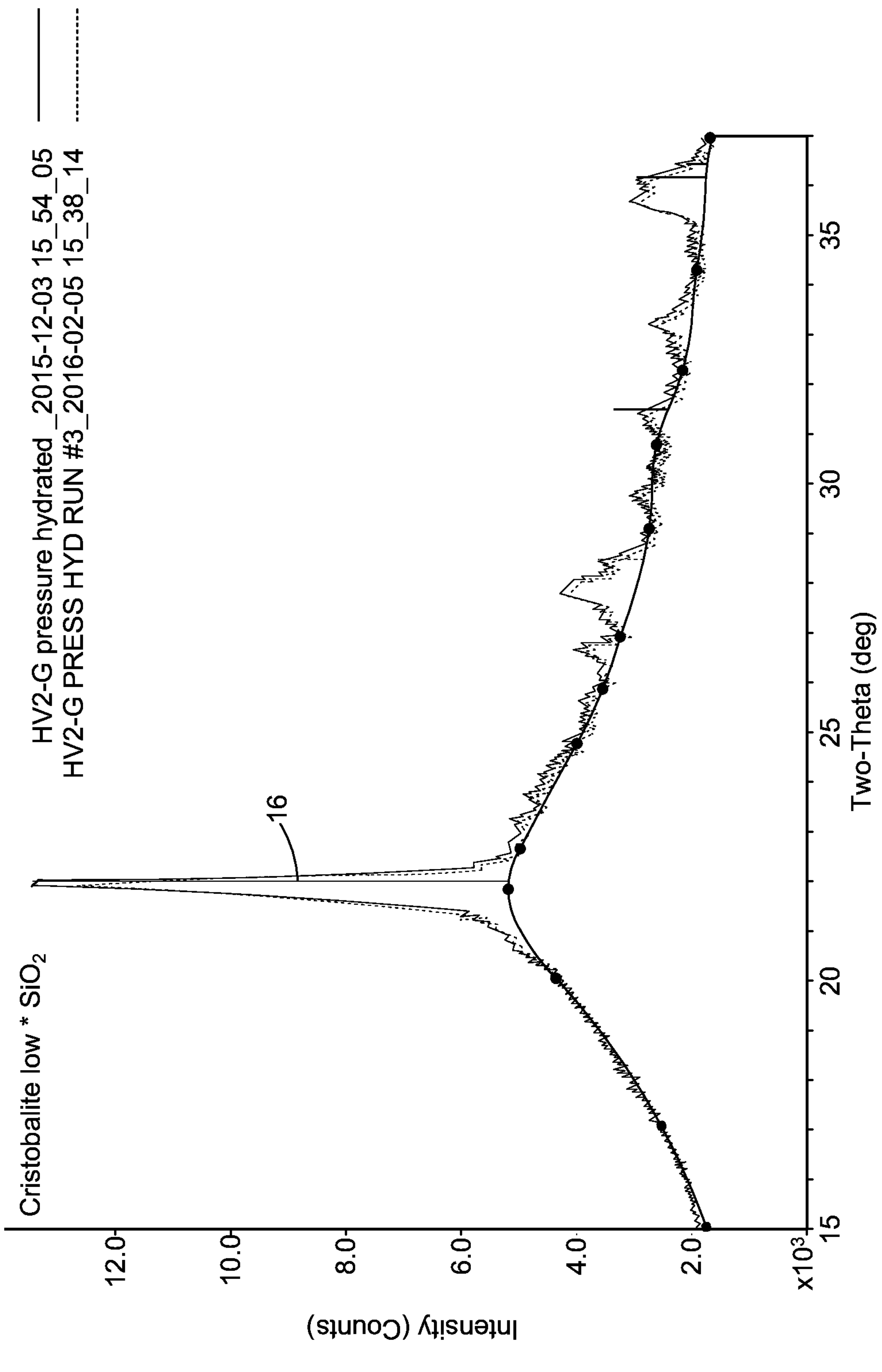
FIG. 29 is a graph of an overlaid XRD pattern of HV2-G showing partial reversion of opal-C to amorphous phase.

FIG. 29 shows a similar result for a sample prepared in the lab in November 2015. The standard stick pattern of α-cristobalite is super-imposed on FIG. 29. This flux-calcined sample (HV2-G) was analyzed using XRD then re-hydrated under pressure (HV2-G pressure hydrated_2015-12-03 in FIG. 29). It was re-analyzed just over two months later (HV2-G PRESS HYD RUN #3_2016-02-05 in FIG. 29). Once again, the silica phase (this time opal-C) was reduced by about 25%, from 6.2% to 4.7%. A minor amount of quartz and more significant feldspars contained in this sample were unaffected by the two month aging period and pressure re-hydration.

Example 26: Use of Optical Method to Estimate Silica Phase Quantity

Figure 30:
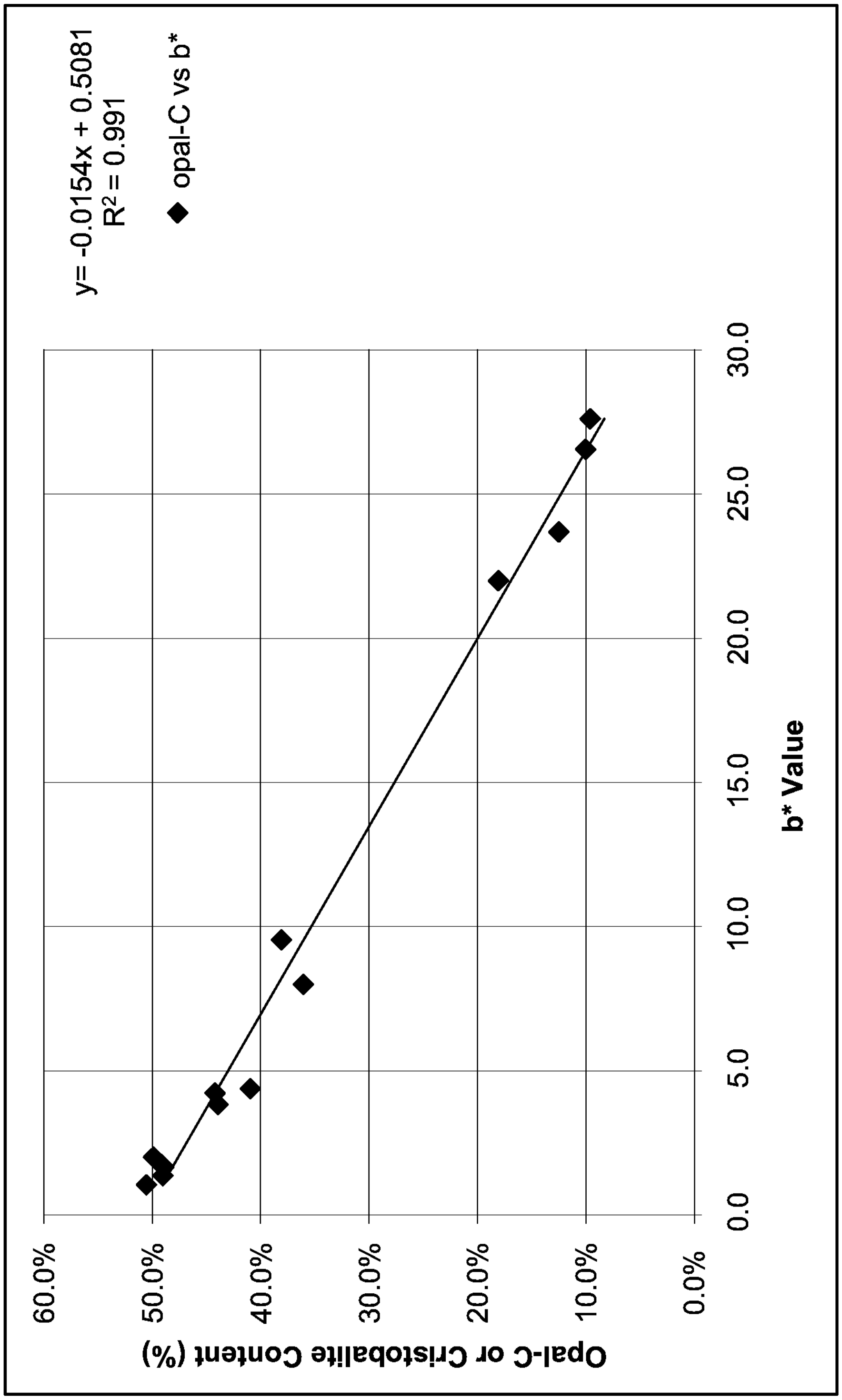
FIG. 30 is a graph showing the relationship of b* value to opal-C or cristobalite content in flux-calcined DE samples.

Table 15 shows data on flux-calcined samples from diatomite ores with differing bulk chemistry, flux-calcined under the exact same process conditions (7 wt % soda ash, flux-calcined at 927° C. for 40 minutes). The data show a definite inverse relationship between the b* value of the L*a*b* color space and the quantity of opal-C (and/or opal-CT) or cristobalite contained in the sample. FIG. 30 graphically shows this relationship. As the third step (spiking a split with cristobalite standard) of the LH Method for characterization of opal-C (and/or opal-CT) and cristobalite was not carried out with these samples, it was not possible to definitively determine the silica phase on some of the samples. However, it appears that the relationship between the hue of the flux-calcined samples and the quantity of specific silica phase present extends through opal-C and into cristobalite. While not absolute, b* values of less than 3 under these calcination conditions indicate that the silica phase present in the samples is probably cristobalite. Conversely, b* values equal to or greater than 3 indicate that the phase present is most likely opal-C (and/or opal-CT).

Disclosed is a process control method for products that comprise straight or flux-calcined diatomite, and more specifically for particulate products that comprise straight or flux-calcined diatomite. The opal-C (and/or opal-CT) or cristobalite content of such products may change depending on the mineral composition of the starting diatomite ore that is sourced for use in the straight or flux-calcination manufacturing process. To ensure that the content of the finished product remains consistent (and to ensure accurate content disclosure), samples of the products may be tested before shipment to customers/distributors. XRD testing can be time consuming. Below describes an efficient method to control product quality and to confirm the continuing accuracy of content disclosure.

The method estimates the cristobalite or collective opal-C and opal-CT wt % content of a product (that contains diatomite) using optical properties of the product. The method comprises selecting a representative first test sample of the product for testing. The method further comprises determining the process parameters used in the production of the first test sample of the product for which the cristobalite wt % content or the (collective) opal-C and opal-CT wt % content is to be estimated. The process parameters may include, but are not limited to, one or more of the following: flux composition and quantity, calcination temperature, sintering temperature, calcination time, sintering time, kiln residence time, or kiln atmosphere composition.

The method further comprises determining the optical properties of such first test sample of the product. Optical properties include, but are not limited to, one or more of the following: color space values: b* value, a* value or L* value. For example, color space values b* value, a* value or L* value may be determined using a Konica Minolta® Chroma-meter CR-400, or the like to sense the values of the first test sample.

The method further comprises applying a model to estimate the cristobalite wt % content or the (collective) opal-C and opal-CT wt % content of the first test sample of the product based on the process parameters and the optical properties of (the first test sample of) the product.

In one embodiment, the model may be used to estimate whether the cristobalite wt % content of the first test sample is above an acceptable cristobalite threshold value for the product being tested. For example, if a first test sample having a given set of process parameters is determined to have a sensed optical b* value of less than 3, the model may be configured to estimate that cristobalite is present in such first test sample (and by extension the product) at a level above a desired acceptable cristobalite threshold value of, for example, 0 wt % of the first test sample. In other embodiments, the desired acceptable cristobalite threshold value (for the same or a different product) may be different. In some embodiments, the model may be used to estimate the collective opal-C and opal-CT wt % of the first test sample and compare such to another threshold or to an acceptable threshold range.

In yet another embodiment, the model may be used to estimate a specific cristobalite wt % content and/or a collective opal-C and opal-CT wt % content of the first test sample based on the process parameters and the measured optical properties of the first test sample. In this embodiment, a specific value is determined/estimated by the model for cristobalite wt % content and/or a collective opal-C and opal-CT wt % content, as opposed to an estimation of whether the content is greater than a desired threshold value for wt %. Similar to the above, the estimated wt % content may be compared to a desired threshold value or range. In either case, the method may use a controller that includes a processor and a memory component to estimate the cristobalite or collective opal-C and opal-CT wt % content of the first test sample.

Such processor may be a microprocessor or other processor as known in the art. The processor may be configured to execute instructions and generate control signals for estimating/determining the wt % cristobalite content or the collective wt % opal-C and opal-CT content of the first test sample of the product (resulting from a set of process parameters) as a function of the measured optical properties of the first test sample of the product. Such instructions may be read into or incorporated into a computer readable medium, such as the memory component or provided external to the processor. In alternative embodiments, hard wired circuitry may be used in place of, or in combination with, software instructions to implement a control method. The term "computer readable medium" as used herein refers to any non-transitory medium or combination of media that participates in providing instructions to the processor for execution. Such a medium may comprise all computer readable media except for a transitory, propagating signal. Common forms of computer-readable media include, for example, a memory stick, or any magnetic medium, optical medium, or any other medium from which a computer processor can read. The controller is not limited to one processor and memory component. The controller may be several processors and memory components.

The model is configured to estimate the cristobalite or collective opal-C and opal-CT wt % content of the product based on one or more relationships identified through a linear regression (and/or another mathematical relationship) of the cristobalite wt % content (as determined by the LH Method) or the collective opal-C and opal-CT wt % content (as determined by the LH Method) as a function of the optical properties of a plurality of test products manufactured under the same or similar process parameters as the first test sample of the product. It is preferable if it is the same process parameters.

The method may further comprise conducting an XRD analysis on the first test sample of the product, or a representative second test sample from the same product, if the cristobalite wt % content estimated by the model fails the threshold comparison (for example, is above an acceptable threshold value). In some embodiments the method may comprise conducting an XRD analysis on the first test sample of the product, or a representative second test sample from the same product, if the collective opal-C and opal-CT wt % estimated by the model fails a threshold comparison for opal-C and opal-CT (for example is greater than a threshold value, outside of an anticipated or acceptable range of threshold values, or in some embodiments, less than a threshold value).

The method may further comprise removing from sales inventory, or the like, the product or the lot/batch of products from which the first (and second) test sample(s) was/were obtained, if the result of the XRD analysis also indicates that the cristobalite wt % content is above an acceptable threshold. Sales inventory means inventory available for shipment to distributors or customers.

The method may further comprise adjusting one or more process parameters (for example, calcination time or temperature, wt % of flux added, etc.) and/or the diatomite ore source used in manufacturing the product and repeating some or all of the method steps described above until any cristobalite present is estimated by the model or determined by XRD analysis to be at or below an acceptable threshold (wt % content) level (passes the threshold comparison). In some embodiments, the method may further comprise adjusting one or more process parameters (for example, calcination time or temperature, wt % of flux added, etc.) and/or the diatomite ore source used in manufacturing the product and repeating some or all of the method steps described above until the collective opal-C and opal-CT wt % estimated by the model or determined by XRD analysis passes the desired threshold comparison for opal-C and opal-CT, collectively.

To build the model, a plurality of test products are selected for a set of process parameters (for example, flux composition and quantity, calcination temperature, and calcination time). The optical properties of each of the test products is measured (for example, the color space values: b* value, a* value or L* value). The cristobalite wt % content according to the LH Method is measured for each test product. The collective opal-C and opal-CT wt % content is measured for each test product according to the LH Method (preferably quantified according to the XRD Method). A linear regression analysis is then conducted (for example, see FIG. 30) to determine the best relationship between the wt % cristobalite content or the (collective) wt % opal-C and opal-CT content of the test products (resulting from the set of process parameters) as a function of the optical properties the test products. Alternatively, or in addition to, other appropriate mathematical analysis may be used to determine a suitable mathematical relationship between the wt % cristobalite content or the collective wt % opal-C and opal-CT content of the test products (resulting from the set of process parameters) as a function of the optical properties the test products. (Preferably this analysis is repeated for a plurality of sets of different process parameters (and their respective test products) to provide for a robust model to estimate the wt % cristobalite content or the collective wt % of opal-C and opal-CT content for a variety of products having different processing parameters. Similar to above, building the model may be accomplished using a controller that includes a processor and a memory component. The processor may be a microprocessor or other processor as known in the art. The processor may be configured to execute instructions and generate control signals for determining a relationship between the wt % cristobalite content or the wt % opal-C (and/or opal-CT) content of the test products (resulting from the set of process parameters) as a function of the optical properties the test products. Such instructions may be read into or incorporated into a computer readable medium, such as the memory component or provided external to the processor. In alternative embodiments, hard wired circuitry may be used in place of, or in combination with, software instructions to implement a control method. The controller is not limited to one processor and memory component. The controller may be several processors and memory components.

TABLE 15

Color Space and Silica Phase Data on Flux-Calcined Samples of Different Diatomite Ores

| Sample | L* | a* | b* | Primary Peak d (Å) | FWHM (Å) | Phase | Quantity (%) |
|---|---|---|---|---|---|---|---|
| W18184 | 67.8 | 14.1 | 22.1 | 4.067 | 0.43 | opal-C | 18.1% |
| W18203 | 70.5 | 13.7 | 26.7 | 4.088 | 0.42 | opal-C | 9.6% |
| W18206 | 66.1 | 16.2 | 27.7 | 4.088 | 0.39 | opal-C | 9.5% |
| W18208 | 64.0 | 15.3 | 26.6 | 4.095 | 0.41 | opal-C | 10.0% |
| W18213 | 72.1 | 12.2 | 23.8 | 4.081 | 0.41 | opal-C | 12.4% |
| W18222 | 94.0 | −0.2 | 1.1 | 4.059 | 0.37 | cristobalite | 50.4% |
| W18225 | 93.4 | 0.1 | 1.5 | 4.060 | 0.40 | cristobalite | 48.9% |
| W18228 | 91.3 | 1.2 | 4.3 | 4.067 | 0.40 | opal-C | 44.2% |
| W18241 | 93.4 | −0.3 | 2.0 | 4.060 | 0.36 | undetermined | 49.6% |
| W18251 | 89.4 | 1.4 | 4.4 | 4.067 | 0.40 | opal-C | 40.8% |
| W18252 | 84.6 | 4.3 | 8.1 | 4.066 | 0.42 | undetermined | 35.9% |
| W18253 | 93.8 | −0.3 | 1.8 | 4.060 | 0.37 | cristobalite | 49.0% |
| W18254 | 83.0 | 4.9 | 9.6 | 4.074 | 0.41 | opal-C | 38.0% |
| W18258 | 90.3 | 1.0 | 3.9 | 4.060 | 0.39 | undetermined | 43.9% |

Opal-C quantification is based on XRD Method

Example 27: Respirable Silica Phases

As discussed previously, the respirable content (and silica phases therein) of a bulk powder sample can be determined by calculation. After obtaining silica phase information on the fine fraction of a sample via XRD, the particle size distribution of the entire sample is measured. CEN EN481 provides a statistical calculation on the likelihood of particles being respirable based on their size and particle density, thus it is applied to the measured distribution to determine the respirable fraction. The respirable fraction is then multiplied by the silica phase quantity to determine the respirable quantity of that particular silica phase.

Figure 31A:
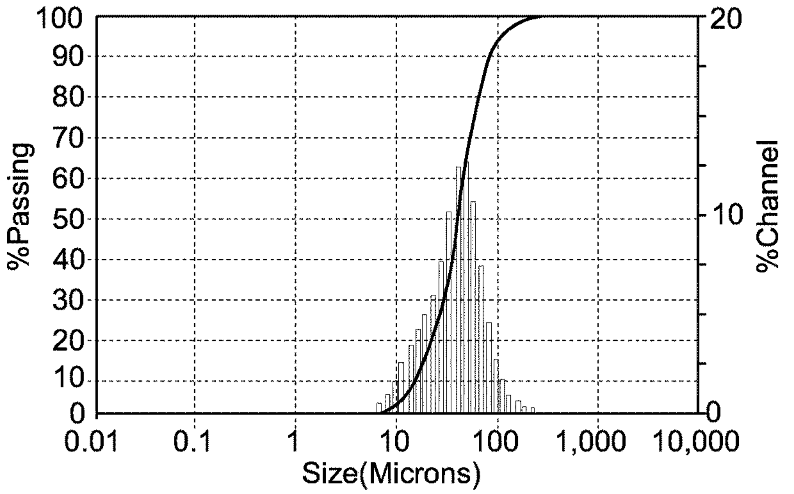
Figure 32A:
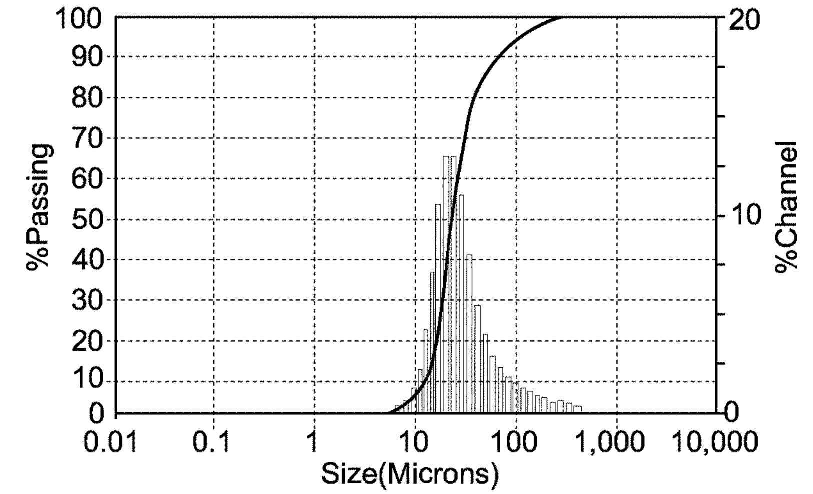

Two samples were analyzed using this methodology. FIGS. 31 and 32 present their particle size distributions, and Table 16 includes the results of the respirable analysis.

TABLE 16

Results of Respirable Analysis (SWeFF)

| Sample | 18188-4 | FP-3 B17E2 |
|---|---|---|
| Opal-Cin minus 25 um Fraction (wt %) | 9.1 | 17.2 |
| Cristobalite and Quartz Content (wt %) | 0.0 | 0.0 |
| Respirable Fraction -EN481 (wt %) | 0.1 | 1.8 |
| Respirable Opal-C (wt %) | 0.0 | 0.3 |
| Respirable Cristobalite and Quartz (wt %) | 0.0 | 0.0 |

Example 28: Improved Silica Documentation—Flux-Calcined Sample

Silica Documentation was prepared for sample 18188-9, both using the Traditional Method (incorrectly identifying opal-C as cristobalite) and the LH Method. Table 17 is the SDS information for sales within the United States prepared using data generated via the Traditional Method for determining the cristobalite content in flux-calcined diatomite products. Table 18 is the corrected SDS information using data generated with the LH Method. Significant changes were made in sections 2 (hazards), 3 (composition), 8 (exposure controls), 11 (toxicological information), and 15 (regulatory information), in comparison with the SDS information shown in Table 17.

Table 17: SDS Information for Sample 18188-9 with Data based on Traditional Methods

| SECTION 1: PRODUCT AND COMPANY IDENTIFICATION | |
|---|---|
| **PRODUCT IDENTIFIER** | 18188-9 with Traditional Crystalline Silica Quantification |
| **CHEMICAL NAME** | Diatomaceous Earth, Flux-Calcined |
| **CHEMICAL** | Silica |
| **MATERIAL USE** | Filter Aid |
| **RESTRICTION ON** | None Known |
| **MANUFACTURER** | EP Minerals, LLC., 9875 Gateway Dr., Reno, NV 89521 |
| **TELEPHONE NO.** | (775) 824 7600 (Monday – Friday 8:00 am PST – 5:00 pm PST) |
| **EMERGENCY** | (775) 824 7600 (Monday – Friday 8:00 am PST – 5:00 pm PST) |
| **SDS DATE OF** | January 31, 2014 |
| **SECTION 2: HAZARDS IDENTIFICATION** | |
| **OSHA GHS HAZARD CLASSIFICATION** | Carcinogen Category 1A<br>Specific Target Organ Toxicity, Repeated Exposure Category 1 |

| | |
|---|---|
| **HAZARDS NOT OTHERWISE CLASSIFIED** | None |
| **LABEL ELEMENTS** | DANGER<br>May cause cancer by inhalation.<br>Causes damage to lungs through prolonged or repeated exposure.<br>**Obtain special instructions before use.**<br>**Do not handle until all safety precautions have been read and understood.**<br>Do not breathe dust.<br>Wear eye protection.<br>If exposed or concerned: Get medical advice.<br>**Dispose of contents in accordance with local, state and federal regulations.** |
| | |

SECTION 3: COMPOSITION / INFORMATION ON INGREDIENTS

| INGREDIENT IDENTIFICATION | APPROXIMATE CONCENTRATION (%) | C.A.S. NUMBERS |
|---|---|---|
| Diatomaceous Earth, Flux-Calcined (kieselguhr) (contains 35-50% Crystalline Silica - Cristobalite) | 100% | 68855-54-9<br>14464-46-1 |

SECTION 4: FIRST AID MEASURES

| | |
|---|---|
| **EYE** | Flush eyes with generous quantities of water or eye rinse solution. Consult physician if irritation persists. |
| **SKIN** | Use moisture renewing lotions if dryness occurs. |
| **INGESTION** | Drink generous amounts of water to reduce bulk and drying effects. |
| **INHALATION** | Remove to fresh air. Blow nose to evacuate dust. |
| **Most important symptoms/effects, acute and delayed** | Dust may cause abrasive irritation to eyes. Prolonged skin contact may cause dryness. Dust may cause nose, throat and upper respiratory tract irritation. Prolonged inhalation of respirable dust containing silica may cause a progressive lung disease, silicosis and lung cancer. See Section 11 for additional information. |

| | | |
|---|---|---|
| **Indication of immediate medical attention and special treatment, if necessary** | Immediate medical attention is not normally required. If dust irritates the eyes, seek medical attention. | |
| **MATERIAL NAME** | 18188-9 with Traditional Crystalline Silica | Page 2 of 4 |
| **SECTION 5: FIRE FIGHTING MEASURES** | | |
| **EXTINGUISHING MEDIA** | Not applicable, the material is not combustible. | |
| **SPECIFIC HAZARDS ARISING FROM THE CHEMICAL** | Not applicable, the material is not combustible. | |
| **SPECIAL PROTECTIVE EQUIPMENT AND PRECAUTIONS FOR FIRE-FIGHTERS** | Not applicable, the material is not combustible. | |
| **SECTION 6: ACCIDENTAL RELEASE MEASURES** | | |
| **PERSONAL PRECAUTIONS** | If dust is present, use respirator fitted with particulate filter as specified in Section 8. Protect eyes with goggles. Do not breathe dust. | |
| **ENVIRONMENTAL PRECAUTIONS** | This material is not a significant environmental concern. | |
| **METHODS AND MATERIALS FOR CONTAINMENT AND CLEANING UP** | Vacuum clean spillage or wet sweep. Avoid creating airborne dust. Place in a container for use or disposal. | |
| **SECTION 7: HANDLING AND STORAGE** | | |
| **PRECAUTIONS FOR SAFE HANDLING** | Minimize dust generation. Avoid contact with eyes. Do not breathe dust. Repair or dispose of broken bags. Observe all label precautions and warnings. | |
| **CONDITIONS FOR SAFE STORAGE** | Store in a dry place to maintain packaging integrity and product quality. Do not store near hydrofluoric acid or concentrated caustic solutions. | |
| **SECTION 8: EXPOSURE CONTROLS / PERSONAL PROTECTION** | | |

| **EXPOSURE GUIDELINES:** | | | | |
|---|---|---|---|---|
| Component | OSHA PEL | ACGIH TLV | MSHA PEL | NIOSH REL |
| Diatomaceous Earth, Flux-Calcined (kieselguhr) | 5 $mg/m^3$ respirable dust<br>15 $mg/m^3$ total dust | None Established | 5 $mg/m^3$ respirable dust<br>15 $mg/m^3$ total dust | None Established |
| Crystalline Silica (Cristobalite) | $\frac{1}{2} \times \frac{30\ mg/m^3}{\%\ SiO_2+2}$ total dust<br>$\frac{1}{2} \times \frac{10\ mg/m^3}{\%\ SiO_2+2}$ Respirable dust | 0.025 $mg/m^3$ Respirable dust | $\frac{1}{2} \times \frac{30\ mg/m^3}{\%\ SiO_2+2}$ total dust<br>$\frac{1}{2} \times \frac{10\ mg/m^3}{\%\ SiO_2+2}$ Respirable dust | 0.05 $mg/m^3$ Respir-able dust |
| **ENGINEERING CONTROLS** | Use general or local exhaust ventilation to control dust within recommended exposure limits. Refer to ACGIH publication "Industrial Ventilation" or similar publications for design of ventilation systems. | | | |
| **PERSONAL PROTECTIVE EQUIPMENT:** | | | | |
| **EYE / FACE PROTECTION** | Goggles to protect from dust | | | |
| **SKIN PROTECTION** | No special equipment is needed. | | | |
| **RESPIRATORY PROTECTION** | Respirators fitted with filters certified to standard 42CFR84 under series N95 should be worn when dust is present. If the dust concentration is less than ten (10) times the Permissible Exposure Limit (PEL) use a quarter or half-mask respirator with a N95 dust filter or a single use dust mask rated N95. If dust concentration is greater than ten (10) times and less than fifty (50) times the PEL, a full-face piece respirator fitted with replaceable N95 filters is recommended. If dust concentration is greater than fifty (50) and less than two hundred (200) times the PEL use a power air-purifying (positive pressure) respirator with a replaceable N95 filter. If dust concentration is greater than two hundred (200) times the PEL use a type C, supplied air respirator (continuous flow, positive pressure), with full face piece, hood or helmet. | | | |

| | | |
|---|---|---|
| **GENERAL HYGIENE** | Avoid breathing dust. Avoid contact with eyes. Wash hands after handling and before eating or drinking. | |
| **MATERIAL NAME** | 18188-9 with Traditional Crystalline Silica Quantification | Page 3 of 4 |

| | | | |
|---|---|---|---|
| **SECTION 9: PHYSICAL AND CHEMICAL PROPERTIES** | | | |
| **APPEARANCE, COLOR** | Dark pink to off-white powder | **ODOR** | Odorless |
| **PHYSICAL STATE** | Solid | **ODOR THRESHOLD** | Not applicable |
| **VAPOR PRESSURE** | Not applicable | **VAPOR DENSITY** | Not applicable |
| **BOILING POINT** | Not applicable | **MELTING POINT** | > 1300° C |
| **FLASH POINT** | Not applicable | **pH (10% SUSPENSION)** | 10 |
| **FLAMMABILITY LIMITS** | Not applicable | **EVAPORATION RATE** | Not applicable |
| **DECOMPOSITION TEMPERATURE** | > 1300° C | **SPEC. GRAVITY / RELATIVE DENSITY** | 2.3 |
| **AUTOIGNITION TEMPERATURE** | Not applicable | **PARTITION COEFFICIENT – n-OCTANOL/WATER** | Not applicable |
| **FLAMMABILITY (solid/gas)** | Not applicable | **SOLUBILITY – WATER** | < 1% |
| | | **VISCOSITY** | Not applicable |

| | |
|---|---|
| **SECTION 10: STABILITY AND REACTIVITY** | |
| **REACTIVITY** | Material is not reactive. |
| **CHEMICAL STABILITY** | Material is stable. |
| **POSSIBILITY OF HAZARDOUS REACTIONS** | Material is not reactive under normal conditions of handling unless mixed with incompatible substances below. |
| **CONDITIONS TO AVOID** | Not applicable |
| **INCOMPATIBLE MATERIALS** | Hydrofluoric acid and concentrated caustic solutions may react violently with the product. |
| **HAZARDOUS DECOMPOSITION PRODUCTS** | Not applicable |

| SECTION 11: TOXICOLOGICAL INFORMATION | |
|---|---|
| **POTENTIAL HEALTH** | |
| **Likely Routes of** | See below |
| **EYE** | May cause irritation (tear formation and redness) if dust gets in eyes. |
| **SKIN** | Not absorbed by the skin, but may cause dryness if prolonged exposure. |
| **INGESTION** | Ingestion of small quantities is not considered harmful, but may cause irritation of the mouth, throat and stomach. |
| **INHALATION** | Acute inhalation can cause dryness of the nasal passage and lung congestion, coughing and general throat irritation. Acute inhalation of high concentrations of respirable crystalline silica may cause acute silicosis. |
| **CHRONIC EFFECTS** | This product contains crystalline silica. Respirable crystalline silica may cause lung cancer and lung disease (silicosis) if inhaled for prolonged periods. Symptoms of silicosis include wheezing, cough and shortness of breath. |
| **CARCINOGENICITY** | Flux-calcined diatomaceous earth (Kieselguhr) is composed of amorphous and crystalline silica. Respirable crystalline silica (cristobalite) is classified by IARC and NTP as a known human carcinogen. Crystalline silica is only known to cause cancer when inhaled in a respirable form. It is not known to cause cancer by any other route of exposure. |
| **NTP** | Respirable crystalline silica (cristobalite) is classified as a known human carcinogen. |
| **IARC** | Respirable crystalline silica (cristobalite) is classified as a known human carcinogen. |
| **NUMERICAL MEASURES OF TOXICITY** | No data available |
| **CORROSIVENESS, SENSITIZATION, IRRITANCY** | Not applicable |

| | | |
|---|---|---|
| **MATERIAL NAME** | 18188-9 with Traditional Crystalline Silica Quantification | Page 4 of 4 |

| | |
|---|---|
| **REPRODUCTIVE TOXICITY** | Not available |
| **TERATOGENICITY, MUTAGENICITY** | Not available |

| SECTION 12: ECOLOGICAL INFORMATION | |
|---|---|
| **ECOTOXICITY:** | Diatomaceous earth products have shown some efficacy as a natural insecticide, but otherwise have no demonstrated toxicity in regards to aquatic or terrestrial life. |
| **PERSISTENCE AND DEGRADABILITY** | Non-biodegradable, inert. |
| **BIOACCUMULATIVE POTENTIAL** | Little potential for bioaccumulation |
| **MOBILITY IN SOIL** | No mobility |
| **OTHER ADVERSE EFFECTS** | None known |
| **SECTION 13: DISPOSAL CONSIDERATIONS** | |
| **WASTE DISPOSAL** | If this material as supplied becomes a waste, use solid waste disposal common to landfill type operations or in slurry to sumps. Not considered a hazardous waste under RCRA (4OCFR Part 261). |
| **PACKAGING DISPOSAL** | Dispose of in accordance with applicable laws and regulations, typically solid waste disposal common to landfill type operations. |
| **SECTION 14: TRANSPORT INFORMATION** | |
| **BASIC SHIPPING INFORMATION** | DOT shipping classification 55 (no restrictions). Technical name is "Diatomaceous Earth". |
| **ADDITIONAL INFORMATION** | No special requirements or placarding necessary. |
| **SECTION 15: REGULATORY INFORMATION** | |
| **U.S. FEDERAL:** | |
| **TSCA** | Diatomaceous Earth and Cristobalite appear on the EPA TSCA inventory list. |
| **CERCLA** | Diatomaceous Earth is not classified as a hazardous substance under regulations of the Comprehensive Environmental Response Compensation and Liability Act (CERCLA), 40 CFR 302. |
| **SARA TITLE III** | Not listed. |
| **California Proposition 65:** | This product contains crystalline silica, a chemical known to the State of California to cause cancer. |
| **INTERNATIONAL:** | |
| **WHMIS Classification** | Class D-2-A |
| **WHMIS Ingredient Disclosure List** | Silica, crystalline, cristobalite |
| **SECTION 16: OTHER INFORMATION** | |

| | |
|---|---|
| | 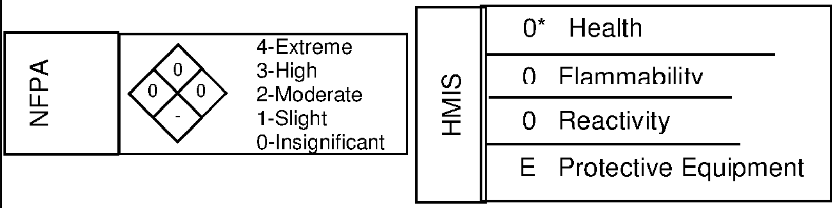  |
| **ORIGINAL ISSUE DATE** | Not applicable |
| **REVISION DATE** | Not applicable |
| **REVISION NO.** | Example |

Table 18: SDS Information for Sample 18188-9 with Data from LH Method

| | |
|---|---|
| **SECTION 1: PRODUCT AND COMPANY IDENTIFICATION** | |
| **PRODUCT IDENTIFIER** | 18188-9 with Silica Content Quantification according to the LH Method |
| **CHEMICAL NAME** | Diatomaceous Earth, Flux-Calcined |
| **CHEMICAL FAMILY** | Silica |
| **MATERIAL USE** | Filter Aid |
| **RESTRICTION ON** | None Known |
| **MANUFACTURER** | EP Minerals, LLC., 9875 Gateway Dr., Reno, NV 89521 |
| **TELEPHONE NO.** | (775) 824 7600 (Monday – Friday 8:00 am PST – 5:00 pm |
| **EMERGENCY** | (775) 824 7600 (Monday – Friday 8:00 am PST – 5:00 pm |
| **SDS DATE OF** | January 31, 2014 |
| **SECTION 2: HAZARDS IDENTIFICATION** | |
| **OSHA GHS HAZARD CLASSIFICATION** | Not classified as hazardous |
| **HAZARDS NOT OTHERWISE CLASSIFIED** | None |

| | | | |
|---|---|---|---|
| **LABEL ELEMENTS** | No GHS labeling required | | |
| | | | |
| **SECTION 3: COMPOSITION / INFORMATION ON INGREDIENTS** | | | |
| INGREDIENT IDENTIFICATION | | APPROXIMATE CONCENTRATION (%) | C.A.S. NUMBERS |
| Diatomaceous Earth, Flux-Calcined (kieselguhr) | | 100% | 68855-54-9 |
| **SECTION 4: FIRST AID MEASURES** | | | |
| **EYE** | Flush eyes with generous quantities of water or eye rinse solution. Consult physician if irritation persists. | | |
| **SKIN** | Use moisture renewing lotions if dryness occurs. | | |
| **INGESTION** | Drink generous amounts of water to reduce bulk and drying effects. | | |
| **INHALATION** | Remove to fresh air. Blow nose to evacuate dust. | | |
| **Most important symptoms/effects, acute and delayed** | Dust may cause abrasive irritation to eyes. Prolonged skin contact may cause dryness. Dust may cause nose, throat and upper respiratory tract irritation. Prolonged inhalation of high concentration of dust may cause lung effects. | | |
| **Indication of immediate medical attention and special treatment, if necessary** | Immediate medical attention is not normally required. If dust irritates the eyes, seek medical attention. | | |
| **MATERIAL NAME** | 18188-9 with Silica Content Quantification | | Page 2 of 4 |
| **SECTION 5: FIRE FIGHTING MEASURES** | | | |
| **EXTINGUISHING MEDIA** | Not applicable, the material is not combustible. | | |
| **SPECIFIC HAZARDS ARISING FROM THE CHEMICAL** | Not applicable, the material is not combustible. | | |
| **SPECIAL PROTECTIVE EQUIPMENT AND PRECAUTIONS FOR FIRE-FIGHTERS** | Not applicable, the material is not combustible. | | |

| SECTION 6: ACCIDENTAL RELEASE MEASURES | |
|---|---|
| **PERSONAL PRECAUTIONS** | If dust is present, use respirator fitted with particulate filter as specified in Section 8. Protect eyes with goggles. Do not breathe dust. |
| **ENVIRONMENTAL PRECAUTIONS** | This material is not a significant environmental concern. |
| **METHODS AND MATERIALS FOR CONTAINMENT AND CLEANING UP** | Vacuum clean spillage or wet sweep. Avoid creating airborne dust. Place in a container for use or disposal. |

| SECTION 7: HANDLING AND STORAGE | |
|---|---|
| **PRECAUTIONS FOR SAFE HANDLING** | Minimize dust generation. Avoid contact with eyes. Do not breathe dust. Repair or dispose of broken bags. Observe all label precautions and warnings. |
| **CONDITIONS FOR SAFE STORAGE** | Store in a dry place to maintain packaging integrity and product quality. Do not store near hydrofluoric acid or concentrated caustic solutions. |

| SECTION 8: EXPOSURE CONTROLS / PERSONAL PROTECTION | | | | |
|---|---|---|---|---|
| **EXPOSURE GUIDELINES:** | | | | |
| Component | OSHA PEL | ACGIH TLV | MSHA PEL | NIOSH REL |
| Diatomaceous Earth, Flux-Calcined (kieselguhr) | 5 $mg/m^3$ respirable dust<br>15 $mg/m^3$ total dust | None Established | 5 $mg/m^3$ respirable dust<br>15 $mg/m^3$ total dust | None Established |

| | |
|---|---|
| **ENGINEERING CONTROLS** | Use general or local exhaust ventilation to control dust within recommended exposure limits. Refer to ACGIH publication "Industrial Ventilation" or similar publications for design of ventilation systems. |
| **PERSONAL PROTECTIVE EQUIPMENT:** | |
| **EYE / FACE PROTECTION** | Goggles to protect from dust |
| **SKIN PROTECTION** | No special equipment is needed. |

| | |
|---|---|
| **RESPIRATORY PROTECTION** | Respirators fitted with filters certified to standard 42CFR84 under series N95 should be worn when dust is present. If the dust concentration is less than ten (10) times the Permissible Exposure Limit (PEL) use a quarter or half-mask respirator with a N95 dust filter or a single use dust mask rated N95. If dust concentration is greater than ten (10) times and less than fifty (50) times the PEL, a full-face piece respirator fitted with replaceable N95 filters is recommended. Selection and use of respiratory equipment must be in accordance with OSHA 1910.134 and good industrial hygiene practice. |
| **GENERAL HYGIENE** | Avoid breathing dust. Avoid contact with eyes. Wash hands after handling and before eating or drinking. |

| | | |
|---|---|---|
| **MATERIAL NAME** | 18188-9 with Silica Content Quantification according to the LH Method | Page 3 of 4 |

| **SECTION 9: PHYSICAL AND CHEMICAL PROPERTIES** | | | |
|---|---|---|---|
| **APPEARANCE, COLOR** | Dark pink to off-white powder | **ODOR** | Odorless |
| **PHYSICAL STATE** | Solid | **ODOR THRESHOLD** | Not applicable |
| **VAPOR PRESSURE** | Not applicable | **VAPOR DENSITY** | Not applicable |
| **BOILING POINT** | Not applicable | **MELTING POINT** | > 1300° C |
| **FLASH POINT** | Not applicable | **pH (10% SUSPENSION)** | 10 |
| **FLAMMABILITY LIMITS** | Not applicable | **EVAPORATION RATE** | Not applicable |
| **DECOMPOSITION TEMPERATURE** | > 1300° C | **SPEC. GRAVITY / RELATIVE DENSITY** | 2.3 |
| **AUTOIGNITION TEMPERATURE** | Not applicable | **PARTITION COEFFICIENT – n-OCTANOL/WATER** | Not applicable |
| **FLAMMABILITY (solid/gas)** | Not applicable | **SOLUBILITY – WATER** | < 1% |
| | | **VISCOSITY** | Not applicable |

| **SECTION 10: STABILITY AND REACTIVITY** | |
|---|---|
| **REACTIVITY** | Material is not reactive. |
| **CHEMICAL STABILITY** | Material is stable. |

| | | |
|---|---|---|
| **POSSIBILITY OF HAZARDOUS REACTIONS** | Material is not reactive under normal conditions of handling unless mixed with incompatible substances below. | |
| **CONDITIONS TO AVOID** | Not applicable | |
| **INCOMPATIBLE MATERIALS** | Hydrofluoric acid and concentrated caustic solutions may react violently with the product. | |
| **HAZARDOUS DECOMPOSITION PRODUCTS** | Not applicable | |
| **SECTION 11: TOXICOLOGICAL INFORMATION** | | |
| **POTENTIAL** | | |
| **Likely Routes of** | See below | |
| **EYE** | May cause irritation (tear formation and redness) if dust gets in eyes. | |
| **SKIN** | Not absorbed by the skin, but may cause dryness if prolonged exposure. | |
| **INGESTION** | Ingestion of small quantities is not considered harmful, but may cause irritation of the mouth, throat and stomach. | |
| **INHALATION** | Acute inhalation can cause dryness of the nasal passage and lung congestion, coughing and general throat irritation. Chronic inhalation of dust should be avoided. | |
| **CHRONIC EFFECTS** | Chronic inhalation of dust in excess of the Permissible Exposure Limit (PEL) established by OSHA over a prolonged number of years may cause lung changes. | |
| **NTP** | Diatomaceous earth without crystalline silica is not classified as a carcinogen. | |
| **IARC** | Diatomaceous earth without crystalline silica is not classifiable as to carcinogenicity in humans (Group 3) | |
| **NUMERICAL MEASURES OF TOXICITY** | No data available | |
| **CORROSIVENESS, SENSITIZATION, IRRITANCY** | Not applicable | |
| **MATERIAL NAME** | 18188-9 with Silica Content Quantification according to the LH Method | Page 4 of 4 |

| | |
|---|---|
| **REPRODUCTIVE TOXICITY** | Not available |
| **TERATOGENICITY, MUTAGENICITY** | Not available |
| **SECTION 12: ECOLOGICAL INFORMATION** | |
| **ECOTOXICITY:** | Diatomaceous earth products have shown some efficacy as a natural insecticide, but otherwise have no demonstrated toxicity in regards to aquatic or terrestrial life. |
| **PERSISTENCE AND DEGRADABILITY** | Non-biodegradable, inert. |
| **BIOACCUMULATIVE POTENTIAL** | Little potential for bioaccumulation |
| **MOBILITY IN SOIL** | No mobility |
| **OTHER ADVERSE EFFECTS** | None known |
| **SECTION 13: DISPOSAL CONSIDERATIONS** | |
| **WASTE DISPOSAL** | If this material as supplied becomes a waste, use solid waste disposal common to landfill type operations or in slurry to sumps. Not considered a hazardous waste under RCRA (4OCFR Part 261). |
| **PACKAGING DISPOSAL** | Dispose of in accordance with applicable laws and regulations, typically solid waste disposal common to landfill type operations. |
| **SECTION 14: TRANSPORT INFORMATION** | |
| **BASIC SHIPPING INFORMATION** | DOT shipping classification 55 (no restrictions). Technical name is "Diatomaceous Earth". |
| **ADDITIONAL INFORMATION** | No special requirements or placarding necessary. |
| **SECTION 15: REGULATORY INFORMATION** | |
| **U.S. FEDERAL:** | |
| **TSCA** | Diatomaceous Earth appears on the EPA TSCA inventory list. |
| **CERCLA** | Diatomaceous Earth is not classified as a hazardous substance under regulations of the Comprehensive Environmental Response Compensation and Liability Act (CERCLA), 40 CFR 302. |
| **SARA TITLE III** | Not listed. |
| **INTERNATIONAL:** | |
| **WHMIS Classification** | This product is not regulated by WHMIS |

| | |
|---|---|
| **WHMIS Ingredient Disclosure List** | No reportable ingredients are present. |
| **SECTION 16: OTHER INFORMATION** | |
| | 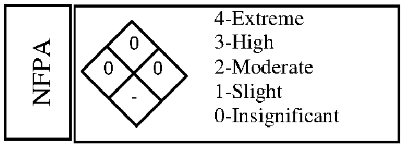<br>HMIS<br>0* Health<br>0 Flammability<br>0 Reactivity<br>E Protective |
| **ORIGINAL ISSUE DATE** | Not applicable |
| **REVISION DATE** | Not applicable |
| **REVISION NO.** | Example |

Example 29: Improved Silica Documentation—Straight-Calcined Sample

Silica Documentation information was also prepared for straight-calcined products similar to some of those described in Tables 6 and 7. Table 19 is the SDS information for sales within the United States prepared using data generated via the Traditional Method for determining the crystalline silica content in such straight-calcined diatomite products (those containing some quartz plus opal-C misidentified as cristobalite). Table 20 is the corrected SDS information using data generated with the LH Method. In this case, the changes to the Silica Documentation are not as significant as in Example 28. However, meaningful changes have been made in sections 3, 8, and 11.

Table 19: SDS Information for Straight-Calcined Products Containing Quartz with Data based on Traditional Methods

| SECTION 1: PRODUCT AND COMPANY IDENTIFICATION | |
|---|---|
| **PRODUCT IDENTIFIER** | Straight-calcined – Traditional Crystalline Silica Content Determination |
| **CHEMICAL NAME** | Diatomaceous Earth, Calcined |
| **CHEMICAL FAMILY** | Silica |
| **MATERIAL USE** | Filter Aid, Functional Filler |
| **RESTRICTION ON USE** | None Known |
| **MANUFACTURER** | EP Minerals, LLC., 9875 Gateway Dr., Reno, NV 89521 |
| **TELEPHONE NO.** | (775) 824 7600 (Monday – Friday 8:00 am PST – 5:00 pm |
| **EMERGENCY** | (775) 824 7600 (Monday – Friday 8:00 am PST – 5:00 pm |
| **SDS DATE OF** | 2016 |
| **SECTION 2: HAZARDS IDENTIFICATION** | |
| **OSHA GHS HAZARD CLASSIFICATION** | Carcinogen Category 1A<br>Specific Target Organ Toxicity, Repeated Exposure Category |
| **HAZARDS NOT OTHERWISE CLASSIFIED** | None |
| **LABEL ELEMENTS** | DANGER<br>May cause cancer by inhalation.<br>Causes damage to lungs through prolonged or repeated exposure.<br>**Obtain special instructions before use.**<br>**Do not handle until all safety precautions have been read and understood.**<br>Do not breathe dust.<br>Wear eye protection.<br>If exposed or concerned: Get medical advice.<br>**Dispose of contents in accordance with local, state and federal regulations.** |
| | |

| SECTION 3: COMPOSITION / INFORMATION ON INGREDIENTS | | |
|---|---|---|
| INGREDIENT IDENTIFICATION | APPROXIMATE CONCENTRATION (%) | C.A.S. NUMBERS |

| | | |
|---|---|---|
| Diatomaceous Earth, Calcined (kieselguhr) (contains 2-30% Crystalline Silica – Cristobalite and 0.1 to 5% Crystalline Silica - Quartz) | 100% | 91053-39-3<br>14464-46-1<br>14808-60-7 |

| | | |
|---|---|---|
| **SECTION 4: FIRST AID MEASURES** | | |
| **EYE** | Flush eyes with generous quantities of water or eye rinse solution. Consult physician if irritation persists. | |
| **SKIN** | Use moisture renewing lotions if dryness occurs. | |
| **INGESTION** | Drink generous amounts of water to reduce bulk and drying effects. | |
| **INHALATION** | Remove to fresh air. Blow nose to evacuate dust. | |
| **Most important symptoms/effects, acute and delayed** | Dust may cause abrasive irritation to eyes. Prolonged skin contact may cause dryness. Dust may cause nose, throat and upper respiratory tract irritation. Prolonged inhalation of respirable dust containing silica may cause a progressive lung disease, silicosis and lung cancer. See Section 11 for additional information. | |
| **Indication of immediate medical attention and special treatment, if necessary** | Immediate medical attention is not normally required. If dust irritates the eyes, seek medical attention. | |
| **MATERIAL NAME** | Straight-calcined – Traditional Crystalline Silica Content Determination | Page 2 of 4 |
| **SECTION 5: FIRE FIGHTING MEASURES** | | |
| **EXTINGUISHING MEDIA** | Not applicable, the material is not combustible. | |
| **SPECIFIC HAZARDS ARISING FROM THE CHEMICAL** | Not applicable, the material is not combustible. | |
| **SPECIAL PROTECTIVE EQUIPMENT AND PRECAUTIONS FOR FIRE-FIGHTERS** | Not applicable, the material is not combustible. | |
| **SECTION 6: ACCIDENTAL RELEASE MEASURES** | | |

| | |
|---|---|
| **PERSONAL PRECAUTIONS** | If dust is present, use respirator fitted with particulate filter as specified in Section 8. Protect eyes with goggles. Do not breathe dust. |
| **ENVIRONMENTAL PRECAUTIONS** | This material is not a significant environmental concern. |
| **METHODS AND MATERIALS FOR CONTAINMENT AND CLEANING UP** | Vacuum clean spillage or wet sweep. Avoid creating airborne dust. Place in a container for use or disposal. |
| **SECTION 7: HANDLING AND STORAGE** | |
| **PRECAUTIONS FOR SAFE HANDLING** | Minimize dust generation. Avoid contact with eyes. Do not breathe dust. Repair or dispose of broken bags. Observe all label precautions and warnings. |
| **CONDITIONS FOR SAFE STORAGE** | Store in a dry place to maintain packaging integrity and product quality. Do not store near hydrofluoric acid or concentrated caustic solutions. |

| | |
|---|---|
| **SECTION 8: EXPOSURE CONTROLS / PERSONAL PROTECTION** | |
| **EXPOSURE GUIDELINES:** | |

| Component | OSHA PEL | ACGIH TLV | MSHA PEL | NIOSH REL |
|---|---|---|---|---|
| Diatomaceous Earth, Calcined (kieselguhr) | 5 $mg/m^3$ respirable dust<br>15 $mg/m^3$ total dust | None Established | 5 $mg/m^3$ respirable dust<br>15 $mg/m^3$ total dust | None Established |
| Crystalline Silica (Cristobalite) | $\frac{1}{2} \times \frac{30\ mg/m^3}{\%\ SiO_2+2}$ total dust<br>$\frac{1}{2} \times \frac{10\ mg/m^3}{\%\ SiO_2+2}$ Respirable dust | 0.025 $mg/m^3$ Respirable dust | $\frac{1}{2} \times \frac{30\ mg/m^3}{\%\ SiO_2+2}$ total dust<br>$\frac{1}{2} \times \frac{10\ mg/m^3}{\%\ SiO_2+2}$ Respirable dust | 0.05 $mg/m^3$ Respirable dust |

| | | | | |
|---|---|---|---|---|
| Crystalline Silica (Quartz) | $\frac{30\ mg/m^3}{\%\ SiO_2+2}$ total dust<br><br>$\frac{10\ mg/m^3}{\%\ SiO_2+2}$ Respirable dust | 0.025 $mg/m^3$ Respirable dust | $\frac{30\ mg/m^3}{\%\ SiO_2+2}$ total dust<br><br>$\frac{10\ mg/m^3}{\%\ SiO_2+2}$ Respirable dust | 0.05 $mg/m^3$ Respirable dust |

| | |
|---|---|
| **ENGINEERING CONTROLS** | Use general or local exhaust ventilation to control dust within recommended exposure limits. Refer to ACGIH publication “Industrial Ventilation” or similar publications for design of ventilation systems. |
| **PERSONAL PROTECTIVE EQUIPMENT:** | |
| **EYE / FACE PROTECTION** | Goggles to protect from dust |
| **SKIN PROTECTION** | No special equipment is needed. |
| **RESPIRATORY PROTECTION** | Respirators fitted with filters certified to standard 42CFR84 under series N95 should be worn when dust is present. If the dust concentration is less than ten (10) times the Permissible Exposure Limit (PEL) use a quarter or half-mask respirator with a N95 dust filter or a single use dust mask rated N95. If dust concentration is greater than ten (10) times and less than fifty (50) times the PEL, a full-face piece respirator fitted with replaceable N95 filters is recommended. If dust concentration is greater than fifty (50) and less than two hundred (200) times the PEL use a power air-purifying (positive pressure) respirator with a replaceable N95 filter. If dust concentration is greater than two hundred (200) times the PEL use a type C, supplied air respirator (continuous flow, positive pressure), with full face piece, hood or helmet. |
| **GENERAL HYGIENE** | Avoid breathing dust. Avoid contact with eyes. Wash hands after handling and before eating or drinking. |

| | | |
|---|---|---|
| **MATERIAL NAME** | Straight-calcined – Traditional Crystalline Silica Content Determination | Page 3 of 4 |

| | | | |
|---|---|---|---|
| **SECTION 9: PHYSICAL AND CHEMICAL PROPERTIES** | | | |
| **APPEARANCE, COLOR** | Buff to pink powder | **ODOR** | Odorless |
| **PHYSICAL STATE** | Solid | **ODOR THRESHOLD** | Not applicable |

| | | | |
|---|---|---|---|
| **VAPOR PRESSURE** | Not applicable | **VAPOR DENSITY** | Not applicable |
| **BOILING POINT** | Not applicable | **MELTING POINT** | > 1300° C |
| **FLASH POINT** | Not applicable | **pH (10% SUSPENSION)** | 7 |
| **FLAMMABILITY LIMITS** | Not applicable | **EVAPORATION RATE** | Not applicable |
| **DECOMPOSITION TEMPERATURE** | > 1300° C | **SPEC. GRAVITY / RELATIVE DENSITY** | 2.2 |
| **AUTOIGNITION TEMPERATURE** | Not applicable | **PARTITION COEFFICIENT – n-OCTANOL/WATER** | Not applicable |
| **FLAMMABILITY (solid/gas)** | Not applicable | **SOLUBILITY – WATER** | < 1% |
| | | **VISCOSITY** | Not applicable |

| | |
|---|---|
| **SECTION 10: STABILITY AND REACTIVITY** | |
| **REACTIVITY** | Material is not reactive. |
| **CHEMICAL STABILITY** | Material is stable. |
| **POSSIBILITY OF HAZARDOUS REACTIONS** | Material is not reactive under normal conditions of handling unless mixed with incompatible substances below. |
| **CONDITIONS TO AVOID** | Not applicable |
| **INCOMPATIBLE MATERIALS** | Hydrofluoric acid and concentrated caustic solutions may react violently with the product. |
| **HAZARDOUS DECOMPOSITION PRODUCTS** | Not applicable |
| **SECTION 11: TOXICOLOGICAL INFORMATION** | |
| **POTENTIAL HEALTH** | |
| **Likely Routes of Exposure** | See below |
| **EYE** | May cause irritation (tear formation and redness) if dust gets in eyes. |
| **SKIN** | Not absorbed by the skin, but may cause dryness if prolonged exposure. |

| | | |
|---|---|---|
| **INGESTION** | Ingestion of small quantities is not considered harmful, but may cause irritation of the mouth, throat and stomach. | |
| **INHALATION** | Acute inhalation can cause dryness of the nasal passage and lung congestion, coughing and general throat irritation. Acute inhalation of high concentrations of respirable crystalline silica may cause acute silicosis. | |
| **CHRONIC EFFECTS** | This product contains crystalline silica. Respirable crystalline silica may cause lung cancer and lung disease (silicosis) if inhaled for prolonged periods. Symptoms of silicosis include wheezing, cough and shortness of breath. | |
| **CARCINOGENICITY** | Calcined diatomaceous earth (Kieselguhr) is composed of amorphous and crystalline silica. Respirable crystalline silica (quartz and cristobalite) is classified by IARC and NTP as a known human carcinogen. Crystalline silica is only known to cause cancer when inhaled in a respirable form. It is not known to cause cancer by any other route of exposure. | |
| **NTP** | Respirable crystalline silica (quartz and cristobalite) is classified as a known human carcinogen. | |
| **IARC** | Respirable crystalline silica (quartz and cristobalite) is classified as a known human carcinogen. | |
| **NUMERICAL MEASURES OF TOXICITY** | No data available | |
| **CORROSIVENESS, SENSITIZATION, IRRITANCY** | Not applicable | |
| **MATERIAL NAME** | Straight-calcined – Traditional Crystalline Silica Content Determination | Page 4 of 4 |
| **REPRODUCTIVE TOXICITY** | Not available | |
| **TERATOGENICITY, MUTAGENICITY** | Not available | |
| **SECTION 12: ECOLOGICAL INFORMATION** | | |
| **ECOTOXICITY:** | Diatomaceous earth products have shown some efficacy as a natural insecticide, but otherwise have no demonstrated toxicity in regards to aquatic or terrestrial life. | |
| **PERSISTENCE AND DEGRADABILITY** | Non-biodegradable, inert. | |

| | |
|---|---|
| **BIOACCUMULATIVE POTENTIAL** | Little potential for bioaccumulation |
| **MOBILITY IN SOIL** | No mobility |
| **OTHER ADVERSE EFFECTS** | None known |
| **SECTION 13: DISPOSAL CONSIDERATIONS** | |
| **WASTE DISPOSAL** | If this material as supplied becomes a waste, use solid waste disposal common to landfill type operations or in slurry to sumps. Not considered a hazardous waste under RCRA (4OCFR Part 261). |
| **PACKAGING DISPOSAL** | Dispose of in accordance with applicable laws and regulations, typically solid waste disposal common to landfill type operations. |
| **SECTION 14: TRANSPORT INFORMATION** | |
| **BASIC SHIPPING INFORMATION** | DOT shipping classification 55 (no restrictions). Technical name is "Diatomaceous Earth". |
| **ADDITIONAL INFORMATION** | No special requirements or placarding necessary. |
| **SECTION 15: REGULATORY INFORMATION** | |
| **U.S. FEDERAL:** | |
| **TSCA** | Diatomaceous Earth, Quartz, and Cristobalite appear on the EPA TSCA inventory list. |
| **CERCLA** | Diatomaceous Earth is not classified as a hazardous substance under regulations of the Comprehensive Environmental Response Compensation and Liability Act (CERCLA), 40 CFR 302. |
| **SARA TITLE III** | Not listed. |
| **California Proposition 65:** | This product contains crystalline silica, a chemical known to the State of California to cause cancer. |
| **INTERNATIONAL:** | |
| **WHMIS Classification** | Class D-2-A |
| **WHMIS Ingredient Disclosure List** | Silica, crystalline, cristobalite , and Silica, crystalline, quartz |
| **SECTION 16: OTHER INFORMATION** | |

| | |
|---|---|
| | 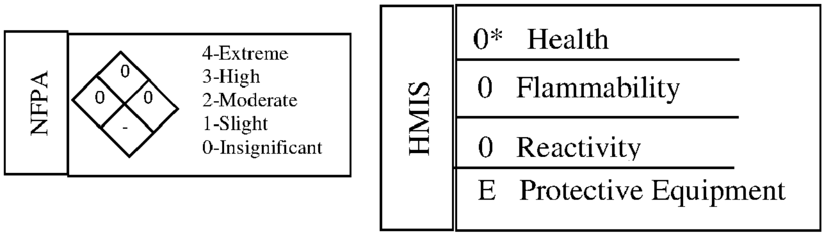 |
| **ORIGINAL ISSUE DATE** | Not applicable |
| **REVISION DATE** | Not applicable |
| **REVISION NO.** | |

Table 20: SDS Information for Straight-Calcined Products Containing Quartz with Data from LH Method

| | |
|---|---|
| **SECTION 1: PRODUCT AND COMPANY IDENTIFICATION** | |
| **PRODUCT IDENTIFIER** | Straight-calcined –Silica Content Determination according to the LH Method |
| **CHEMICAL NAME** | Diatomaceous Earth, Calcined |
| **CHEMICAL FAMILY** | Silica |
| **MATERIAL USE** | Filter Aid, Functional Filler |
| **RESTRICTION ON** | None Known |
| **MANUFACTURER** | EP Minerals, LLC., 9875 Gateway Dr., Reno, NV 89521 |
| **TELEPHONE NO.** | (775) 824 7600 (Monday – Friday 8:00 am PST – 5:00 pm |
| **EMERGENCY** | (775) 824 7600 (Monday – Friday 8:00 am PST – 5:00 pm |
| **SDS DATE OF** | 2016 |
| **SECTION 2: HAZARDS IDENTIFICATION** | |
| **OSHA GHS HAZARD CLASSIFICATION** | Carcinogen Category 1A<br>Specific Target Organ Toxicity, Repeated Exposure Category 1 |

| | |
|---|---|
| **HAZARDS NOT OTHERWISE CLASSIFIED** | None |
| **LABEL ELEMENTS** | DANGER<br>May cause cancer by inhalation.<br>Causes damage to lungs through prolonged or repeated exposure.<br>**Obtain special instructions before use.**<br>**Do not handle until all safety precautions have been read and understood.**<br>Do not breathe dust.<br>Wear eye protection.<br>If exposed or concerned: Get medical advice.<br>**Dispose of contents in accordance with local, state and federal regulations.** |
| | |

| **SECTION 3: COMPOSITION / INFORMATION ON INGREDIENTS** | | |
|---|---|---|
| INGREDIENT IDENTIFICATION | APPROXIMATE CONCENTRATION (%) | C.A.S. NUMBERS |
| Diatomaceous Earth, Calcined (kieselguhr)<br>(contains 0.1% to 5% Crystalline Silica - Quartz) | 100% | 91053-39-3<br>14808-60-7 |

| **SECTION 4: FIRST AID MEASURES** | |
|---|---|
| **EYE** | Flush eyes with generous quantities of water or eye rinse solution. Consult physician if irritation persists. |
| **SKIN** | Use moisture renewing lotions if dryness occurs. |
| **INGESTION** | Drink generous amounts of water to reduce bulk and drying effects. |
| **INHALATION** | Remove to fresh air. Blow nose to evacuate dust. |

| | | |
|---|---|---|
| **Most important symptoms/effects, acute and delayed** | Dust may cause abrasive irritation to eyes. Prolonged skin contact may cause dryness. Dust may cause nose, throat and upper respiratory tract irritation. Prolonged inhalation of respirable dust containing silica may cause a progressive lung disease, silicosis and lung cancer. See Section 11 for additional information. | |
| **Indication of immediate medical attention and special treatment, if necessary** | Immediate medical attention is not normally required. If dust irritates the eyes, seek medical attention. | |
| **MATERIAL NAME** | Straight-calcined –Silica Content Determination according to the LH Method | Page 2 of 4 |
| **SECTION 5: FIRE FIGHTING MEASURES** | | |
| **EXTINGUISHING MEDIA** | Not applicable, the material is not combustible. | |
| **SPECIFIC HAZARDS ARISING FROM THE CHEMICAL** | Not applicable, the material is not combustible. | |
| **SPECIAL PROTECTIVE EQUIPMENT AND PRECAUTIONS FOR FIRE-FIGHTERS** | Not applicable, the material is not combustible. | |
| **SECTION 6: ACCIDENTAL RELEASE MEASURES** | | |
| **PERSONAL PRECAUTIONS** | If dust is present, use respirator fitted with particulate filter as specified in Section 8. Protect eyes with goggles. Do not breathe dust. | |
| **ENVIRONMENTAL PRECAUTIONS** | This material is not a significant environmental concern. | |
| **METHODS AND MATERIALS FOR CONTAINMENT AND CLEANING UP** | Vacuum clean spillage or wet sweep. Avoid creating airborne dust. Place in a container for use or disposal. | |
| **SECTION 7: HANDLING AND STORAGE** | | |
| **PRECAUTIONS FOR SAFE HANDLING** | Minimize dust generation. Avoid contact with eyes. Do not breathe dust. Repair or dispose of broken bags. Observe all label precautions and warnings. | |

| | | | | |
|---|---|---|---|---|
| **CONDITIONS FOR SAFE STORAGE** | Store in a dry place to maintain packaging integrity and product quality. Do not store near hydrofluoric acid or concentrated caustic solutions. | | | |
| **SECTION 8: EXPOSURE CONTROLS / PERSONAL PROTECTION** | | | | |
| **EXPOSURE GUIDELINES:** | | | | |
| Component | OSHA PEL | ACGIH TLV | MSHA PEL | NIOSH REL |
| Diatomaceous Earth, Calcined (kieselguhr) | 5 $mg/m^3$ respirable dust<br>15 $mg/m^3$ total dust | None Established | 5 $mg/m^3$ respirable dust<br>15 $mg/m^3$ total dust | None Established |
| Crystalline Silica (Quartz) | $\frac{30\ mg/m^3}{\%\ SiO_2+2}$ total dust<br><br>$\frac{10\ mg/m^3}{\%\ SiO_2+2}$ Respirable dust | 0.025 mg/ $m^3$ Respirable dust | $\frac{30\ mg/m^3}{\%\ SiO_2+2}$ total dust<br><br>$\frac{10\ mg/m^3}{\%\ SiO_2+2}$ Respirable dust | 0.05 $mg/m^3$ Respirable dust |
| **ENGINEERING CONTROLS** | Use general or local exhaust ventilation to control dust within recommended exposure limits. Refer to ACGIH publication "Industrial Ventilation" or similar publications for design of ventilation systems. | | | |
| **PERSONAL PROTECTIVE EQUIPMENT:** | | | | |
| **EYE / FACE PROTECTION** | Goggles to protect from dust | | | |
| **SKIN PROTECTION** | No special equipment is needed. | | | |

| | | | |
|---|---|---|---|
| **RESPIRATORY PROTECTION** | Respirators fitted with filters certified to standard 42CFR84 under series N95 should be worn when dust is present. If the dust concentration is less than ten (10) times the Permissible Exposure Limit (PEL) use a quarter or half-mask respirator with a N95 dust filter or a single use dust mask rated N95. If dust concentration is greater than ten (10) times and less than fifty (50) times the PEL, a full-face piece respirator fitted with replaceable N95 filters is recommended. If dust concentration is greater than fifty (50) and less than two hundred (200) times the PEL use a power air-purifying (positive pressure) respirator with a replaceable N95 filter. If dust concentration is greater than two hundred (200) times the PEL use a type C, supplied air respirator (continuous flow, positive pressure), with full face piece, hood or helmet. | | |
| **GENERAL HYGIENE** | Avoid breathing dust. Avoid contact with eyes. Wash hands after handling and before eating or drinking. | | |
| **MATERIAL NAME** | Straight-calcined –Silica Content Determination according to the LH Method | | Page 3 of 4 |
| **SECTION 9: PHYSICAL AND CHEMICAL PROPERTIES** | | | |
| **APPEARANCE, COLOR** | Buff to pink powder | **ODOR** | Odorless |
| **PHYSICAL STATE** | Solid | **ODOR THRESHOLD** | Not applicable |
| **VAPOR PRESSURE** | Not applicable | **VAPOR DENSITY** | Not applicable |
| **BOILING POINT** | Not applicable | **MELTING POINT** | > 1300° C |
| **FLASH POINT** | Not applicable | **pH (10% SUSPENSION)** | 7 |
| **FLAMMABILITY LIMITS** | Not applicable | **EVAPORATION RATE** | Not applicable |
| **DECOMPOSITION TEMPERATURE** | > 1300° C | **SPEC. GRAVITY / RELATIVE DENSITY** | 2.2 |
| **AUTOIGNITION TEMPERATURE** | Not applicable | **PARTITION COEFFICIENT – n-OCTANOL/WATER** | Not applicable |
| **FLAMMABILITY (solid/gas)** | Not applicable | **SOLUBILITY – WATER** | < 1% |
| | | **VISCOSITY** | Not applicable |

| SECTION 10: STABILITY AND REACTIVITY | |
|---|---|
| **REACTIVITY** | Material is not reactive. |
| **CHEMICAL STABILITY** | Material is stable. |
| **POSSIBILITY OF HAZARDOUS REACTIONS** | Material is not reactive under normal conditions of handling unless mixed with incompatible substances below. |
| **CONDITIONS TO AVOID** | Not applicable |
| **INCOMPATIBLE MATERIALS** | Hydrofluoric acid and concentrated caustic solutions may react violently with the product. |
| **HAZARDOUS DECOMPOSITION PRODUCTS** | Not applicable |
| **SECTION 11: TOXICOLOGICAL INFORMATION** | |
| **POTENTIAL** | |
| **Likely Routes of** | See below |
| **EYE** | May cause irritation (tear formation and redness) if dust gets in eyes. |
| **SKIN** | Not absorbed by the skin, but may cause dryness if prolonged exposure. |
| **INGESTION** | Ingestion of small quantities is not considered harmful, but may cause irritation of the mouth, throat and stomach. |
| **INHALATION** | Acute inhalation can cause dryness of the nasal passage and lung congestion, coughing and general throat irritation. Acute inhalation of high concentrations of respirable crystalline silica may cause acute silicosis. |
| **CHRONIC EFFECTS** | This product contains a natural form of crystalline silica (quartz). Respirable crystalline silica may cause lung cancer and lung disease (silicosis) if inhaled for prolonged periods. Symptoms of silicosis include wheezing, cough and shortness of breath. |

| | | |
|---|---|---|
| **CARCINOGENICITY** | Calcined diatomaceous earth (Kieselguhr) is composed primarily of amorphous silica, but can also contain crystalline silica in the form of quartz. Respirable crystalline silica (quartz) is classified by IARC and NTP as a known human carcinogen. Crystalline silica is only known to cause cancer when inhaled in a respirable form. It is not known to cause cancer by any other route of exposure. | |
| **NTP** | Respirable crystalline silica (quartz) is classified as a known human carcinogen. | |
| **IARC** | Respirable crystalline silica (quartz) is classified as a known human carcinogen. | |
| **NUMERICAL MEASURES OF TOXICITY** | No data available | |
| **CORROSIVENESS, SENSITIZATION, IRRITANCY** | Not applicable | |
| **MATERIAL NAME** | Straight-calcined –Silica Content Determination according to the LH Method | Page 4 of 4 |
| **REPRODUCTIVE TOXICITY** | Not available | |
| **TERATOGENICITY, MUTAGENICITY** | Not available | |
| **SECTION 12: ECOLOGICAL INFORMATION** | | |
| **ECOTOXICITY:** | Diatomaceous earth products have shown some efficacy as a natural insecticide, but otherwise have no demonstrated toxicity in regards to aquatic or terrestrial life. | |
| **PERSISTENCE AND DEGRADABILITY** | Non-biodegradable, inert. | |
| **BIOACCUMULATIVE POTENTIAL** | Little potential for bioaccumulation | |
| **MOBILITY IN SOIL** | No mobility | |
| **OTHER ADVERSE EFFECTS** | None known | |
| **SECTION 13: DISPOSAL CONSIDERATIONS** | | |
| **WASTE DISPOSAL** | If this material as supplied becomes a waste, use solid waste disposal common to landfill type operations or in slurry to sumps. Not considered a hazardous waste under RCRA (4OCFR Part 261). | |

| | |
|---|---|
| **PACKAGING DISPOSAL** | Dispose of in accordance with applicable laws and regulations, typically solid waste disposal common to landfill type operations. |
| **SECTION 14: TRANSPORT INFORMATION** | |
| **BASIC SHIPPING INFORMATION** | DOT shipping classification 55 (no restrictions). Technical name is "Diatomaceous Earth". |
| **ADDITIONAL INFORMATION** | No special requirements or placarding necessary. |
| **SECTION 15: REGULATORY INFORMATION** | |
| **U.S. FEDERAL:** | |
| **TSCA** | Diatomaceous Earth and Quartz appear on the EPA TSCA inventory list. |
| **CERCLA** | Diatomaceous Earth is not classified as a hazardous substance under regulations of the Comprehensive Environmental Response Compensation and Liability Act (CERCLA), 40 CFR 302. |
| **SARA TITLE III** | Not listed. |
| **California Proposition 65:** | This product contains crystalline silica, a chemical known to the State of California to cause cancer. |
| **INTERNATIONAL:** | |
| **WHMIS Classification** | Class D-2-A |
| **WHMIS Ingredient Disclosure List** | Silica, crystalline, quartz |
| **SECTION 16: OTHER INFORMATION** | |

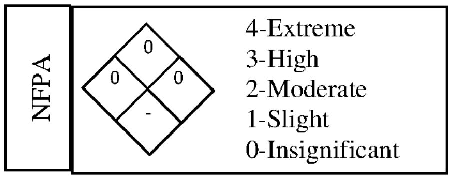

| HMIS | |
|---|---|
| 0* | Health |
| 0 | Flammability |
| 0 | Reactivity |
| E | Protective Equipment |

| | |
|---|---|
| **ORIGINAL ISSUE DATE** | Not applicable |
| **REVISION DATE** | Not applicable |
| **REVISION NO.** | |

Figure 33:
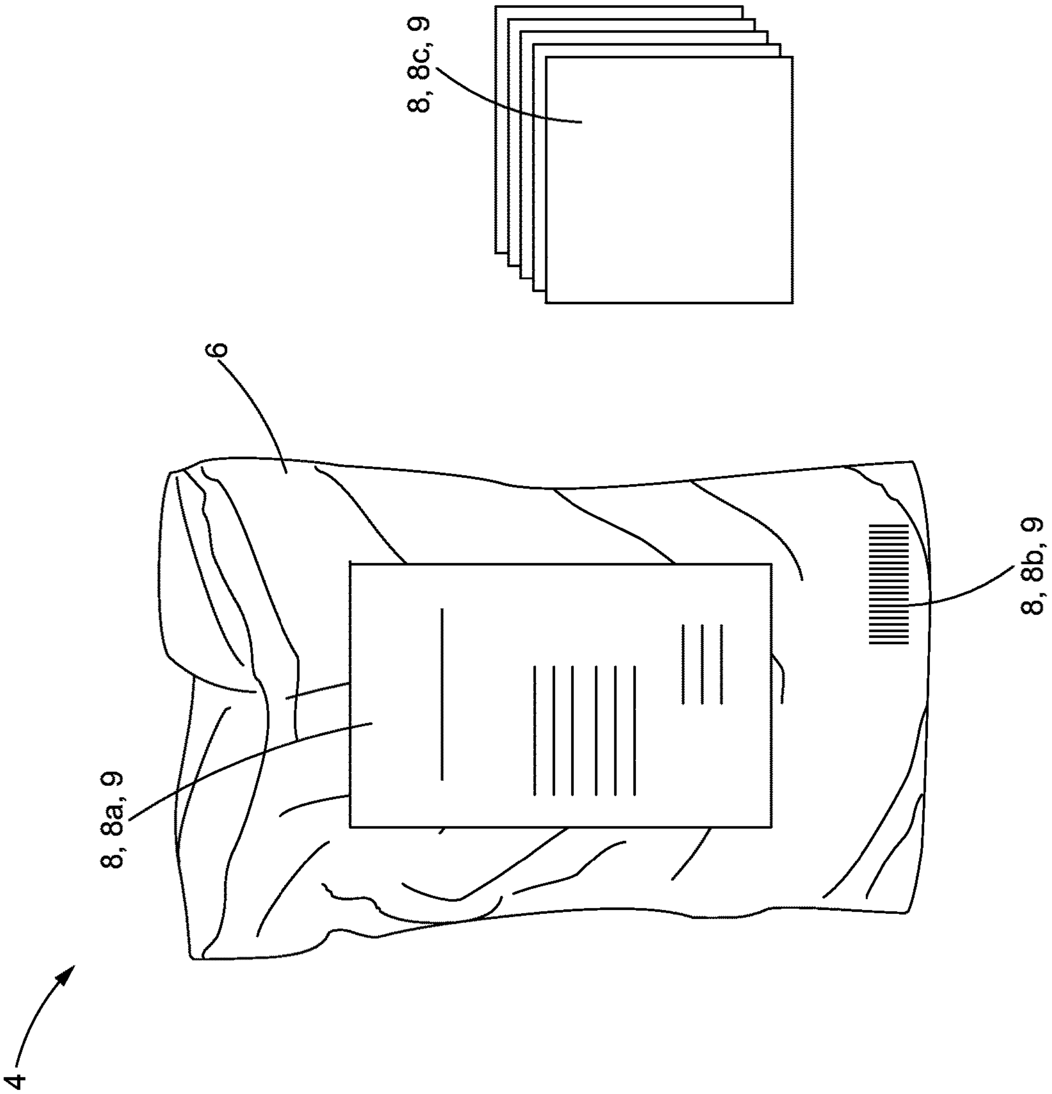
FIG. 33 is an illustration of an exemplary product with exemplary Silica Documentation.

FIG. 33 illustrates an exemplary embodiment of the product 4. The product 4 includes a physical component 6 (of the product 4) and a data component 9. The data component 9 includes the novel Silica Documentation 8. In the example shown in FIG. 33, the Silica Documentation 8 includes a product label 8*a*, a bar code 8*b* and an SDS 8*c*. This is not to imply that all three of these types of Silica Documentation 8 must be associated with a given product 4. FIG. 33 is for exemplary purposes only. In other embodiments, the Silica Documentation 8 may include, as discussed earlier, one or more of a regulatory support document(s), hazard disclosure(s), Safety Data Sheet(s), label(s), product label(s), product bar code(s), certificates of analysis or other electronic or printed forms of data which document or disclose crystalline silica content, or the absence of crystalline silica in the content, of the product 4. In the example illustrated in FIG. 33, the Silica Documentation 8 (associated with the product 4) discloses crystalline silica content present (or the absence of crystalline silica) in the physical component 6 as determined, measured or quantified by the LH Method. As noted previously, the absence of crystalline silica (for example, cristobalite, quartz, tridymite) is disclosed either by an explicit statement or an absence of crystalline silica from the product contents identified by the Silica Documentation 8.

The disclosures of the publications referenced below are hereby incorporated by reference into the present disclosure in their entirety. Eichhubl, P, and R. J. Behl, 1998. "Diagenesis, Deformation, and Fluid Flow in the Miocene Monterey Formation": Special Publication, Pacific Section, SEPM, V83, p. 5-13. J. M. Elzea, I. E. Odom, W. J. Miles, "Distinguishing well-ordered opal-CT and opal-C from high temperature cristobalite by x-ray diffraction", Anal. Chim. Acta 286 (1994) 107-116. Hillier, S., and D. G. Lumsdon. "Distinguishing opaline silica from cristobalite in bentonites: a practical procedure and perspective based on NaOH dissolution", Clay Minerals (2008) 43, 477-486. Damby, David E., Llewellin, Edward W., Horwell, Claire J., Williamson, Ben J., Najorka, Jens, Cressey, Gordon, Carpenter, Michael, 2014, "The α-β phase transition in volcanic cristobalite", Journal of Applied Crystallography, 47, 1205-1215. Chao, Chin-Hsiao, Lu, Hong-Yang, 2002, "Stress-induced β to α-cristobalite phase transformation in ($Na_2O$+$Al_2O_3$)-codoped silica", Materials Science and Engineering, A328, 267-276. Klug, H. P., & Alexander, L. E., 1974, "X-ray Diffraction Procedures", John Wiley and Sons, Inc. Silica, Crystalline, by XRD 7500, NIOSH Manual of Analytical Methods, Fourth Edition, 2003.

INDUSTRIAL APPLICABILITY

The teachings of this disclosure include products comprising powdered diatomite and novel Silica Documentation, and the associated novel LH Method for determination and quantification of the silica content of such products (for example, the opal-C (and/or opal-CT), cristobalite, quartz or tridymite content). Such products, properly characterized by Silica Documentation based on the LH Method, provide benefits in the analysis of potential product hazards, appropriate incentives for the producers of products that include diatomite to develop and introduce new products comprising reduced levels of crystalline silica and improved information regarding the potential exposures of both workers and consumers to crystalline silica, and respirable crystalline silica. Further the novel LH Method disclosed herein for determining and quantifying the opal-C (and/or opal-CT) and crystalline silica (cristobalite, quartz, tridymite) content of products that include diatomite and method of process control disclosed herein provide effective and novel quality control during manufacturing of such products.

Moreover, the teachings of the present disclosure may be practiced on the industrial scale for providing novel filtration media, carriers, absorbents, functional fillers and the like that include low or non-detectable levels of crystalline silica. Such novel products, and methods of producing such products, benefit users, handlers, and manufacturers by reducing exposure to crystalline silica.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A diatomite product comprising:

sodium flux-calcined diatomite, wherein the diatomite product has a crystalline silica content of less than about 1 wt% of the diatomite product, wherein the diatomite product has a permeability between 0.8 darcy and about 30 darcy, wherein the diatomite product has an opal-C content of more than about 1 wt% of the diatomite product, wherein the diatomite product has more than about 4 wt% combined total of aluminum and iron in mineral form or more than about 7 wt% expressed as oxides, and wherein the diatomite product has a soluble calcium content between about 21 ppm and 900 ppm, as measured by the European Brewery Convention (EBC) method, between about 23 ppm and 45 ppm of a soluble iron, as measured buy the EBC method, and between about 4 ppm and about 14 ppm, 14 ppm of a beer soluble iron, as measured by the American Society of Brewing Chemists (ASBC) method.

2. The diatomite product of claim 1, wherein the diatomite product has the permeability between 0.9 darcy and 30 darcy.

3. The diatomite product of claim 1, wherein the crystalline silica content is less than about 0.1 wt % of the diatomite product.

4. The diatomite product of claim 1, wherein the diatomite product has a biogenic silica content of at least 80 wt %.

5. The diatomite product of claim 1, wherein the diatomite product has the permeability between about 1.5 darcy and about 9 darcy.

6. The diatomite product of claim 1, wherein the diatomite product has the opal-C content of more than about 10 wt % of the diatomite product.

7. The diatomite product of claim 1, wherein the diatomite product is a particulate product.

8. The diatomite product of claim 1, wherein the diatomite product is a regenerated filtration medium that has been used previously one or more times as a filtration medium and has been regenerated by either a chemical or thermal process, the regenerated filtration medium adapted for re-use in filtration processes for at least one of food, beverages, chemicals, fuels, materials, water and biopharmaceuticals.

9. The diatomite product of claim 1, wherein the diatomite product has a cristobalite content of less than about 1 wt% as determined by a method that differentiates between cristobalite and opal-C.

10. The diatomite product of claim 9, wherein the method that differentiates between cristobalite and opal-C is an LH method.

11. The diatomite product of claim 1, wherein the sodium flux-calcined diatomite includes soda ash flux-calcined diatomite.

12. A method of manufacturing a diatomite product, the method comprising:

selecting a diatomite ore that includes more than about 2.6 wt% aluminum in mineral form or more than about 5 wt% as aluminum oxide, and calcining the diatomite ore with a sodium flux to manufacture the diatomite product, wherein the diatomite product manufactured comprises sodium flux-calcined diatomite that has a crystalline silica content of less than about 1 wt%, an opal-C content of more than about 1 wt%, a permeability between 0.8 darcy and about 30 darcy, more than about 4 wt% combined total of aluminum and iron in mineral form or more than about 7 wt% expressed as oxides, and further wherein the diatomite product manufactured comprises a soluble calcium content between about 21 ppm and 900 ppm, as measured by the European Brewery Convention (EBC) method, between about 23 ppm and 45 ppm of a soluble iron, as measured by the EBC method, and between about 4 ppm and about 14 ppm, 14 ppm of a beer soluble iron, as measured by the American Society of Brewing Chemists (ASBC) method.

13. The method of claim 12, wherein the sodium flux includes soda ash.

* * * * *